United States Patent
Shimura et al.

(10) Patent No.: US 10,186,057 B2
(45) Date of Patent: Jan. 22, 2019

(54) DATA INPUT DEVICE, DATA INPUT METHOD, AND NON-TRANSITORY COMPUTER READABLE RECORDING MEDIUM STORING DATA INPUT PROGRAM

(71) Applicant: SHARP KABUSHIKI KAISHA, Osaka-shi, Osaka (JP)

(72) Inventors: Tomoya Shimura, Osaka (JP); Sakae Saito, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 14/646,652

(22) PCT Filed: Nov. 14, 2013

(86) PCT No.: PCT/JP2013/080783
§ 371 (c)(1),
(2) Date: May 21, 2015

(87) PCT Pub. No.: WO2014/080829
PCT Pub. Date: May 30, 2014

(65) Prior Publication Data
US 2015/0302617 A1    Oct. 22, 2015

(30) Foreign Application Priority Data
Nov. 22, 2012 (JP) .................. 2012-256552

(51) Int. Cl.
*G06F 3/01* (2006.01)
*G06K 9/00* (2006.01)
*G06T 11/20* (2006.01)

(52) U.S. Cl.
CPC ............. *G06T 11/20* (2013.01); *G06F 3/011* (2013.01); *G06K 9/00355* (2013.01)

(58) Field of Classification Search
CPC .......... G06T 11/60; G06T 2207/10016; G06T 7/0081; G06T 7/0042; G06T 7/20;
(Continued)

(56) References Cited

U.S. PATENT DOCUMENTS 6,256,400 B1 *   7/2001   Takata ............... G06K 9/00335
                                                                      379/52
2008/0120577 A1   5/2008   Ma et al.
(Continued)

FOREIGN PATENT DOCUMENTS

JP    8-211979 A    8/1996
JP    9-212299 A    8/1997
(Continued)

OTHER PUBLICATIONS

Jiangliang et al., "Research of finger pointing gesture recognition based on transmissive system," Electronic Measurement Technology, vol. 34-3, Mar. 2009, pp. 96-99 (Total pp. 8), along with a Partial translation.

*Primary Examiner* — Ke Xiao
*Assistant Examiner* — Andrew Shin
(74) *Attorney, Agent, or Firm* — Birch, Stewart, Kolasch & Birch, LLP

(57) ABSTRACT

In a data input device according to one aspect of the present invention, a position detection unit detects a first position based on a position of one part of a body of a user represented in a video captured by an image capturing device and a second position based on a position of another part of the body. A drawing input detection unit establishes, based on the first position, an input detection region in which a drawing input is detected, and detects, based on whether or not the second position is included in the input detection region, the drawing input. A position-of-interest detection unit detects a position-of-interest corresponding to the second position on an image display plane. An image forming (Continued)

unit forms an image indicating a position-of-interest in a case that the drawing input detection unit detects the drawing input.

15 Claims, 29 Drawing Sheets

(58) Field of Classification Search
CPC ...... G06F 3/04842; G06F 3/016; G06F 3/038; G06F 3/011; G06F 3/012; G06F 3/017; G06K 9/222; G06K 9/48; G06K 9/036; G06K 9/00335; G06K 9/00355; G06K 9/00362; G06K 9/00375; G06K 9/00389; A63B 24/0003
USPC ........ 345/619, 642, 156, 157; 382/103, 190, 382/195, 202, 203, 286, 291
See application file for complete search history.

(56) References Cited

U.S. PATENT DOCUMENTS

| | | | | |
|---|---|---|---|---|
| 2008/0170123 | A1* | 7/2008 | Albertson | A63B 24/0003 348/157 |
| 2011/0107216 | A1* | 5/2011 | Bi | G06F 3/011 715/716 |
| 2012/0119988 | A1 | 5/2012 | Izumi | |
| 2012/0162409 | A1* | 6/2012 | Setiawan | G06F 3/011 348/135 |
| 2013/0002551 | A1* | 1/2013 | Imoto | G06F 3/013 345/158 |
| 2013/0257751 | A1* | 10/2013 | Stafford | G06F 3/0488 345/173 |

FOREIGN PATENT DOCUMENTS

| | | |
|---|---|---|
| JP | 2011-039844 A | 2/2011 |
| JP | 2011-113191 A | 6/2011 |

* cited by examiner

FIG. 22
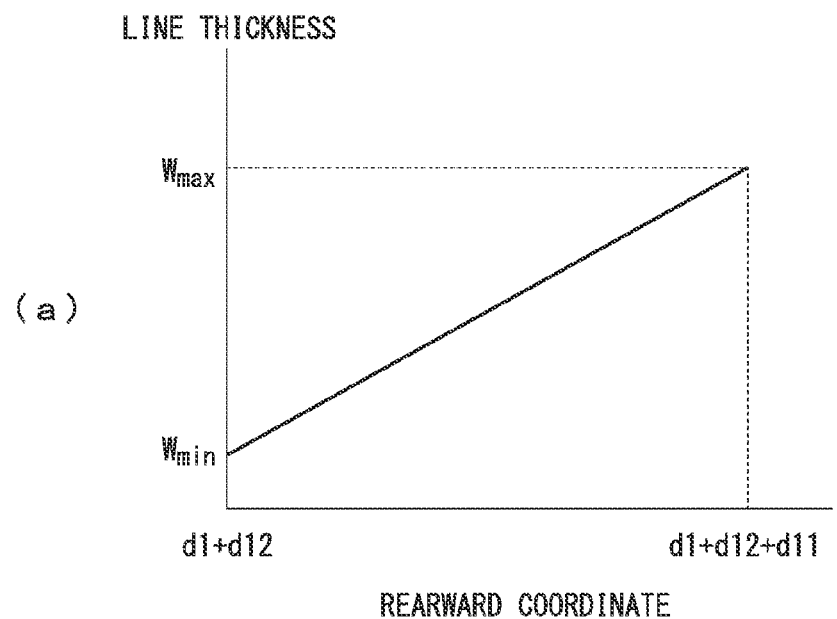
(a)
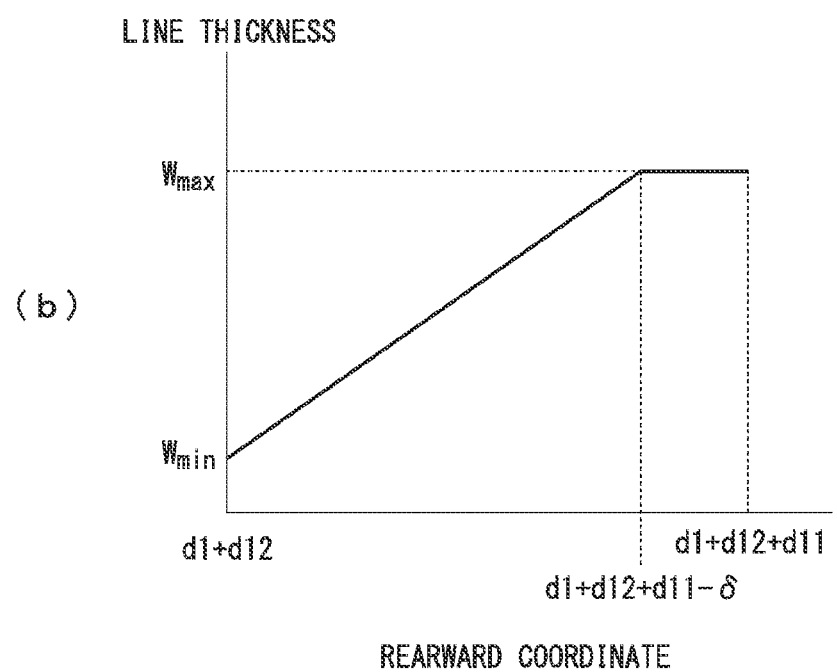
(b)

FIG. 26
(a)
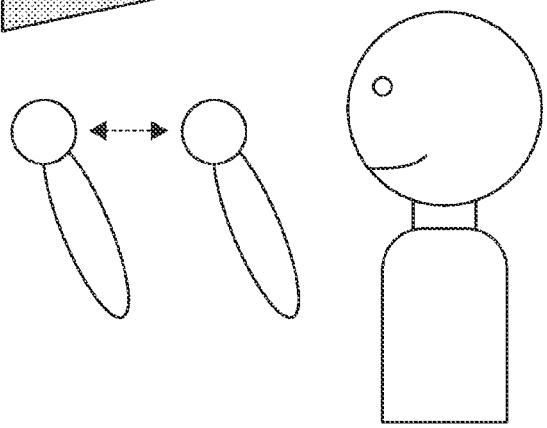
(b)
LINE STYLE
CHANGE THE HAND SHAPE TO CHANGE THE LINE STYLE.
 
 
 

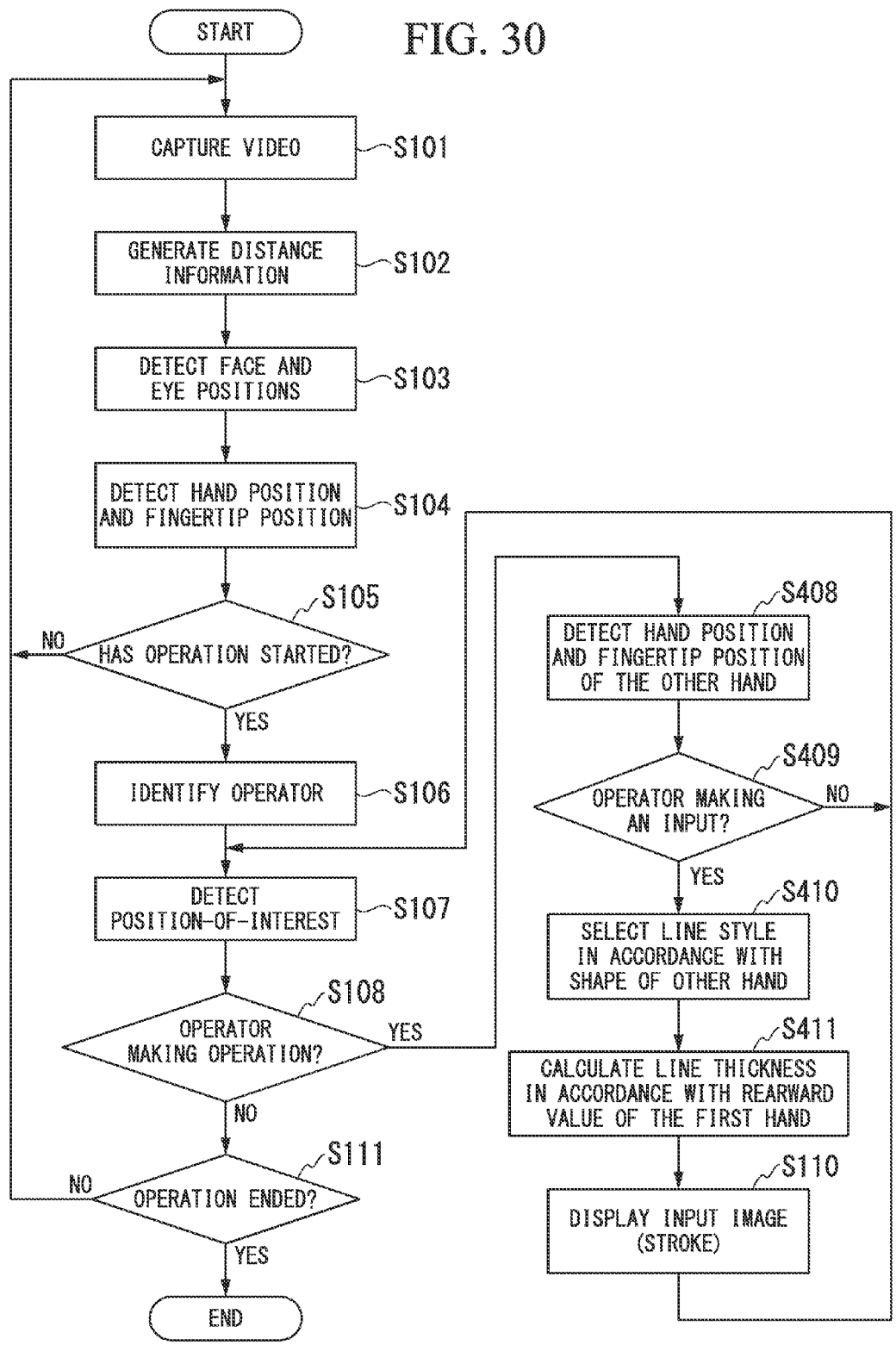

DATA INPUT DEVICE, DATA INPUT METHOD, AND NON-TRANSITORY COMPUTER READABLE RECORDING MEDIUM STORING DATA INPUT PROGRAM

TECHNICAL FIELD

The present invention relates to a data input device.

The subject application claims priority based on the patent application No. 2012-256552 filed in Japan on Nov. 22, 2012 and incorporates by reference herein the content thereof.

BACKGROUND ART

Various devices and methods have been proposed as user interfaces for operating devices such as computers, game machines, and video telephone conference systems.

For example, in the information input device described in Patent Document 1, an infrared beam from an infrared transmitting unit of a pointer is transmitted simultaneously with an ultrasonic wave from an ultrasonic wave transmitter, and the position pointed at on a display by the pointer is input by the time difference of the time of receiving the ultrasonic wave, with respect to the time of receiving the infrared beam as a reference.

In the information processing device described in Patent Document 2, an image on an information input surface struck with light is captured, and information is processed in accordance with the position on the information input surface of an input device detected based on the intensity distribution of the captured image on the information input surface.

PRIOR ART DOCUMENTS

Patent Documents

[Patent Document 1] Japanese Patent Application Publication No. H9(1997)-212299
[Patent Document 2] Japanese Patent Application Publication No. 2011-113191

SUMMARY OF THE INVENTION

Problem to be Solved by the Invention

With the information input device described in Patent Reference 1, however, because a dedicated input device such as a pointer or the like is used to input position information, applications may be limited. For example, if this were to be applied to a video telephone conference in which a plurality of people participate, as many input devices are required as there are participants. Also, when there is a general public presentation such as in an electronic advertising device (digital signage), there is a tendency for the input device to become damaged or lost. Additionally, between the input device and the main unit of the device, because information is transferred using an infrared beam, the propagation characteristics of which are affected by the weather, this might not be suitable for outdoor use.

Also, with the information processing device described in Patent Reference 2, it is necessary to have equipment having a physical flat surface, such as a desk or table, as an information input surface for inputting handwritten characters or the like. That is, applications might be limited if it is not possible to provide a space to install such equipment. For example, in the case in which an electronic advertisement device is installed in a public space, it might not be possible to provide space for installing this equipment. Even if a space is available, there have been cases, for example, in which it is not possible for the user to approach the display device displaying the image and in which it is not possible to dispose both the information input surface and the display plane of the display device in the same direction relative to the user, thereby presenting the problem of limiting the situations in which application is possible and hampering effective utilization.

The present invention is made with consideration given to the above-noted problems, and provides a data input device that performs drawing input smoothly, without using a dedicated device.

Means to Solve the Problem (1) The present invention is made to solve the above-described problem, a data input device includes: a position detection unit that detects a first position and a second position, the first position being based on a position of one part of a body of a user represented in a video captured by an image capturing device, the second position being based on a position of another part of the body; a drawing input detection unit that detects a drawing input based on the first position and the second position detected by the position detection unit; a position-of-interest detection unit that detects a position-of-interest on an image display plane, the position-of-interest corresponding to the second position detected by the position detection unit; and an image forming unit that forms an image indicating a position-of-interest detected by the position-of-interest detection unit in a case that the drawing input detection unit detects drawing input.

(2) According to another aspect of the present invention, in the above-described data input device, the image forming unit may be configured to establish an information related to a processing of the image, the establishment of the information being performed in accordance with a coordinate value of the second position in a rearward direction.

(3) According to another aspect of the present invention, the above-described data input device may include a first shape detection unit that detects a shape of an another part of the body. In addition, the image forming unit may be configured to establish an information related to a processing the image, the establishment of the information being performed based on a shape detected by the first shape detection unit.

(4) According to another aspect of the present invention, in the above-described data input device, the position detection unit may be configured to detect a third position, the detection of the third position being performed based on a position of yet another part of a body of a user represented in a video captured by the image capturing device. The drawing input detection unit may be configured to establish one boundary of the input detection region, the establishment of the one boundary being performed by using, as a reference, the third position detected by the position detection unit.

(5) According to another aspect of the present invention, the above-described data input device may include a second shape detection unit that detects a shape of a yet another part of the body. The image forming unit may be configured to establish an information related to a processing of the image, the establishment of the information being performed based on a shape detected by the second shape detection unit.

(6) According to another aspect of the present invention, in the above-described data input device, one part of a body of the user may be a face, and another part of the body may be either one of a left hand and a right hand.

(7) According to another aspect of the present invention, in the above-described data input device, one part of a body of the user may be a face, the another part of the body may be either one of a left and a right hand, and yet another part of the body may be a hand that is opposite from the one hand.

(8) According to another aspect of the present invention, in the above-described data input device, one part of a body of the user may be an eye, and another part of the body may be either one of a left hand and a right hand.

(9) According to another aspect of the present invention, in the above-described data input device, one part of a body of the user may be an eye, the another part of the body may be either one of a left and a right hand, and yet another part of the body may be a hand that is opposite from the one hand.

(10) A data input method of a data input device according to another aspect of the present invention includes: a position detection step of detecting a first position and a second position, the first position being based on a position of one part of a body of a user represented in a video captured by an image capturing device, the second position being based on a position of another part of the body; a drawing input detection step of detecting a drawing input, the detection of the drawing input being performed based on the first position and the second position detected by the position detection step; a position-of-interest detection step of detecting a position-of-interest on an image display plane, the position-of-interest corresponding to the second position detected by the position detection step; and an image forming step of forming an image indicating a position-of-interest detected by the position-of-interest detection step in a case that the drawing input detection step detects drawing input.

(11) A data input program according to another aspect of the present invention is a data input program that causes a computer of a data input device to execute: a position detection step of detecting a first position and a second position, the first position being based on a position of one part of a body of a user represented in a video captured by an image capturing device, the second position being based on a position of another part of the body; a drawing input detection step of detecting a drawing input, the detection of the drawing input being performed based on the first position and the second position detected by the position detection step; a position-of-interest detection step of detecting a position-of-interest on an image display plane, the position-of-interest corresponding to the second position detected by the position detection step; and an image forming step of forming an image indicating the position-of-interest detected by the position-of-interest detection step in a case that the drawing input detection step detects drawing input.

Effect of the Invention

According to the present invention, it is possible to perform smooth data input without using a dedicated device.

BRIEF DESCRIPTION OF DRAWINGS

FIG. 22 is a drawing showing an example of setting the line thickness according to the above-noted embodiment.

FIG. 26 is a drawing showing an example of a guidance image in the above-noted embodiment.

FIG. 30 is a flowchart showing the data input processing according to the above-noted embodiment.

EMBODIMENTS FOR CARRYING OUT THE INVENTION (First Embodiment)

An embodiment of the present invention will be described in detail below, with references made to the drawings.

Figure 1:
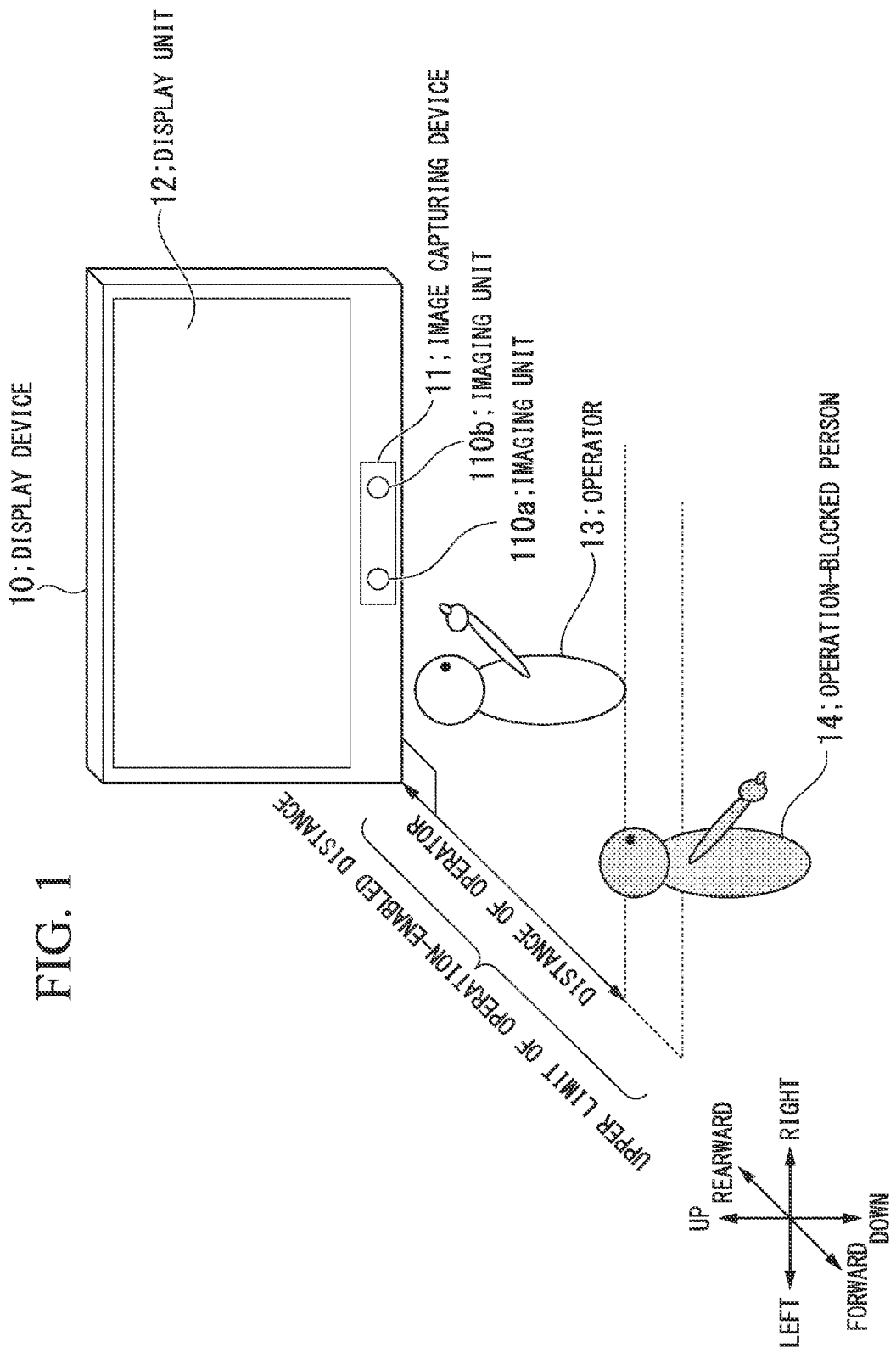
FIG. 1 is a conceptual drawing showing the outer appearance constitution of a display device according to a first embodiment of the present invention.

FIG. 1 is a conceptual drawing showing the outer appearance constitution of a display device 10 according to the present embodiment.

In FIG. 1, the display device 10 is a device that displays video, such as a television receiver, digital signage (electronic sign) device, or a video conference device. The display device 10 has an image capturing device 11 at the center part of the bottom side of the front thereof and has a display unit 12 covering the larger portion of the front surface thereof.

The image capturing device 11 is, for example, a stereo camera that captures video toward the front thereof. The image capturing device 11 has, for example, imaging units 110a and 110b that capture an image toward their front and that are mutually separated in the left and right directions. Each of the imaging units 110a and 110b is a camera unit.

The display unit 12 is a display that displays an image based on an image signal input from the control unit 22 (FIG. 3) built therein. The display device 10 may have a speaker (not shown) that outputs audio.

The operator 13 is a user operating the display device 10. The operator 13 faces the front surface of the display device 10 and imparts user information (intent) by, for example, movement of the hands or body (gestures). A user information analysis unit 201 (FIG. 3) built into the display device 10 acquires user information representing the attitude of a part of the body of the operator 13 represented by an image captured by the image capturing device 11. The user information includes, for example, information representing the shape of a hand, such as a pointing finger or fist, and the manner in which it is moved. The display device 10 executes processing of the user information acquired via the image capturing device 11. This enables operation of the processing of the display device by the operator, using the shape of a hand, such as a pointing finger or fist, and the manner in which it is moved.

In the display device 10, a region is established in which a person's position is set beforehand which is an operation-enabled region in which an operation by an operator is accepted. As the operation-enabled region, the display device 10 has set, for example, an upper limit (for example, 3 m) of an operation-enabled distance, which is the distance from the center part of the display device 10 to the position of the hand of the operator 13 in the front direction. However, the left and right directions of the operation-enabled region, for example, can be set to within the viewing angle of the image capturing device 11. In this case, the left-right direction setting is not necessary. The display device 10 does not accept an operation by an operation-blocked person who is more distant than the operation-enabled distance. The processing for distinguishing users from whom operation is accepted will be described later.

Although in the example shown in FIG. 1 the image capturing device 11 is installed at the lower side of the front surface of the display device 10, this is not a restriction. For example, the image capturing device 11 may be installed at the upper side of the front surface of the display device 10, or installed at a position removed from the display device 10.

The image capturing device 11 may be installed at a position higher than the face of the operator 13, particularly the height of the eyes. For this reason, the height of the image capturing device 11 is established beforehand, considering the height of the floor surface on which the operator 13 is located and the average height of a human. In addition, if the display device 10 is installed in a position that is relatively low, such as on a floor surface, the image capturing device 11 may be installed at a position higher than the display unit 12.

The foregoing enables the image capturing device 11 to capture a video representing the body of the operator 13 from a position higher than the face of the operator 13 and prevents the face of the operator 13 from being blocked by the shape of a hand, such as a pointing finger or fist, and the manner in which it is moved. For this reason, the control unit 22 can recognize an operator using the image of the operator's face, and can stably perform processing to detect the position of the face and detect operations. This processing will be described later.

Figure 2:
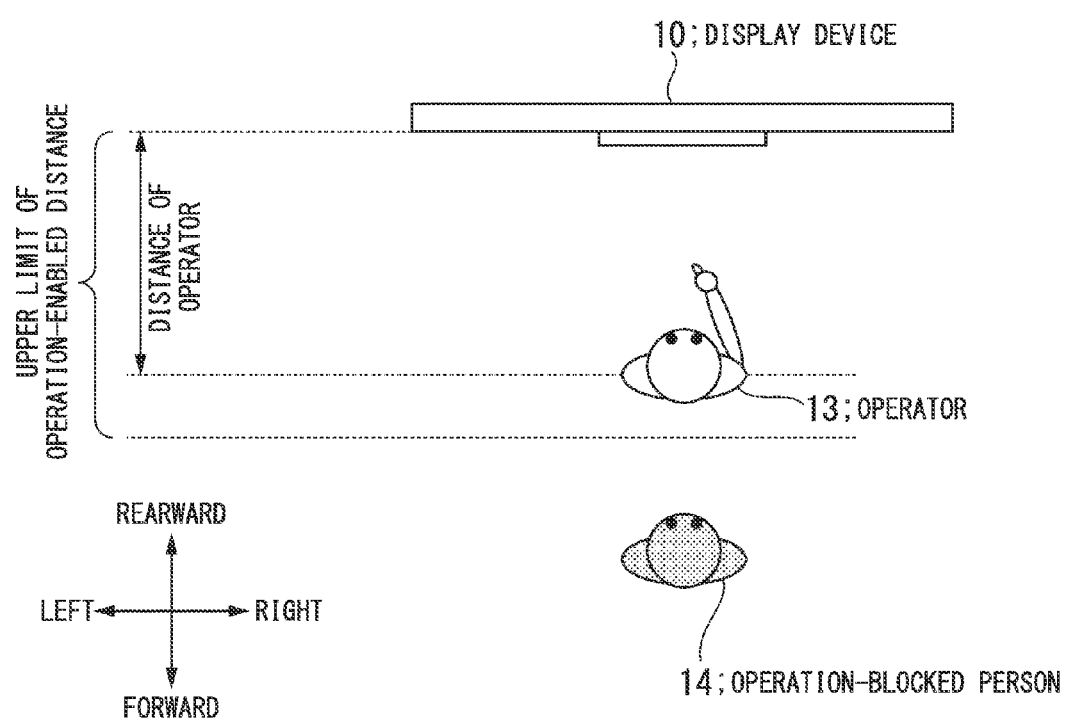
FIG. 2 is a plan view showing the positional relationship between users and the display device according to the above embodiment.

FIG. 2 is a plan view showing the positional relationship between users and the display device 10 according to the present embodiment.

In FIG. 2, the up and down directions represent the direction towards the rear of and the direction forward of the display device 10, respectively. This applies also to the positional relationships between the operator 13, the operation-blocked person 14, and the display device 10 indicated in FIG. 2. In this case, in FIG. 2, the operator 13 is in front of the display device 10 and is located at a position that is shorter (closer) than the upper limit of the operation-enabled distance from the display device 10. In contrast, the operation-blocked person 14 is in front of the display device 10 and is located at a position that is greater (more distant) than the upper limit of the operation-enabled distance from the display device 10.

As described above, by setting the operation-enabled distance (upper limit of the operation-enabled distance) the control unit 22 (FIG. 3) limits the opportunities for a plurality of users to make operations simultaneously and the opportunities for an image to be input that represents an operation other than the intended operation or for an operation to be misinterpreted (for example, hand motions of a passerby in the case of digital roadside signage). For example, it is possible to avoid processing not intended by a user of an image even if a plurality of users are using the display device 10 simultaneously, such as in with digital signage installed in a public location.

(Constitution of the Display Device)

Next, the constitution of the display device 10 according to the present embodiment will be described.

Figure 3:
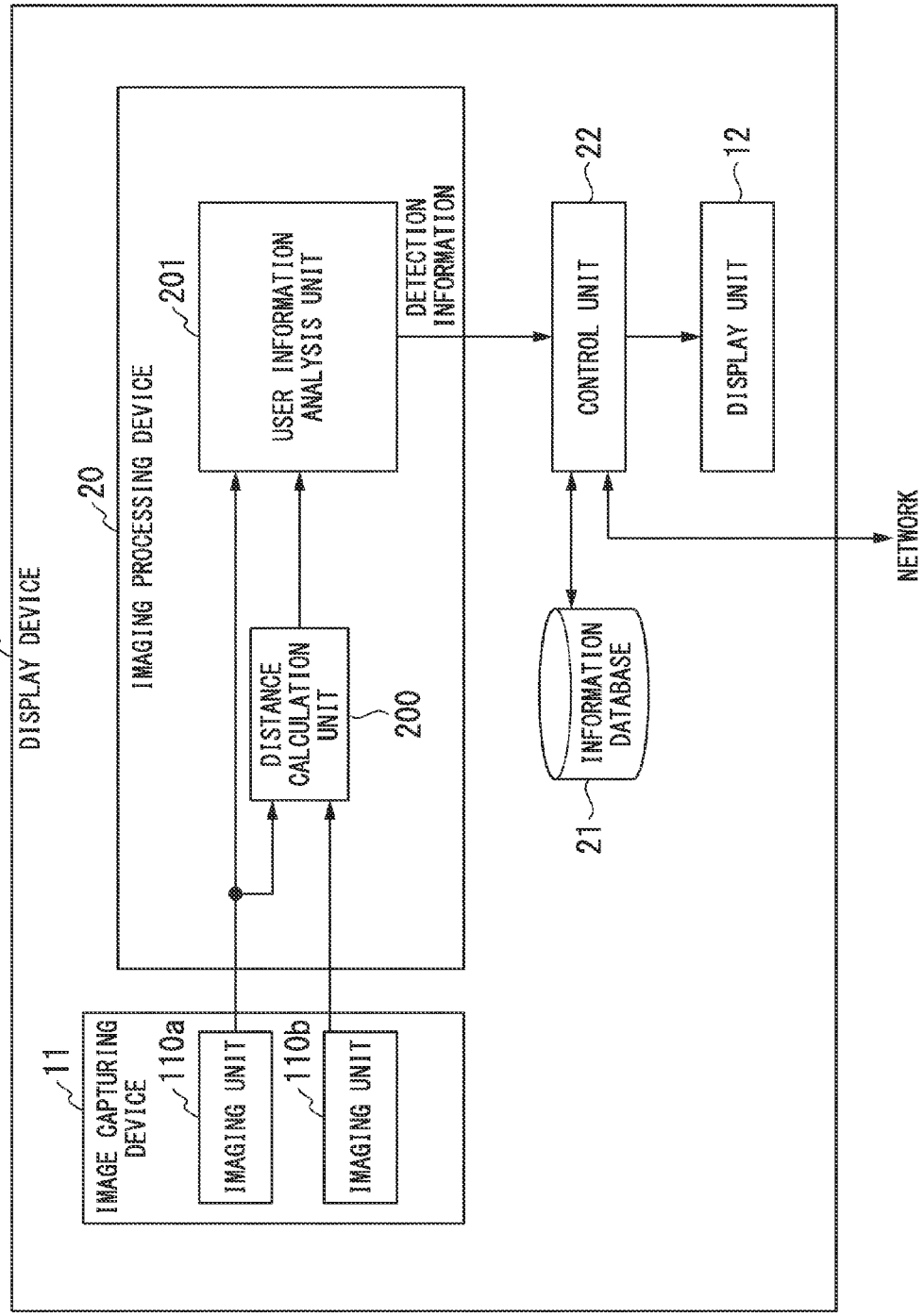
FIG. 3 is a block diagram showing the constitution of the display device according to the above-noted embodiment.

FIG. 3 is a block diagram showing the constitution of the display device 10 according to the present embodiment.

The display device 10 is constituted to include an image processing unit 20, an information database 21, a control unit 22, and a display unit 12. If the display device 10 includes the image processing unit 20, the information database 21, and the control unit 22 as a data input device, the image capturing device 11 and the display unit 12 can be separate units.

The image capturing device 11 generates a video signal representing a captured video and outputs the generated video signal to the image processing unit 20. The image processing unit 20 acquires operator information representing the operator distinguished based on the video signal input from the image capturing device 11, acquires first spatial information representing a position in which a part of the body of the operator is located, and acquires user information representing the shape of a part of the body of the operator. The image processing unit 20 outputs the acquired operator information, the first spatial information, and the user information as detection information to the control unit 22.

The information database 21 has stored therein display information to be displayed based on a video signal representing a video of the operator 13. The display information is, for example, a video signal representing, for example video content, text information representing news and the like, content information representing content received from a network, or a guidance image signal representing a guidance (operating guide) image. The details of the guidance image will be later.

The control unit 22 extracts the first spatial information and the user information from the detection information input from the image processing unit 20. If the position of the operator 13 represented by the extracted first spatial information is within the pre-established operation-enabled region, the control unit 22 performs processing corresponding to the extracted user information. In this case, for example, the control unit 22 judges whether or not the distance of the operator 13 indicated by the first spatial information is smaller than the upper limit of the operation-enabled distance set beforehand. Processing corresponding to the user information is, for example, processing related to various image displays, such as display of a guidance image or display of video content, information retrieval from a network, storage of image content or news related to retrieved information, and display of stored information.

The control unit 22 stores the information indicated by an instruction stored in the information database 21 as display information. The control unit 22 reads out from the information database 21 display information indicated by an instruction for display and outputs a video signal representing the read-out display information to the display unit 12. The control unit 22 stops output of the display information for which a stop instruction has been given.

The display unit 12 displays the video signal input from the control unit 22 as video, thereby displaying video content or news-related video selected by an operation by an operator 13, or displaying a guidance image.

By doing this, the information database 21 and the control unit 22 constitute a display control device (not shown) and execute processing to select content represented by user information included in the detected information input from the image processing unit 20 and processing to display the selected content.

The image capturing device 11 is constituted to include the imaging units 110*a* and 110*b*. The imaging units 110*a* and 110*b* generate video signals representing the captured video, and output the generated video signals to the image processing unit 20. The imaging unit 110*a* outputs the generated video signal to the user information analysis unit 201. The imaging units 110*a* and 110*b*, for example, are cameras having an optical system with lenses that collect light incident from a subject and imaging elements that convert the collected light to electrical signals. The imaging elements of the imaging units 110*a* and 110*b* are, for example, CCDs (charge-coupled devices), or CMOS (complementary metal oxide semiconductor) elements.

The image processing unit 20 is constituted to include the distance calculation 200 and the user information analysis unit 201.

Video signals are input to the distance calculation unit 200 from each of the imaging units 110*a* and 110*b*. The distance calculation unit 200 calculates distance information indicating the distance from the imaging device 11 to a subject (for example, the operator 13), based on each of the input video signals, using, for example, the stereo matching method.

(Distance Information Calculation)

At this point, the method of calculating distance information using block matching, which is a type of stereo matching, will be described. In stereo matching, the parallax value of the video captured by the imaging units 110*a* and 110*b* is calculated as the distance value. In the description that follows, an image at a certain point in time that is included in the video captured by the imaging unit 110*a* will be called the left image. The image at that point in time that is included in the video captured by the imaging unit 110*b* will be called the right image.

In stereo matching, a search is made for a right-image block, which is a region corresponding to a left-image block that is a partial region in the left image. The description herein will use the example of the left image and a right image captured simultaneously.

Figure 4:
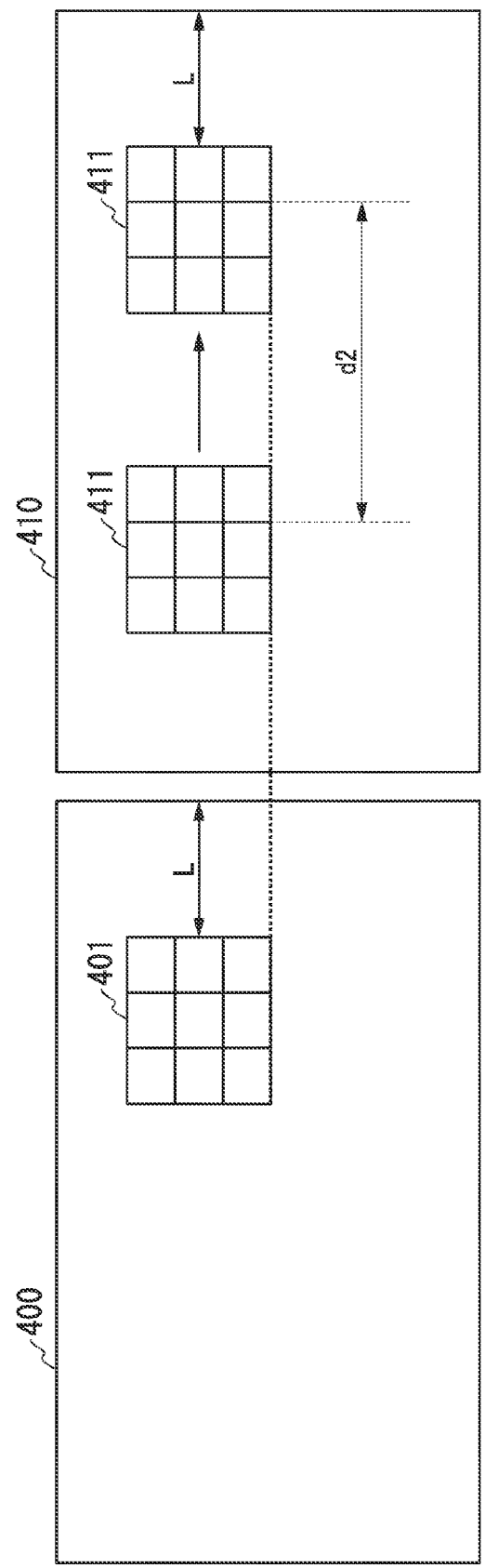
FIG. 4 is a conceptual drawing showing an example of the left image and the right image.

FIG. 4 is a conceptual drawing showing an example of the left image and the right image.

In FIG. 4, the left side shows the left image 400 and the right side shows the right image 410.

The distance calculation unit 200 sets a left-image block (window) 401 with the pixel-of-interest at its center in the left image 400. Each of a total of nine squares (three in the left-to-right direction and three in the top-to-bottom direction) included in the left-image block 401 represents a pixel. In FIG. 4, the distance in the horizontal direction from the right edge of the left image 400 to the right edge of the left-image block 401 is L pixels (the distance of L pixels), where L is an integer of 1 or larger.

In the right image 410, the distance calculation unit 200 sets a right-image block 411 having the same top-to-bottom direction coordinates as the left-image block 401 and having a right edge at a distance L+d2 from the right edge of the right image 410 as the initial value, in which d2 is a pre-established integer value of the maximum parallax value. The size and shape of the right-image block 411 are the same as of the left-image block 401.

The distance calculation unit 200 calculates an index value between the left-image block 401 and the right-image block 411. The distance calculation unit 200 shifts the position of the right image block 411 from its initial position until the right edge of the right-image block 411 is at a distance of L pixels from the right edge of the right image 410 and measures the index values at each of the positions. The distance calculation unit 200, based on the calculated index values, sets the right-image block 411 at the position that corresponds to the left-image block 401. If, for example, the SAD (sum of absolute difference) value is used as the index value, the right-image block 411 at a position at which the SAD value is minimum is set. This position is the position-of-interest corresponding to the pixel-of-interest in the left image 400. The absolute value of the difference in coordinates in the horizontal direction between the position-of-interest and the pixel-of-interest is the parallax. The distance calculation unit 200 executes this for each pixel included in the left image 400 and generates, as the distance information, parallax information (also known as a parallax map or a disparity map) indicating the parallax values for each pixel included in the video captured by the imaging unit 110a. The larger the parallax is, the shorter is the distance from the image capturing device 11 to the subject, and the smaller the parallax, the longer is the distance. The distance calculation unit 200 outputs the generated distance information to the user information analysis unit 201.

The parallax map is a bit map image converted to a gray scale, having, for each pixel, a parallax value expressed as an integer value represented by a pre-established number of bits (for example, for eight bits, from the minimum value of 0 to the maximum value of 255). The distance calculation unit 200 may, based on camera parameters, such as the baseline length, which is the spacing between the imaging unit 110a and the imaging unit 110b, convert the parallax to the distance in the subject space from the imaging device 11 to the subject and generate distance information indicating the converted distance. Therefore, the distance calculation unit 200 may generate, using as the distance information the parallax value for each pixel in place of the distance information indicating, a bit map image (depth map) that has been converted to a gray scale.

The imaging units 110a and 110b may be disposed at different coordinate values in the top-to-bottom direction, and the parallax may be calculated using captured images that indicate the images captured by each thereof. In this case, the distance calculation unit 200, using an image block in the image captured by either one of the imaging units 110a and 110b as a reference, can shift the image block in the image captured by the other upward and downward to search for the corresponding image block.

The distance calculation unit 200 uses, for example, Equation (1) when calculating the SAD value.

Equation 1

$$SAD = \sum_{i=0}^{8} (|X_i - X_{ai}|) \quad (1)$$

In Equation (1), $x_i$ is the pixel value for, for example, each green (G) pixel included in the left-image block 401, and total number 9 (which is the number when the i of the $X_i$ changes from 0 to 8) is an example of the number of pixels included in one image block. $X_i$ is a pixel value of each pixel included in the left-image block 401. The disposition of pixels corresponding to each of the pixel values $X_0$ to $X_8$ is arranged from the left edge to the right edge in each row and from the top to bottom from the uppermost row to the lowermost row as shown at the left-image block 401 of FIG. 5. The value $X_{ai}$, is the pixel value for each pixel included in the right-image block 411. The disposition of pixels corresponding to each of the pixel values $X_{a0}$ to $X_{a8}$ is arranged from the left edge to the right edge in each row and from the top to bottom from the uppermost row to the lowermost row as shown in the right-image block 411 of FIG. 5.

The index value is not restricted to being the SAD value. As long as it represents the correlation between pixel values included in the left-image block 401 and pixel values included in the right-image block 411, a different index value, such as the SSD (sum of squared differences) value or the DP (dynamic programming) value may be used.

The window size, which is the size of the left-image block 401 and the right-image block 411, is not restricted to being three pixels in the horizontal direction and three pixels in the top-to-bottom direction as described above. For example, it may be larger than noted above, such as five pixels in the horizontal direction and five pixels in the top-to-bottom direction or nine pixels in the horizontal direction and nine pixels in the top-to-bottom direction, and it may have center coordinates that are offset from the position-of-interest, such as with four pixels in the horizontal direction and four pixels in the top-to-bottom direction. The direction of shifting the right-image block 411 is not restricted to shifting from the left side to the right side, and may be from the right side to the left side. The pixels included in the left-image block 401 and the right-image block 411 are not restricted to being the signal value of the green (G) pixel as described above, and may be the signal value for a different color, for example red (R) pixel, and may also be a signal value of a pixel based on a different color system or an arbitrary combination thereof.

In the above-described block matching method, the coordinates of the left image 400 and the corresponding coordinates of the right image 410 are offset in the left-to-right direction and not offset in the top-to-bottom direction, and the epipolar lines of the left image 400 and the right image 410 were assumed to coincide. The disposition of the imaging units 110a and 110b the optical axes of which are parallel is done so that the epipolar lines (also called auxiliary lines) coincide. In order to make the epipolar lines coincide, coordinate transformation of the captured image signals may be performed so that the optical axes of the left image 400 and the right image 410 are parallel, based on the camera parameters of the imaging units 110a and 110b, which are acquired beforehand by the distance calculation unit 200. The processing to perform coordinate transformation is called rectification or deviation correction. After performing this processing, the distance calculation unit 200 generates distance information.

Figures 5, 6:
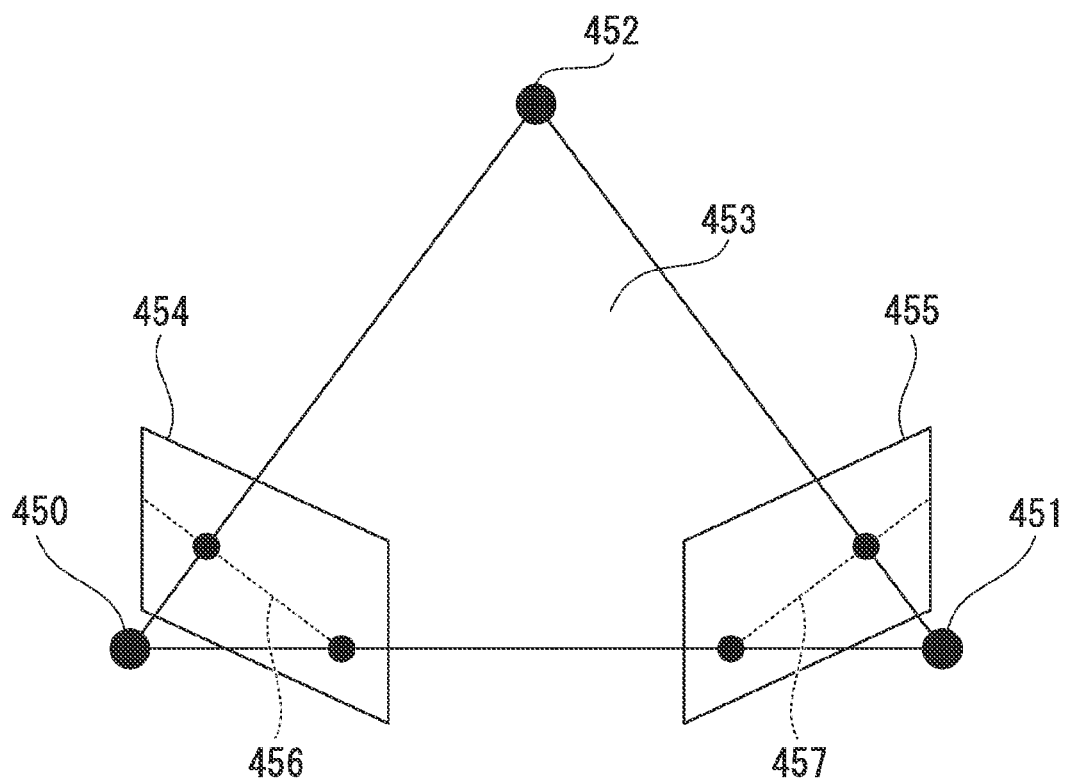
FIG. 5 is a conceptual drawing showing an example of image blocks.
FIG. 6 is a conceptual drawing showing the positional relationship of imaging planes.

The epipolar lines, as shown in FIG. 6, are the lines of intersection 456 and 457 between the epipolar plane 453 and the imaging planes 454 and 455 of the two imaging units 110a and 110b. The epipolar plane 453 is the plane passing through the three points, which are the focal points 450 and 451 of the lenses of the two imaging units 110a and 110b and a characteristic point 452 in the subject space.

If the imaging units 110a and 110b are disposed so that their optical axes are parallel, the epipolar lines 456 and 457 are horizontal lines with the same top-to-bottom direction coordinates in the left image 400 and the right image 410.

(User Information Analysis)

Next, the constitution of the user information analysis unit 201 will be described.

Figure 7:
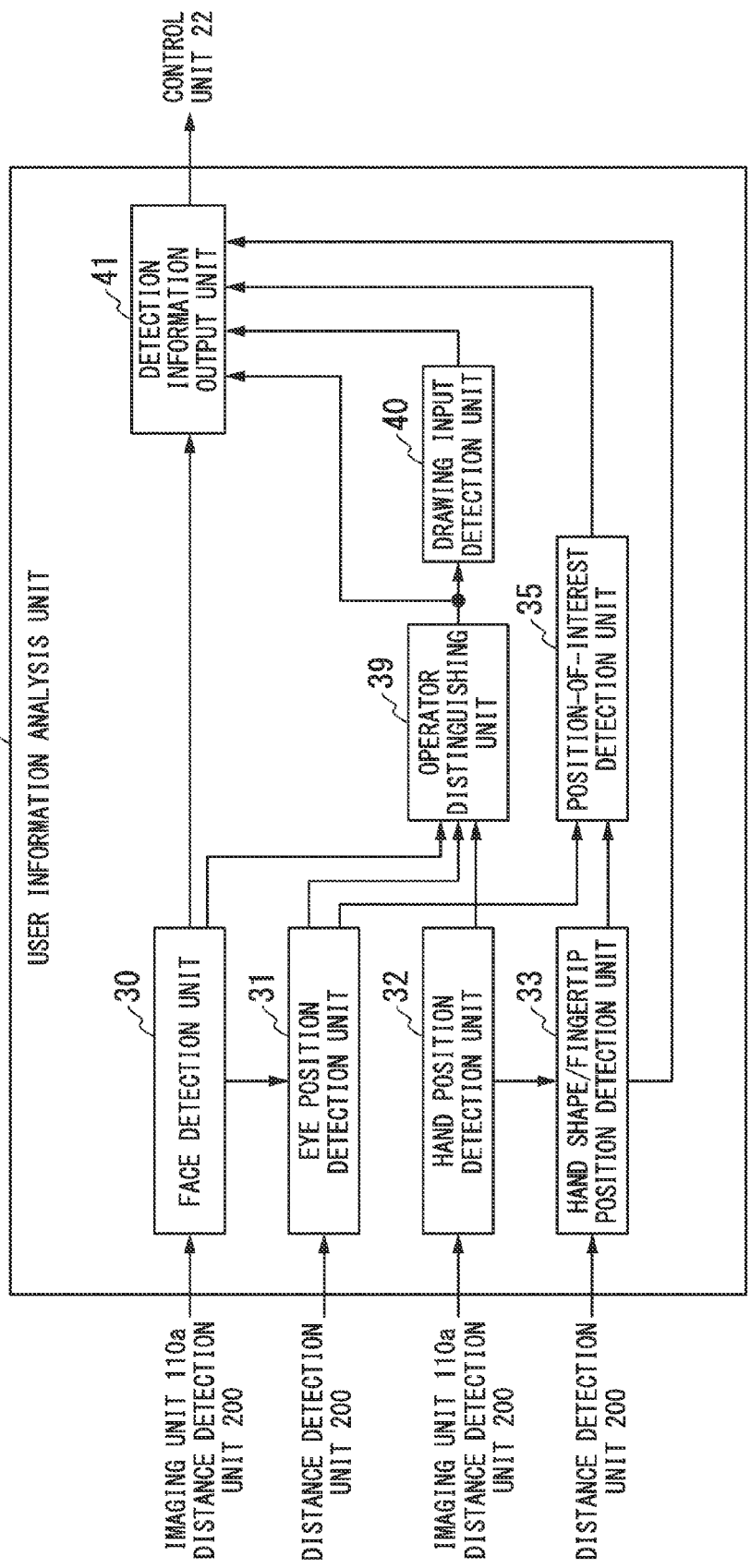
FIG. 7 is a simplified drawing showing the constitution of a user information analysis unit according to the above-noted embodiment.

FIG. 7 is a simplified drawing showing the constitution of the user information analysis unit 201.

The user information analysis unit 201 has a face detection unit 30, an eye position detection unit 31, a hand position detection unit 32, a hand shape/fingertip position detection unit 33, a position-of-interest detection unit 35, an operator distinguishing unit 39, a drawing input detection unit 40, and a detection information output unit 41.

(User Face Detection)

The face detection unit 30, detects the region representing the image of the face of the operator represented by the video signal input from the imaging unit 110a. The face detection unit 30 generates two-dimensional face region information, which indicates the two-dimensional coordinates of a representative point (for example, the point at the center-of-gravity) in the detected face region or the two-dimensional coordinates of the upper, lower, left, and right edges of that region. From the distance information input from the distance calculation unit 200, the face detection unit 30 extracts the distance value regarding the pixels in two dimensions represented by the two-dimensional face region information. The face detection unit 30 transforms the distance values corresponding to the above-described two-dimensional coordinates to three-dimensional coordinates in the subject space, and generates three-dimensional face position information.

To detect the face region, the face detection unit 30, for example, extracts from the input image signal a pixel in a range of color signal values that represents a pre-established facial coloration (for example, complexion).

The face detection unit 30 may also have a storage unit into which is stored beforehand a gradation (monochrome) signal representing a human face. In this case, the face detection unit 30 calculates for each image block having a plurality of pixels the correlation values between the gradation image signal read out from the storage unit and the input image signal and detects the image block as the face region if the calculated correlation value is greater than a pre-established threshold.

Additionally, the face detection unit 30 may calculate a feature (for example, a Haar-Like feature) based on the input image signal, and detect the face region by performing pre-established processing (for example, the Adaboost algorithm) based on the calculated feature. The method used by the face detection unit 30 to detect the face region is not restricted to the methods described above, and may be any method, as long as it is enables detection of the face region from the input image signal.

The face detection unit 30 outputs a face image signal representing the detected face image to the characteristic information analysis unit 34 and to the eye position detection unit 31. The face detection unit 30 outputs the generated three-dimensional face position information and the two-dimensional face region information to the operator distinguishing unit 39. The face detection unit 30 outputs the generated three-dimensional face position information as a part of the detection information to the detection information output unit 41.

(Eye Position Detection)

The eye position detection unit 31 detects the eye regions from an image of the face represented by the face image signal input from the face detection unit 30. The eye position detection unit 31 calculates the two-dimensional eye position coordinates, which are representative points (for example, points of the center-of-gravity) of the detected eye regions. The eye position detection unit 31 extracts the distance values of pixels located in the detected eye position coordinates from the distance information input from the distance information calculation unit 200. The eye position detection unit 31 transforms the sets of calculated two-dimensional eye position coordinates and extracted distance values to three-dimensional eye position coordinates in the subject space and generates three-dimensional eye position information. The eye position detection unit 31 outputs the three-dimensional eye position information representing the calculated three-dimensional eye position coordinates to the position-of-interest detection unit 35 and the operator distinguishing unit 39. The eye position detection unit 31 outputs an eye region signal representing the image of the detected eye region and the two-dimensional eye position information representing the calculated two-dimensional eye position coordinates to the operator distinguishing unit 39.

In order to detect the eye region, the eye position detection unit 31 has, for example, a storage unit into which a pre-captured eye template image has been stored. The eye position detection unit 31 may read out the eye template image from the storage unit and perform template matching to compare between the read-out template image and the input face image signal. The eye position detection unit 31 may, of the face region represented by the input face image signal, use the eye position information indicating the eye positional relationship to an already set face (for example, the already measured face region and the positions of both eyes) to detect the eye regions. The eye position detection unit 31 may calculate a feature (for example, a Haar-Like feature) based on the input face image signal and detect the eye regions by performing pre-established distinguishing processing (for example, the Adaboost algorithm) based on the calculated feature.

The method used by the eye position detection unit 31 to detect the eye region is not restricted to those described above, and any method can be used, as long as it is a method for detecting the eye region from the face image signal.

The eye position detection unit 31 may output as the detected eye region the left eye or right eye position or an eye region signal that represents all of these, regardless of center-of-gravity of the two eyes.

(Hand Position Detection)

The hand position detection unit 32 detects a region representing an image of an operator's hand that is represented by a video signal input from the imaging unit 110*a* and calculates the detected hand position.

In order to detect the region representing the image of the hand, the hand position detection unit 32, for example, extracts a pixel in a range of color signal values that represents a pre-established hand surface coloration (for example, complexion) from the input image signal. The hand position detection unit 32 calculates as the hand position the two-dimensional coordinate values of a representative point (for example, the center-of-gravity) of the region representing the detected image of the hand. The hand position detection unit 32 extracts the distance value corresponding to the calculated coordinate values from the distance information input from the distance calculation unit 200, transforms the set of distance values corresponding to the calculated two-dimensional coordinate values to three-dimensional coordinates in the subject space, and generates three-dimensional hand position information. The hand position detection unit 32 outputs a hand image signal representing the detected hand region image and hand position information representing the calculated two-dimensional coordinate values of the representative point to the hand shape/fingertip position detection unit 33. The hand position detection unit 32 outputs the hand position information to the operator distinguishing unit 39.

The hand position detection unit 32 may generate the hand image signal and the hand position information without distinguishing between the left and right hands, and may distinguish between the left and right hands in generating the hand image signal and the hand position information.

In order to detect the region representing the hand image, the hand position detection unit 32 may, based on the distance information input from the distance detection unit 200, extract an image within a distance range represented by pre-established starting and ending points in the depth direction, which is referenced to a three-dimensional face position represented by three-dimensional face position information input from the face detection unit 30, as a region representing an image of the hand from the image signal input from the imaging unit 110*a*. The pre-established distance range is, for example, forward (the display device 12 side) from the three-dimensional face position. This enables preventing of the recognition of the hand another person either in front of or behind the operator rather than the hand of the operator.

(Hand Shape/Fingertip Position Detection)

The hand shape/fingertip position detection unit 33 detects the hand shape based on a hand image signal and hand position information input from the hand position detection unit 32.

In order to detect the hand shape, the hand shape/fingertip position detection unit 33 detects the contour part of the hand by performing, for example, edge extraction processing from the hand image signal. The hand shape/fingertip position detection unit 33 searches the extracted contour part for protruding parts having a radius of curvature within a pre-established range (for example, 6 to 12 mm) as the finger region image. In this search, the hand shape/fingertip position detection unit 33 judges the whether or not the above-noted protruding part exists within the searching region of a prescribed radius from a representative point indicated by the hand position information, and updates the searching region concentrically by successively changing the radius. The hand shape/fingertip position detection unit 33 counts the number of fingers, based on the detected finger region. The hand shape/fingertip position detection unit 33 detects the vertices of the detected protruding parts as the two-dimensional coordinates of the fingertip positions of each finger. The hand shape/fingertip detection unit 33 extracts from the distance information input from the distance calculation unit 200 the distance value of a pixel located in two-dimensional coordinates at the prescribed fingertip. The hand shape/fingertip position detection unit 33 generates three-dimensional fingertip position information that represents a set of extracted distance values and the two-dimensional coordinates of the fingertip as the three-dimensional coordinates in the subject space. The hand shape/fingertip position detection unit 33 outputs the generated three-dimensional fingertip position information to the position-of-interest detection unit 35. The hand shape/fingertip position detection unit 33 outputs as a part of the detection information to the detection information output unit 37 a finger image signal representing the detected finger region, finger count information representing the number of fingers, and the two-dimensional finger position information representing the two-dimensional coordinates of the fingertip. Because they are information for indicating the hand shape, the finger image signal, the finger count information, and the two-dimensional fingertip position information or a combination thereof are collectively called hand shape information.

In addition, the method used by the hand shape/fingertip position detection unit 33 to detect the hand shape information is not restricted to those described above, and any method can be used, as long as it is a method for detecting, from a hand image signal, the hand shape information like a finger image signal or a fingertip position information.

(Position-of-Interest Detection)

The processing to detect the position-of-interest will now be described. The position-of-interest is a position noticed or estimated to be noticed by an operator, based on three-dimensional eye position information.

The position-of-interest detection unit 35 detects the position-of-interest based on the three-dimensional eye position information input form the eye position detection unit 31 and the three-dimensional fingertip position information input from the hand shape/fingertip position detection unit 33.

The position-of-interest detection unit 35, for example, establishes a reference position, based on an eye position represented by three-dimensional eye position information. The position-of-interest detection unit 35 may establish the position of either eye as the reference position, or may establish the center-of-gravity point of the positions of both eyes as the reference position. It may also establish beforehand one of the eyes as the dominant eye of the operator. Although the description below is for the case in which the center-of-gravity of the positions of both eyes is established as the reference position, the present embodiment is not restricted to that.

The position-of-interest detection unit 35 calculates as the position-of-interest the pint of intersection between a straight line extending from the reference position to a position indicated by the three-dimensional fingertip position and the display plane of the display unit 12. That is, the position-of-interest detection unit 35 detects the position on the display plane corresponding to the fingertip position as the position-of-interest. This position-of-interest is the position pointed to by the fingertip of the operator on the display plane of the display unit 12. The position indicated by the three-dimensional fingertip position information is called the specified position.

The position-of-interest detection unit 35 converts the calculated position-of-interest to the two-dimensional image coordinate system on the display plane of the display unit 12 and generates position-of-interest information indicating the converted position-of-interest. The position-of-interest detection unit 35 outputs the generated position-of-interest information to the detection information output unit 41 as a part of the detection information.

By doing the above, the operator indicates the position-of-interest on a line extending from the operator's hand (specified position detected as the position-of-interest), centered about the operator's eye position (reference position detected as the position-of-interest), enabling easy drawing at that position.

Also, the shape of the operator's hand indicating the position-of-interest can be any hand shape, such as the shape of an open hand, the shape of a hand with the index finger extended, or the shape of a closed hand, as long as it enables acquisition of three-dimensional fingertip position information.

(Operator Distinguishing)

Next, a method for distinguishing an operator will be described.

The operator distinguishing unit 39, based on the three-dimensional face position information input from the face detection unit 30, distinguishes as an operator a user existing in a region that is within a pre-established operation-enabled distance from among users whose face regions have been detected (refer to FIG. 1 and FIG. 2). The operator distinguishing unit 39, for example, distinguishes as an operator a user whose face exists at a position at a distance from the imaging device 11 shorter than an upper limit of the operation-enabled distance that is pre-established by the distance indicated by the three-dimensional face position information. This distinguishes the operator from among users whose faces have been detected by the face detection unit 30. In contrast, the operator distinguishing unit 39 distinguishes a user existing outside the pre-established operation-enabled distance as an operation-blocked person.

The operator distinguishing unit 39 judges whether or not another part of the body (for example, the hand) of a user existing in the operation-enabled region exists in the operation detection range. In this case, the operator distinguishing unit 39 judges whether or not a position indicated by the three-dimensional hand position information input from the hand position detection unit 32 is included in the operation detection region. The operation detection region is included in the operation-enabled region and is within a range from the reference position (for example, the position of one eye or center point between the eyes) based on the position of one part of the user's body (for example, the eyes). The operator distinguishing unit 39, for example, establishes the referenced position based on the three-dimensional face position information input from the face detection unit 30 and the three-dimensional eye position information input from the eye position detection unit 31 and establishes the operation detection region based on the established reference position. In the following description, the position indicated by this three-dimensional hand position information is called the specified position. From the three-dimensional hand position information input from the hand position detection unit 32, the operator distinguishing unit 39 selects three-dimensional hand position information indicating a position that is judges to be included in the operation-enable region.

The operator distinguishing unit 39 may limit the number of regions included in the operation-enabled region to one (exclusion control). In this case, if the specified position is judged to be within the range of the operation detection region, the operator distinguishing unit 39 judges that a user that has caused another part of the body (for example, a hand) to be at that position is an operator 13. In this case, the operator distinguishing unit 39, based on the detection information regarding that operator, outputs to the detection information output unit 41 an operation start signal indicating that an operation has started. For example, by establishing the operation detection region in this manner, the operator distinguishing unit 39 judges as an operator a user who has moved another part of the body (for example, the front of the face) into that region.

If the specified position indicated by the three-dimensional hand position information input from the hand position detection unit 32 is removed to outside the operation detection region, the operator distinguishing unit 39 judges that the operator has ended the operation. In this case, the operator distinguishing unit 39, based on the detection information regarding that operator, outputs to the detection information output unit 41 an operation end signal indicating that the operation has ended. That is, with regard to a given operator, from the operator distinguishing unit 39 outputs to the detection information output unit 41 the operation start signal until the time it outputs thereto the operation end signal, the display device 10 accepts operation input based on the shape of the hand of the user judged to be the operator. Even if a representative point indicated by the hand position of another user is within the range of the operating starting detection region, during this period an operation is not accepted from other users.

If there is a plurality of other users having a part of their bodies in the operation-enabled region, the operator distinguishing unit 39 may judge as the operator 13 one user whose specified position represented by the hand position is the closest to the center of the of the operation detection region. This enables the display device 10 to accept operation input from only one new operator and not accept operation input from two users simultaneously. This avoids acceptance of operations from a plurality of people simultaneously, and accepts operations from only on operator.

The operator distinguishing unit 39 outputs the drawing input detection unit (hand input detection unit) 40 three-dimensional position information selected as operation detection region information indicating an operation detection region regarding a user judged to be an operator.

(Drawing Input Detection)

Next, the processing to detect drawing by an operator will be described.

The drawing input detection unit 40 establishes an input detection region based on operation detection region information input from the operator distinguishing unit 39. The input detection region is included in the operation detection region indicated by the operation detection region information and is the region in which the position of drawing input is detected. The drawing input detection unit 40, for example, establishes as the input detection region of the operation detection region a region that is deeper than the rearward value of another part of the operator's body (for example, an eye).

The drawing input detection unit 40 detects whether or not drawing input was made, based on the established input detection region and on the specified position indicated by the three-dimensional hand position information input from the operator distinguishing unit 39. If the specified position indicated by the three-dimensional hand position information is included in the input detection region, the drawing input detection unit 40 detects that a drawing input has been made. If the specified position is not included in the input detection region, the drawing input detection unit 40 detects that the drawing input has not been made. This detects drawing done by an operator. The drawing input detection unit 40 generates a drawing detection signal indicating whether or not drawing input was detected and outputs the generated drawing detection signal to the detection information output unit 41.

Detection information from each of the face detection unit 30, operator distinguishing unit 30, drawing input detection unit 40, position-of-interest detection unit 35, and the hand shape/fingertip position detection unit 33 is input to the detection information output unit 41. In this case, the detection information output unit 41 outputs to the control unit 22 position-of-interest information input form the position-of-interest detection unit 35 and the drawing detection signal input from the drawing input detection unit 40.

If an operation start signal is input from the operator distinguishing unit 39, the detection information output unit 41 outputs to the control unit 22 detection information of an operator related the input operation start signal. If an operation end signal is input from the operator distinguishing unit 39, the detection information output unit 41 ends output detection information of the operator related to the input operation end signal. The user information analysis unit 201 is not restricted to the method and features noted above, and information related to a user feature and to an operation indicated by a user may be detected based on the input video signal.

(Input Detection Region Example)

Next, an example of the input detection range will be described. The example to be described is that of the input detection region established based on the positions of both eyes and the position of the face of the operator 13.

Figure 8:
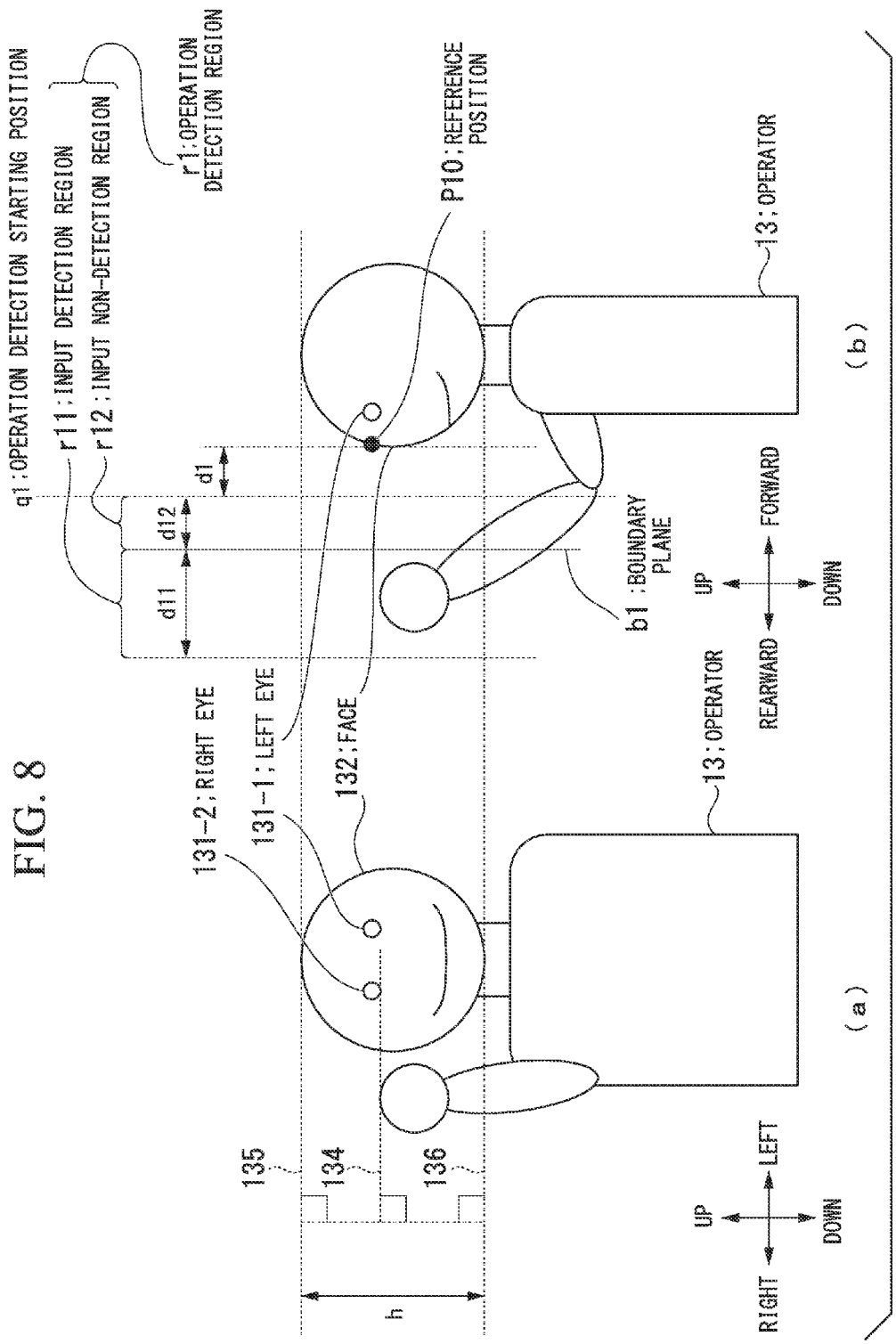
FIG. 8 is a conceptual drawing showing an example of an input detection region according to the above-noted embodiment.

FIG. 8 is a conceptual drawing showing one example of an input detection region according to the present embodiment.

FIG. 8(*a*) is a front view of the operator 13.

The input detection region r11 is, for example, a region including the line segment 134 joining the left eye 1311 and the right eye 131-2 of the operator 13 and indicating the height of the eyes. The range h in the up-down direction of the input detection region' r11 is, for example, a range surrounded by the line segment 135 that is parallel to the line segment 134 and tangent to the upper edge of the face 132 and the line segment 136 that is parallel to the line segment 134 and tangent to the lower edge of the face 132. In this example, the up-down range of the input detection region r1 is equal to the up-down range of the operation detection region r1.

FIG. 8(b) shows the left side of the operator 13.

The rearward direction range of the operation detection region r1 is, with the reference position P10 at the frontmost part of the face 132, the range from the position forward (rearward) by a pre-established distance d1 from that position up until a position still forward by a pre-established distance d11+d12. In this case, the position forward by the pre-established distance d1 from the frontmost part of the face 132 is called the operation detection starting position q1. The range in the rearward direction of the input detection region r1 is the range from a position forward by d1+d12 from the frontmost part of the face 132 further forward by a pre-established distance d11. That is, the region of the range from a position forward of the frontmost part of the face 132 by the pre-established distance d1 further forward by the pre-established distance d12 is the input non-detection region r12. That is, the input non-detection region is part of the operation detection region r1 but is a region in which positions at which drawing is done are not detected. The boundary plane b1 is a boundary plane delineating between the input detection region r11 and the input non-detection region r12.

(Operation Detection when an Operator is Reclining)

The example shown in FIG. 8 was premised on a posture in which the line joining both eyes, which are parts of the operator's body was parallel to the floor surface (for example, when standing up). However, the operator does not necessarily take such a posture, and might, for example, be reclining on the floor surface. In a case such as that as well, the operator distinguishing unit 39, by establishing the operation detection region as described above and judging the operator 13, can make a stable judgment regardless of the posture of the operator and can avoid erroneous detection. This is described below.

Figure 9:
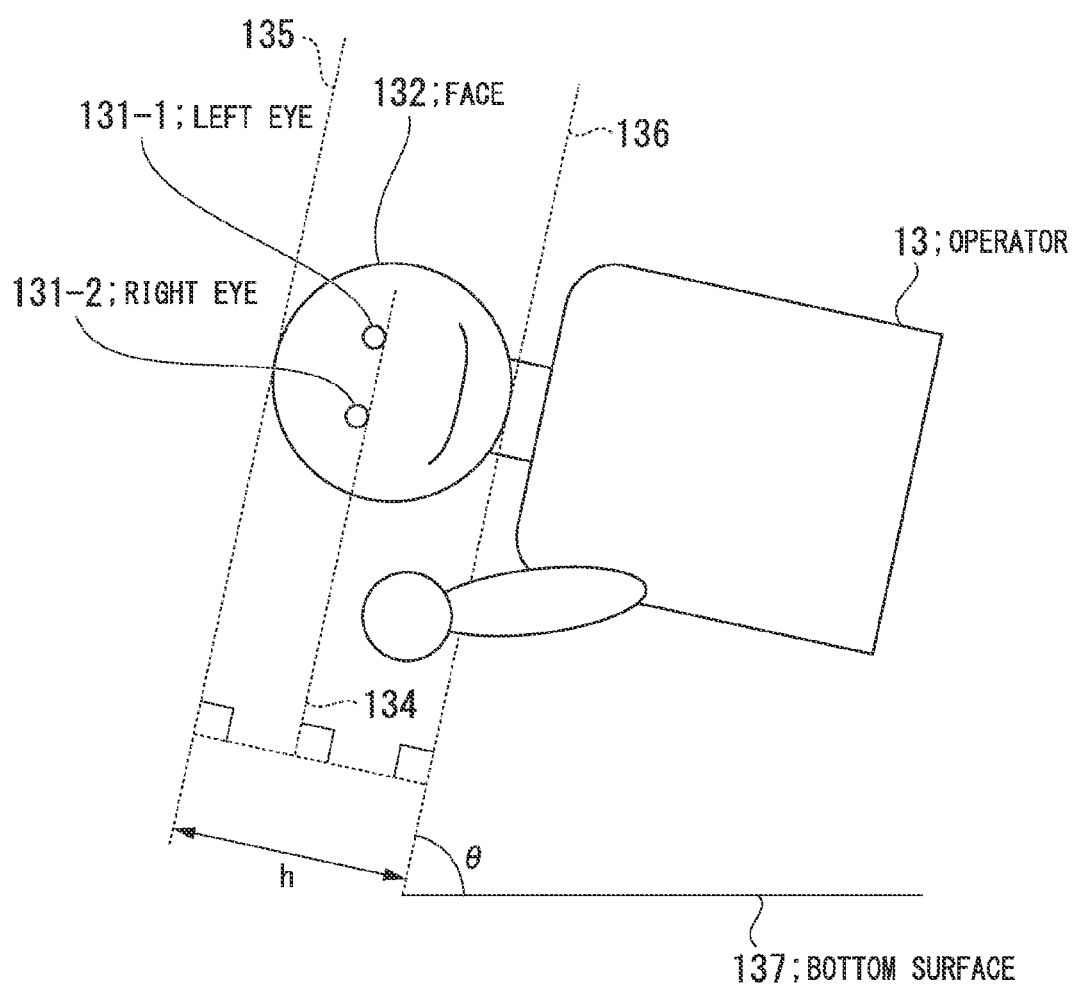
FIG. 9 is a conceptual drawing showing an example of an operation detection region according to the above-noted embodiment.

FIG. 9 is a conceptual drawing showing an example showing an example of an operation detection region according to the present embodiment.

FIG. 9 shows an example in which the operator 13 is reclining on a floor surface 137. In this case, the angle θ formed between the line segment 134 joining the left eye 131-1 and the right eye 131-2 and the floor surface 137 is closer to 90° than to 0° (for example, 70°).

In this case, the operator distinguishing unit 39, based on the three-dimensional eye position information input from the eye position detection unit 31, establishes the line segment 134 joining the left eye 131-1 and the right eye 131-2. The operator distinguishing unit 39, based on the three-dimensional face region information input from the face detection unit 30, establishes the line segment 135 that is parallel to the line segment 134 and tangent to the upper edge of the face and the line segment 136 parallel to the line segment 134 and that is tangent to the lower edge of the face. The operator distinguishing unit 39 establishes the width h of the operation detection region r1 sandwiched between the line segment 135 and the line segment 136. This operation detection region r1 is merely in a different direction from that shown in FIG. 8. The operator distinguishing unit 39 can make the rearward direction of the operation detection region the same as described above, and can establish the direction perpendicular to the face 132 as the rearward direction.

In this manner, the operator distinguishing unit 39 can establish the operation detection region r1 based on the position of the face, which is a part of the body of the operator 13. This distinguishes an operator from which an operation is to be accepted, based on the positional relationship with a hand, which is another part of the body making a drawing input and, by extension, establishes the input detection region.

Next, another example of an input detection region will be described. In the next example to be shown, the input detection region is established based on the position of two eyes of the operator 13 and the display region of the display unit 12.

Figure 10:
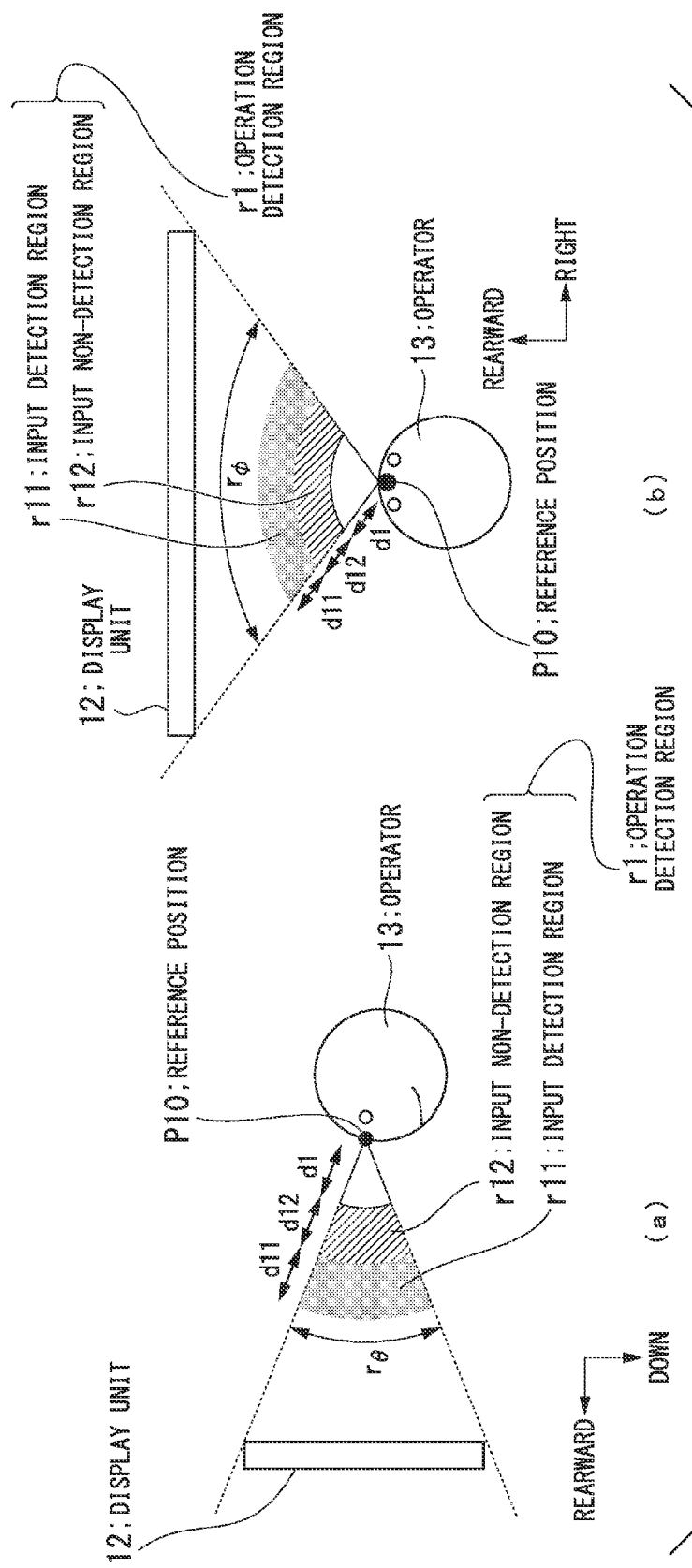
FIG. 10 is a conceptual drawing showing another example of an input detection region according to the above-noted embodiment.

FIG. 10 is a conceptual drawing showing another example of an input detection region according to the present embodiment.

FIG. 10(a) shows the left side of the operator 13. In FIG. 10(a), the up-down directions and left-right directions relative to the paper indicate, respectively, the up-down directions and left-right direction with respect to the operator 13.

In FIG. 10(a), the input detection region r11 is shown as a filled-in part. The input detection region r11 is a region (rearward direction operation region) having a distance that is equal to or farther than d1+d12 in the rearward direction from the reference position P10 and a distance that is equal to or closer than d1+d11+d12 from the reference position P10. The angle of elevation range $r_\theta$ of the input detection region r11 is a range (up-down direction operation range $r_\theta$) formed, with the reference position P10 at the vertex, between a line segment to the upper edge of the display unit 12 and a line segment to the lower edge of the display unit 12.

The operation detection range r1 is the combination of the input detection range r11 and the input non-detection range r12 established looking in the rearward direction from the reference position P10. The input non-detection region r12 is shown filled with hatching lines. The input non-detection region r12 is a region having a distance equal to or greater than the pre-established d1 from the reference position P10 and equal to or less than the distance d1+d12 from the reference position P10.

FIG. 10(b) shows the top surface of the operator 13. In FIG. 10(b), the up-down and left-right directions with respect to the paper indicate, respectively, the front-rear and left-right directions with respect to the operator 13.

In FIG. 10(b), the range $r_\phi$ of the input detection region r11 in the azimuth direction is, with the reference position P10 as the vertex, the angle formed by the line segment from that vertex to the left edge of the display unit 12 and the line segment from that vertex to the right edge of the display unit 12 (the left-right direction operating range $r_\phi$). The azimuth direction range $r_\phi$ of the input non-detection region r12 is similar to the azimuth direction range $r_\phi$ of the input detection region r11.

This establishes the input detection region of the display unit 12 to match the viewing angle (picture angle) that is matched to the display region of the display device 12 recognized from the operator. The established input detection region is not a cube, but rather is a shape in which a plane parallel to the display plane of the display device 12 gradually becomes larger as it approaches from the operator 13 to the display unit 12 (with increasing distance in the rearward direction from the operator 13). By instructing the position-of-interest in accordance with the field of view of the operator, the operator can intuitively draw to that position-of-interest.

(Example of the Position of Interest)

Next, an example of the position-of-interest will be described. The example to be shown next is one of the position-of-interest established based on the position of the eyes and the position of the hand of the operator 13.

Figure 11:
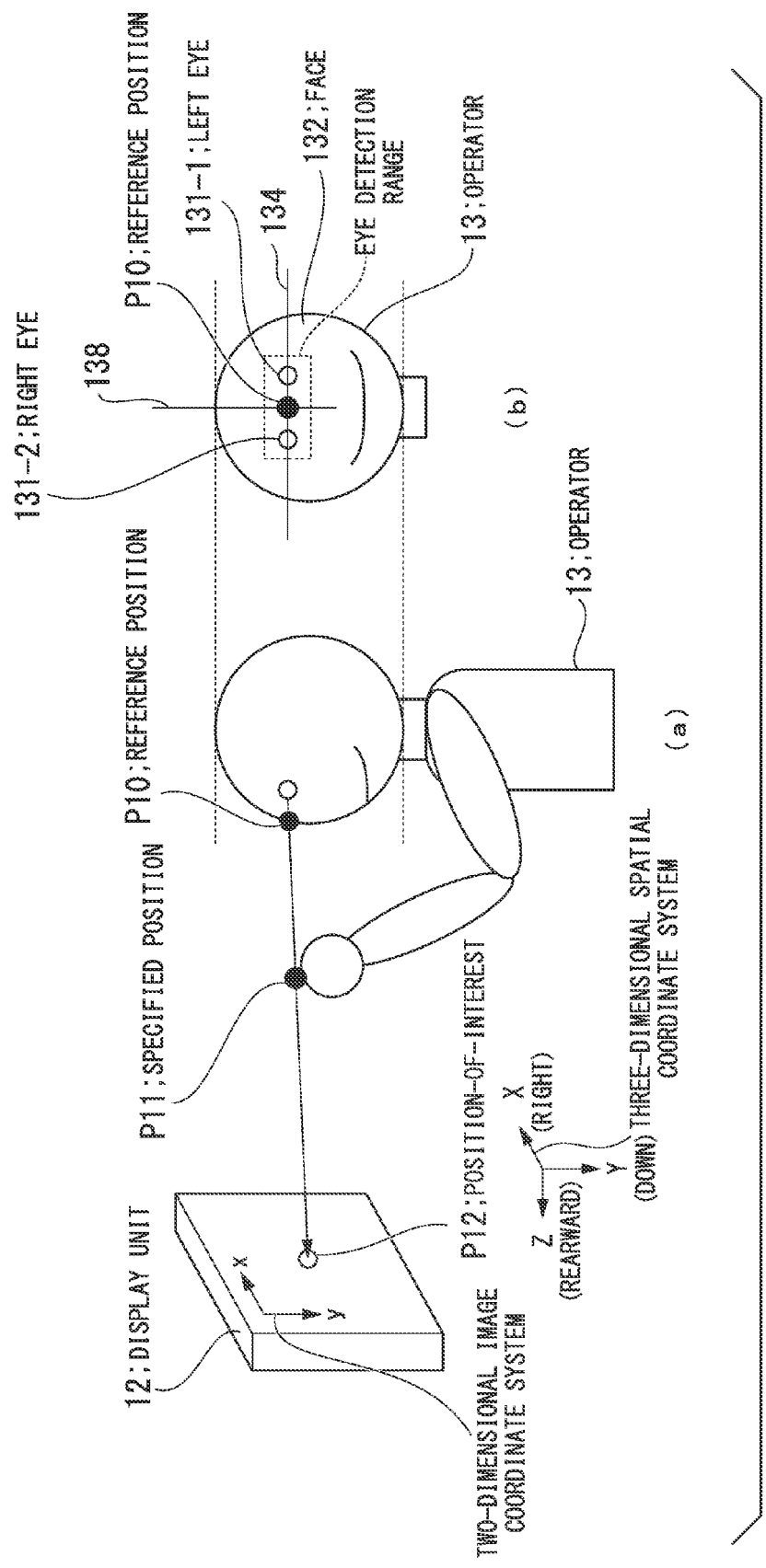
FIG. 11 is a conceptual drawing showing an example of a position-of-interest.

FIG. 11 is a conceptual drawing showing an example of the position-of-interest.

FIG. 11(*a*) shows the left side of the operator 13.

In FIG. 11(*a*), the left direction and the down direction with respect to the paper indicate, respectively, the Z direction (rear) and the Y direction (down) in the three-dimensional spatial coordinate system, and the rightward inclined direction indicates the X direction (right). On the display plane of the display unit 12, the directions to the right at an inclination and downward indicate, respectively, the x direction (right) and the y direction (down) in the two-dimensional image coordinate system. The position-of-interest P12 is calculated as the intersection point of the line segment joining the reference position P10 and the specified position P11 projected on the front of the display unit 12. The reference position P10, the specified position P11, and the position-of-interest P12 are represented by coordinate values in the three-dimensional spatial coordinate system. The position-of-interest detection unit 35 converts the position-of-interest represented by coordinate values in the three-dimensional spatial coordinate system to coordinate values in the two-dimensional image coordinate system on the display plane of the display unit 12.

FIG. 11(*b*) shows that the reference position P10 exists in front of the center point between the position of the left eye 131-1 and the position of the right eye 131-2, and that the center point and the reference position P10 are in the median plane of the operator 13. The position of the left eye 131-1 and the position of the right eye 131-2 are both given in the three-dimensional spatial coordinate system.

(Operation Control)

Next, the constitution of the control unit 22 will be described.

The control unit 22, from the detection information input from the detection information output unit 41, extracts three-dimensional face position information, hand shape information (finger image information, number of fingers information, and two-dimensional fingertip position information), feature information, position-of-interest information, and a drawing detection signal. The control unit 22 performs processing based on the extracted information. Of the extracted information, the hand shape information representing the shape of the hand is constitution by a finger image signal, number of fingers information, and the two-dimensional fingertip position. The hand shape information may be information that represents the momentary or stopped shape of the hand, that is, the attitude thereof, and may represent the change of the shape of the hand with time, that is, the movement thereof.

Figure 12:
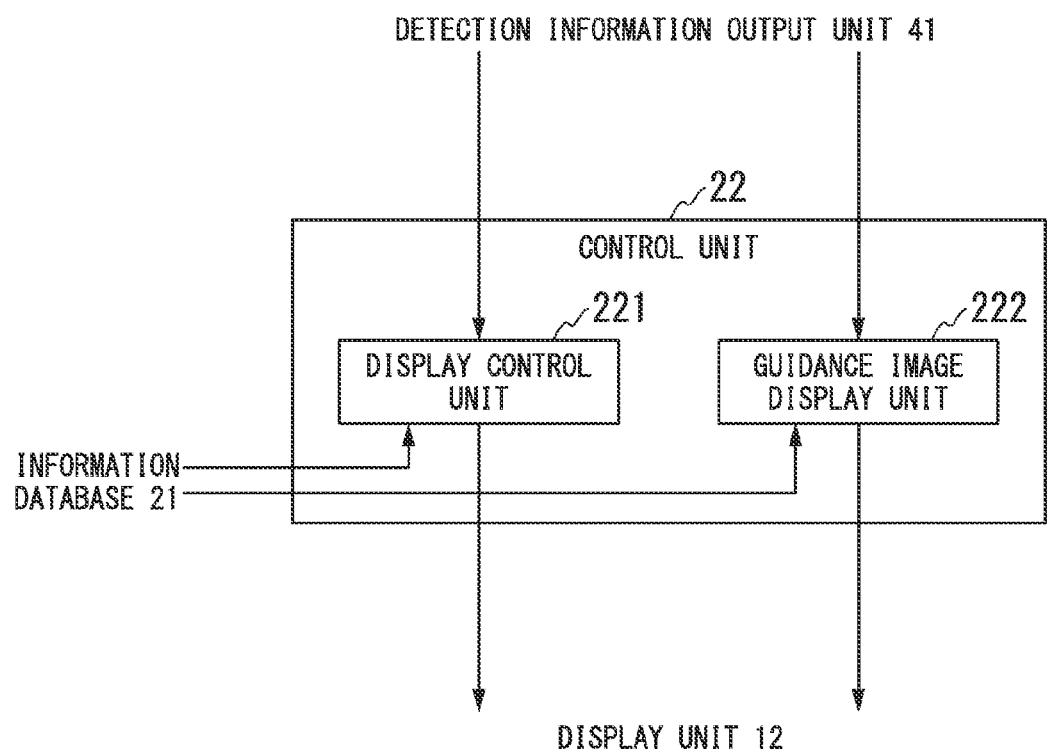
FIG. 12 is a simplified drawing showing the constitution of the control unit 22 according to the above-noted embodiment.

FIG. 12 is a simplified drawing showing the constitution of the control unit 22 according to the present embodiment.

The control unit 22 has a display control unit 221 (image forming unit) 221 and a guidance image display unit 222.

(Drawing Display Control)

If the extracted drawing detection signal indicates that a drawing input has been detected, the display control unit 221 forms an image of the trace as the position-of-interest indicated by the position-of-interest information moves, and generates an image signal indicating the formed image. The image of the trace is formed by adding to a dot plotting every amount of time, in accordance with the movement of the position-of-interest accompanying the elapse of time.

In this case, the display control unit 221 senses starting information or stopping information, based on the extracted hand shape information. The starting information gives an instruction to start the formation of an image. The stopping information gives an instruction to stop the formation of an image. Hand shape information indicating different shapes of the hand is stored into the information database 21 beforehand, in association with starting information and formation stopping information. For example, the formation starting information is associated with hand shape information indicating that the index finger is extended and the remaining fingers are made into a fist. The formation ending information is associated with hand shape information indicating that the five fingers are extended, with mutually neighboring fingers in contact. In this case, if the display control unit 221 succeeds in reading out starting information corresponding to the hand shape information input from the information database 21, it judges that formation starting information has been sensed, and if the readout of formation stopping information succeeds, it judges that formation stopping information has been sensed. After sensing the formation starting information, the display control unit 221 forms an image indicating the trace of the position-of-interest until the formation stopping information is sensed, and generates an image signal indicating the formed image. The formation starting information and the formation stopping information is information that divides a single image (frame) into regions, and is separate from the drawing detection signal that indicates whether or not the above-described drawing input has been detected and an operation start signal that indicates that a certain operator has started an operation or the operation end signal that indicates that the operator ended an operation. The display control unit 221 outputs the generated image signal to the display unit 12.

The image formed by the display control unit 221 is, for example, an image of the position-of-interest, displayed in pixel units. This is not a restriction, as long as the position of interest is indicated. The display control unit 221 may generate an image signal indicating an image in which an input detection image (cursor) is overlaid onto the trace of the position-of-interest. The position at which the input detection image is overlaid may be the current (newest) position-of-interest. The shape of the input detection image is not limited to being a geometric shape such as a square or a circle, and can be the shape of the hand or a face image (or even a photo of the face of the operator), or an avatar image. Given this, an input detection image signal indicating the input detection image is stored into the information database beforehand, and the display control unit 221 reads out the input detection image signal from the information database 21.

If the extracted drawing detection signal indicates that drawing input was not detected, because the trace of the position-of-interest was not added to, the display control unit 221 does not change the image thereof from the last time it was added to. Even in such cases, the display control unit 221 may overlay the input detection image of the already-formed position-of-interest image onto the position-of-interest. The position of the overlay is not restricted to being the position-of-interest, and may be a pre-established position.

If the drawing detection signal indicates that drawing input has been detected, the display control unit 221 may use an input detection image having a different form. The input detection image used when position-of-interest information is input may be of a form that is more noticeable that the input detection image used when position-of-interest information is not input (active display). A form that is noticeable is one, for example, with brighter luminance, that is flashing (a change of luminance every fixed time interval), or that has a color different from other images. If a face image is used as the input detection image, the image may be the image in the situation of drawing or writing.

The above enables the operator to visually recognize whether or not the position-of-interest input has been detected and also the position-of-interest that has been input, as an image.

(Guidance Image Display)

A guidance image signal is stored into the information database 21 beforehand. The guidance image signal indicates a guidance image representing a graphic or characters that provide guidance to the operator regarding operation to make input of the position-of-interest. The guidance image display unit 222 reads out the guidance image signal from the information database 21 and outputs the read-out guidance image signal to the display unit 12.

The control unit 22 may have a storage unit into which hand shape information is associated with each type of target processing beforehand. The control unit 22 reads out the hand shape information from the storage unit and compares the read-out hand shape information with the input hand shape information. The control unit 22 executes processing corresponding to hand shape information for which the comparison succeeded.

The shape of the hand can be a shape that enables identification as an instruction corresponding to a type of processing in the display device 10. For example, it may be the number of extended fingers, the direction of the hand, or a shape in which the tip of the thumb and the tip of the index finger are touched together. The present embodiment is not restricted to the hand shape as another part of the body of the operator, and a part other than the hand, for example, the shape of a leg, may be used.

(Input of Point of Interest Information)

Next, an example of the operation of the display device 10 when position-of-interest information is input will be described.

Figure 13:
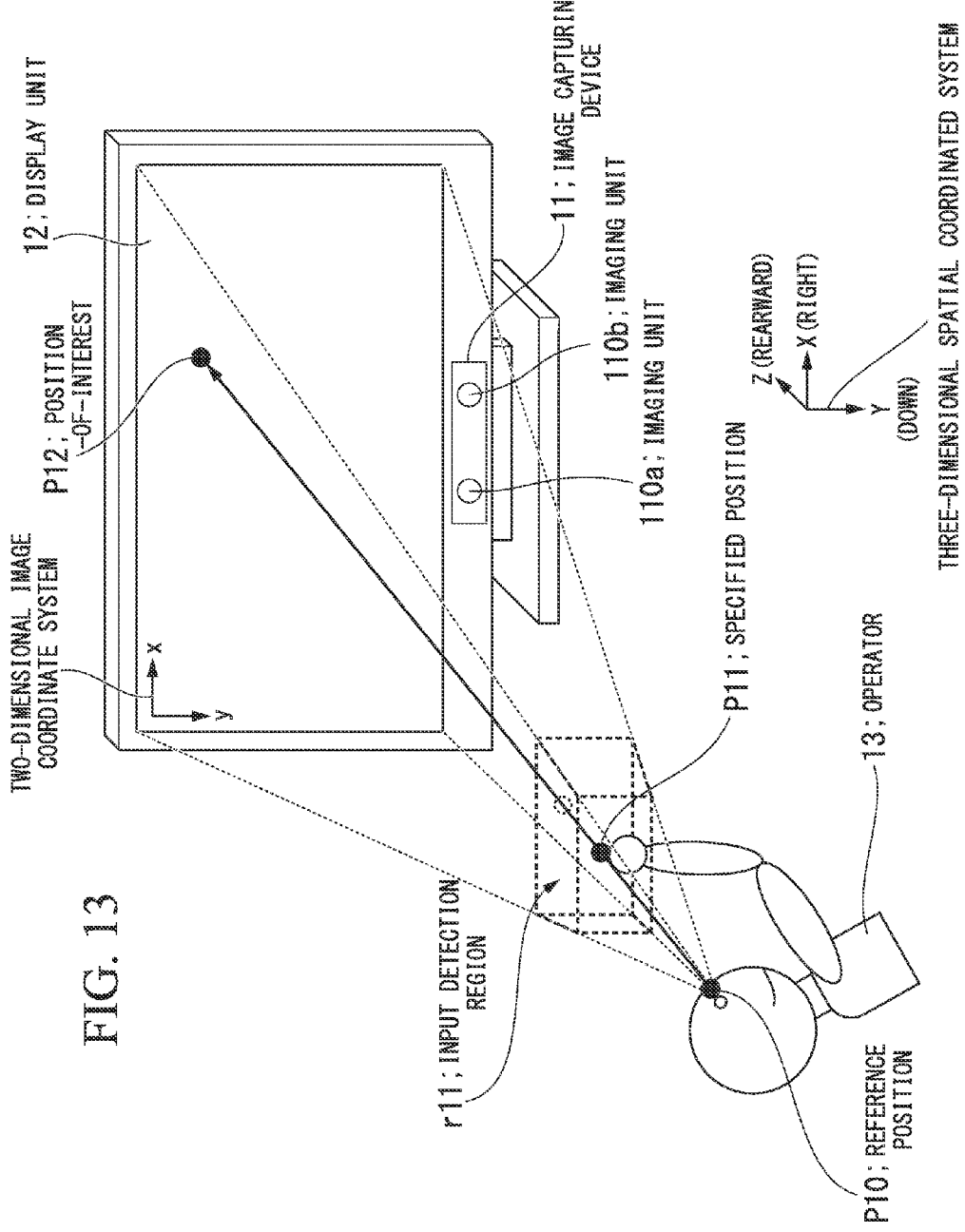
FIG. 13 is a conceptual drawing showing an example of the operation of the display device according to the above-noted embodiment.

FIG. 13 is a conceptual drawing showing an example of the operation of the display device 10 according to the present embodiment.

In FIG. 13, the right and downward directions indicate the X direction (right) and the Y direction (down) in the three-dimensional spatial coordinate system and the right upward inclined direction indicates the Z direction (rearward). In the display plane of the display unit 12, rightward and downward indicate, respectively, the x direction (right) and the y direction (down) in the two-dimensional image coordinate system.

In this example, the reference position P10 is close to the front of the center-of-gravity of the positions of the two eyes of the operator 13. The specified position P11 is the position of the tip of the right hand of the operator. The triangular frustum shown by the broken lines indicates the input detection region r11. Because the specified position P11 is included in the input detection region r11, it is detected as drawing input. The position-of-interest P12 is calculated as the point of intersection between the straight line from the reference position P10 to the specified position P11 and the display plane of the display unit 12. The calculated position-of-interest P12 is converted from the three-dimensional spatial coordinate system to two-dimensional image coordinate system on the display plane. At that instant, the display unit 12 plots as a point the position-of-interest P12 that has been coordinate-converted. Therefore, the display unit 12 displays an image of the trace of the position-of-interest in accordance with the elapse of time, as long as the specified position P11 is included in the input detection region r11.

(Image Display Example)

Next, an example of an image display on the display unit 12 will be described. This image can be said to be handwriting by the operator by making drawing input (handwritten input).

Figure 14:
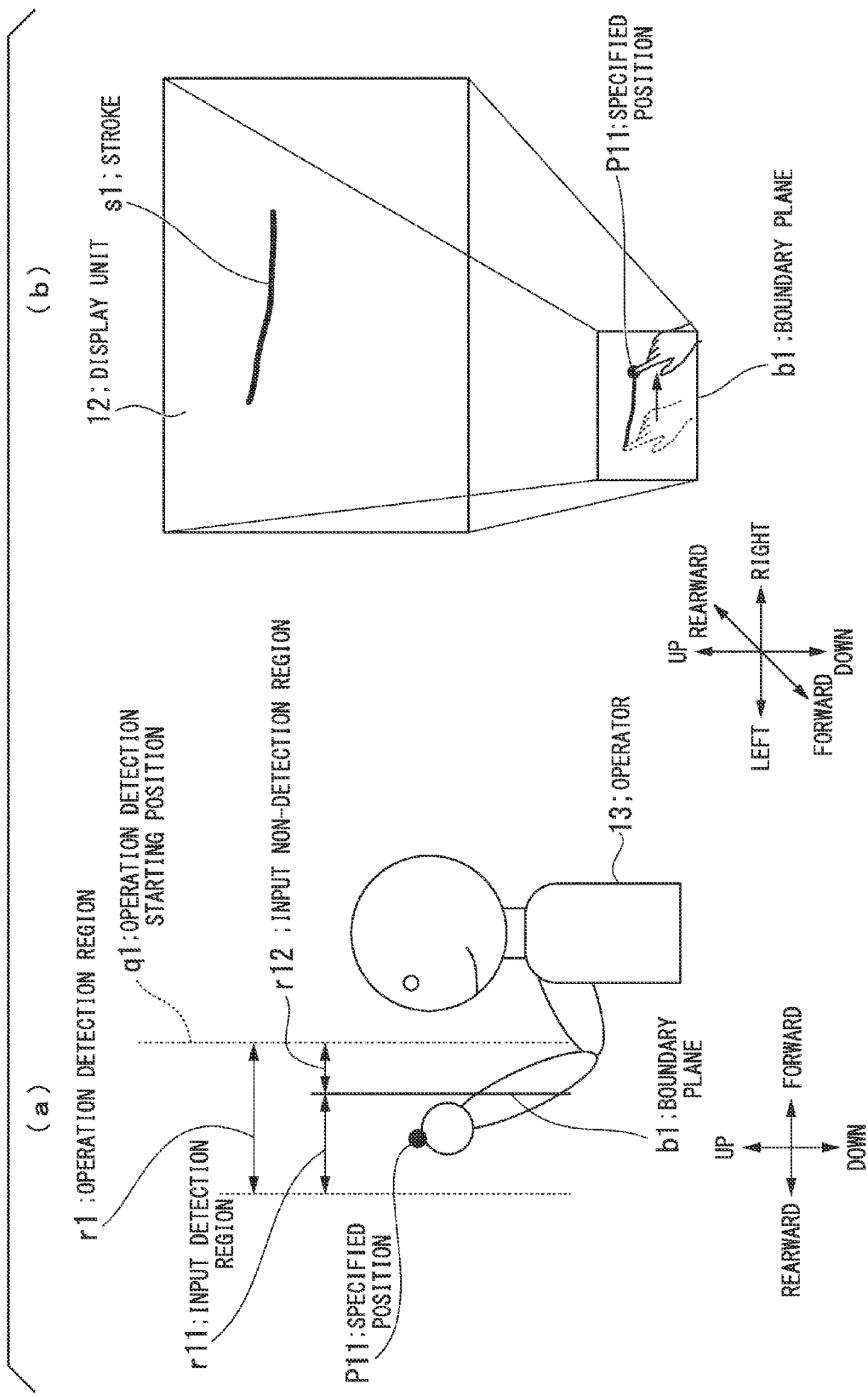
FIG. 14 is a conceptual drawing showing an example of the display of an image in the above-noted embodiment.

FIG. 14 is a conceptual drawing showing an example of the display of an image in the present embodiment.

In FIG. 14(a), the positional relationship between the operator 13 and the input detection region r11 is the same as in FIG. 8(b). In this example, the specified position P11 is shown as being included in the input detection region r11. In FIG. 14(b), the positional relationship between the input detection region r11 delineated by the boundary plane b1 and the display unit 12 is the same as in FIG. 13. In this example, the specified position P11 is farther rearward than the boundary plane b1. The stroke s1 is shown being displayed on the display unit 12 in response to the specified position P11 move from left to right within the input detection region r11. A stroke corresponds to one segment of a line (that is, a stroke) that is spatially continuous. That is, the stroke s1 is the trace of the position-of-interest P12 that has moved from the left to the right.

Figure 15:
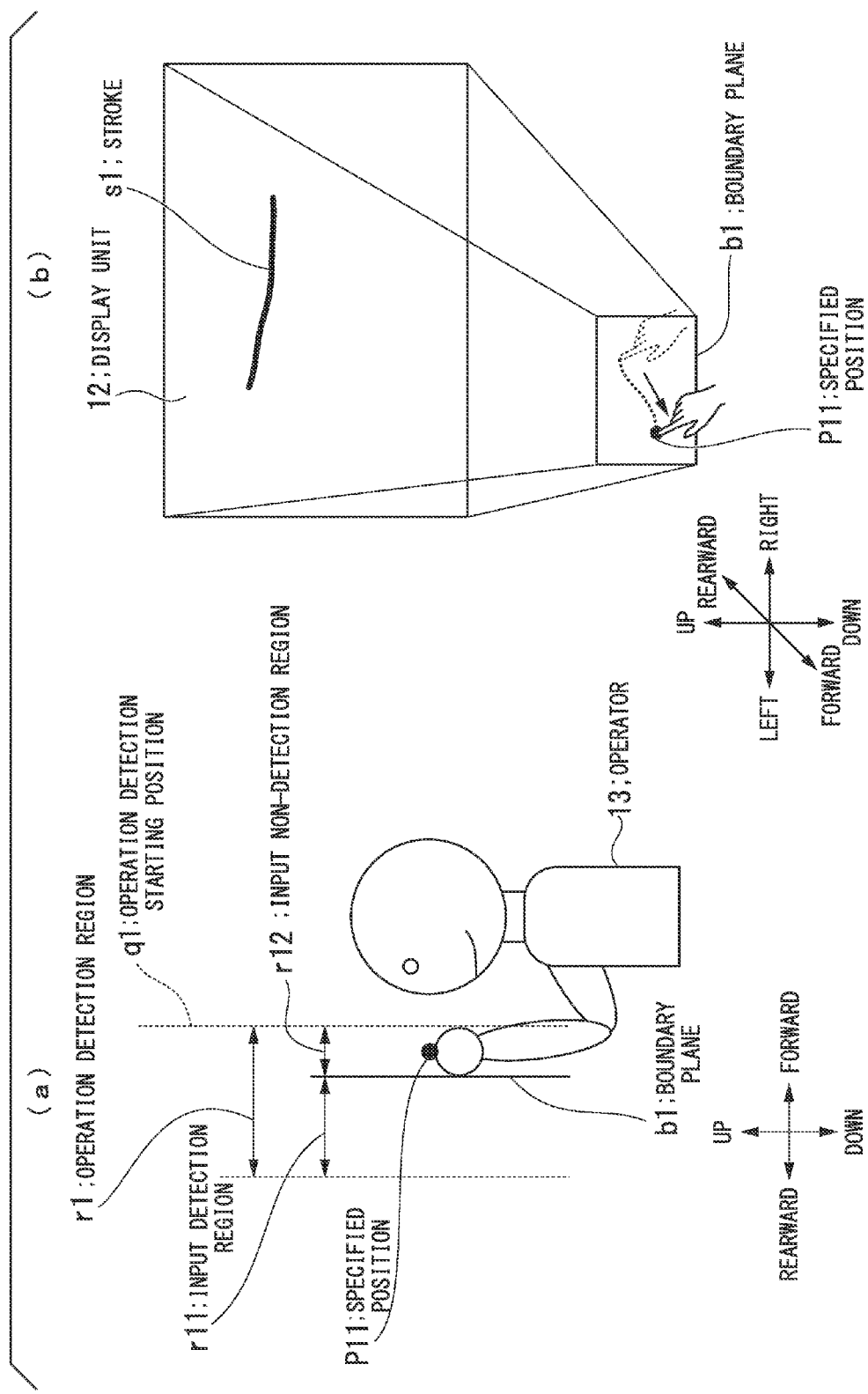
FIG. 15 is a conceptual drawing showing another example of the display of an image in the above-noted embodiment.

FIG. 15 is a conceptual drawing showing another example of the display of an image in the present embodiment.

In FIG. 15(a), the positional relationship between the operator 13 and the input detection region r11 is the same as in FIG. 14(a). This example, the specified position P11 is not included in the input detection region r11, but included in the input non-detection region r12. In FIG. 15(b), the positional relationship between the input detection region delineated by the boundary plane b1 and the display unit 12 is the same as in FIG. 14(b). In this example, the specified position P11 is farther forward from the boundary plane b1. Because the specified position P11 moves from the upper right to the lower left within the input non-detection region r12, a new stroke is not displayed in addition to the stroke s1 on the display unit 12. That is, after completion of the display of the previous stroke, before going into the next stroke the operator 13 can move his or her finger into a region such that the specified position P11 moves out of the input detection region r11.

Figure 16:
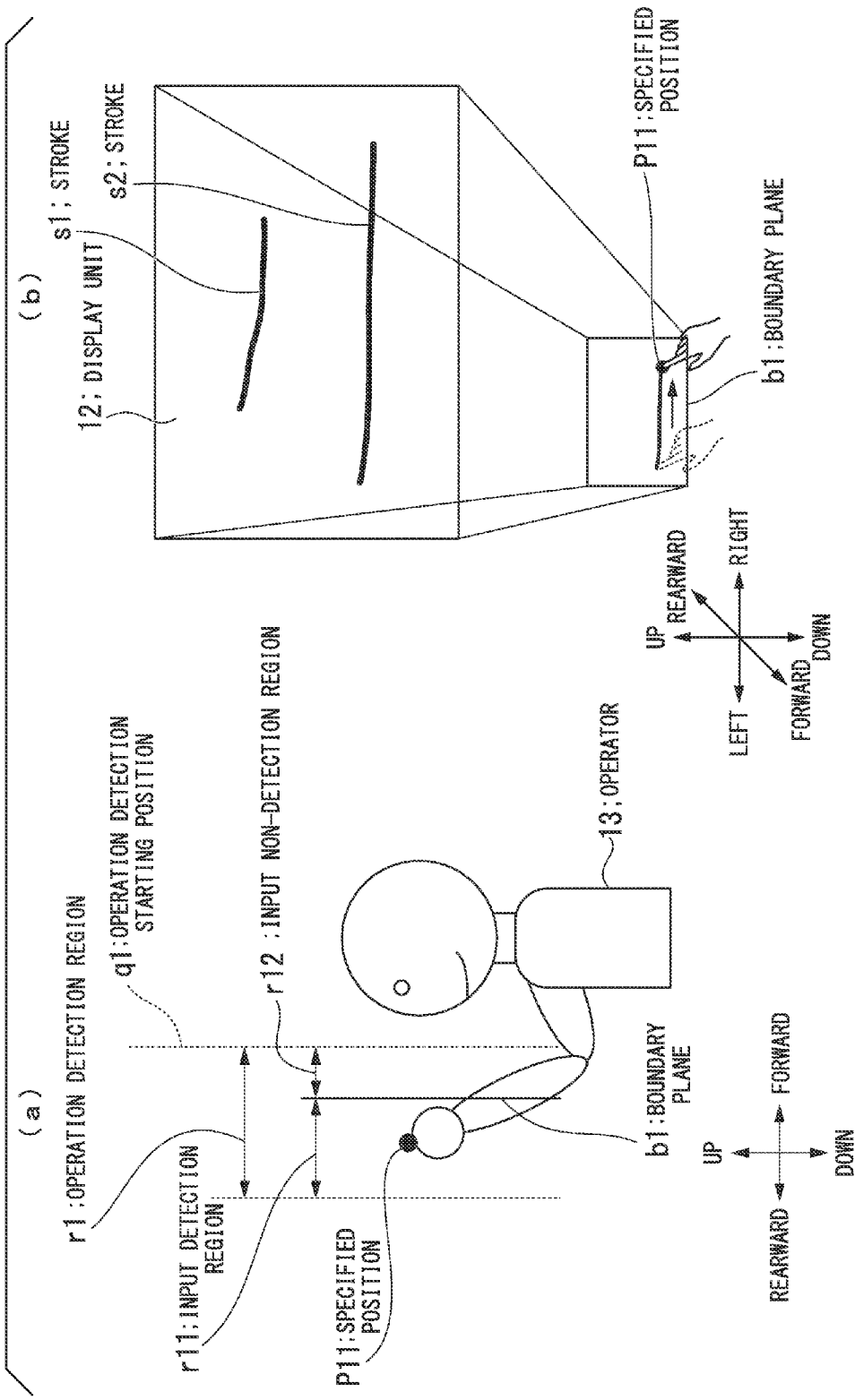
FIG. 16 is a conceptual drawing showing yet another example of the display of an image in the above-noted embodiment.

FIG. 16 is a conceptual drawing showing yet another example of the display of an image in the present embodiment.

In FIG. 16, the positional relationship between the operator 13 and the input detection region r11 is the same as in FIG. 15(a). This examples shows the specified position P11 as being included in the input detection region r11. In FIG. 16(b), the positional relationship between the input detection region r11 delineated by the boundary plane b1 and the display unit 12 is the same as in FIG. 15(b). In this example, the specified position P11 is farther to the rear than the boundary plane b1. Because the specified position P11 moves from the left to the right within the input detection region r11, a new stroke s2 is displayed on the display unit 12. That is, this shows that the operator, when inputting the next stroke, can move his or her finger within a region so that the specified position P11 is within the input detection region r11.

That is, by the operator 13 either moving the specified position P11 within the input detection region r11 or moving outside that region, each stroke is delineated and input. The selective use of the regions can be achieved by changing the position of the hand, which is another part of the body. Doing this enables the input of characters having a plurality of strokes or images having complex shapes by simple operations. Additionally, although FIG. 14 to FIG. 16 showed the example of inputting the kanji character for "two," the present embodiment enables the easy input line drawings that form graphics and symbols.

(Input Detection Image Display Example)

Next, an example of the display of an input detection image will be described.

Figure 17:
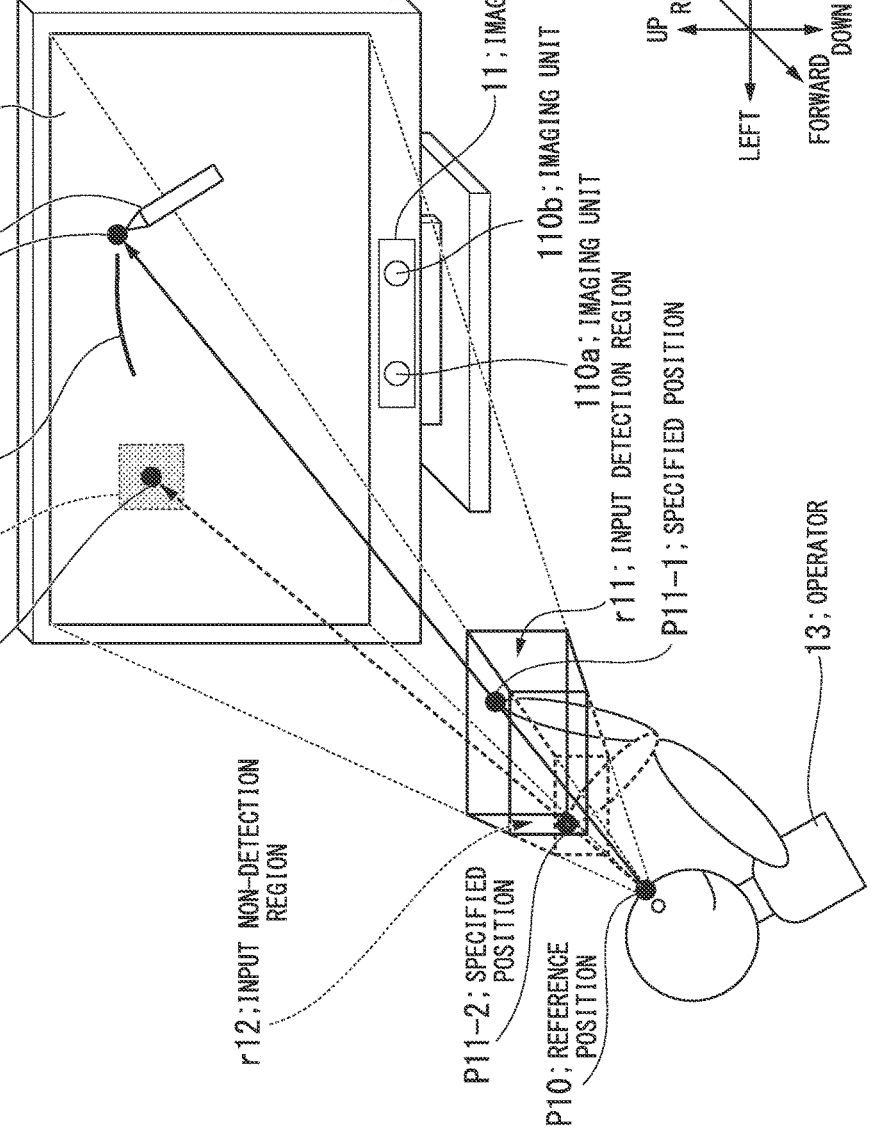
FIG. 17 is a conceptual drawing showing an example of an input detection image in the above-noted embodiment.

FIG. 17 is a conceptual drawing showing an example of the display of an input detection image in the present embodiment.

In FIG. 17, the positional relationship between the display unit 12 and the operator 13 is the same as in FIG. 13. However, the input detection region r11 is indicated by solid lines, and the input non-detection region r12 is indicated by broken lines.

The specified position P11-1 is a position of the fingertip that is another part of the body of the operator 13 that is included in the input detection region r11. The position-of-interest R11-1 is the intersection point between the straight line from the reference position P10 and passing through the specified position P11-1 and the display plane of the display unit 12. The stroke s3 that reaches the position-of-interest R11-1 is displayed on the display unit 12. The input detection image C-1 is displayed so that its tip is positioned at the position-of-interest R11-1. The input detection image C-1 is an image having a contour similar to, for example, a pencil as a writing instrument, a representative point thereof being a pencil tip. The input detection image C-1 is displayed brighter than the input detection image, to be described later, in a form that stands out. Doing this enables the condition in which detection is possible of the drawing input currently being detected by the display device 10 and in which it is possible to visually recognize that a trace ending at the position-of-interest R11-1 corresponding to the specified position P11-1 is displayed (drawn), based on the accepted drawing input.

The specified position P11-2 is the position of the fingertip, which is another part of the body of the operator 13 and is a position included in the input non-detection region r12, which is a part of the operation detection region. The position-of-interest R11-2 is the intersection point between the straight line from the reference position P10 and passing through the specified position P11-2 and the display plane of the display unit 12. The stroke s3 that reaches the position-of-interest R11-1 is displayed on the display unit 12. The input detection image C-2 is displayed so that its center-of-gravity is positioned at the position-of-interest R11-2. The input detection image C-2 is an image having, for example, a square contour and is displayed darker than the input detection image C-1 in a form that does not stand out. Although the example of an image having a square contour is given herein, this is not a restriction, and the input detection image C-1 may not be displayed (that is, the input detection image is not displayed when the specified position P11-2 is included in the input non-detection region r12). By doing this, when the operator 13 starts inputting, the input detection image is displayed, enabling recognition that input has started. The stroke s3 is not terminated at the position-of-interest R11-1.

Doing the above, the operator 13 can visually recognize that, although the display device 10 is in the state of accepting operation input, the state is one in which the trace of the position-of-interest R11-2 corresponding to the specified position P11-2 is not displayed by the accepted input operation.

(Processing Flow)

Next, the data input processing according to the present embodiment will be described.

Figure 18:
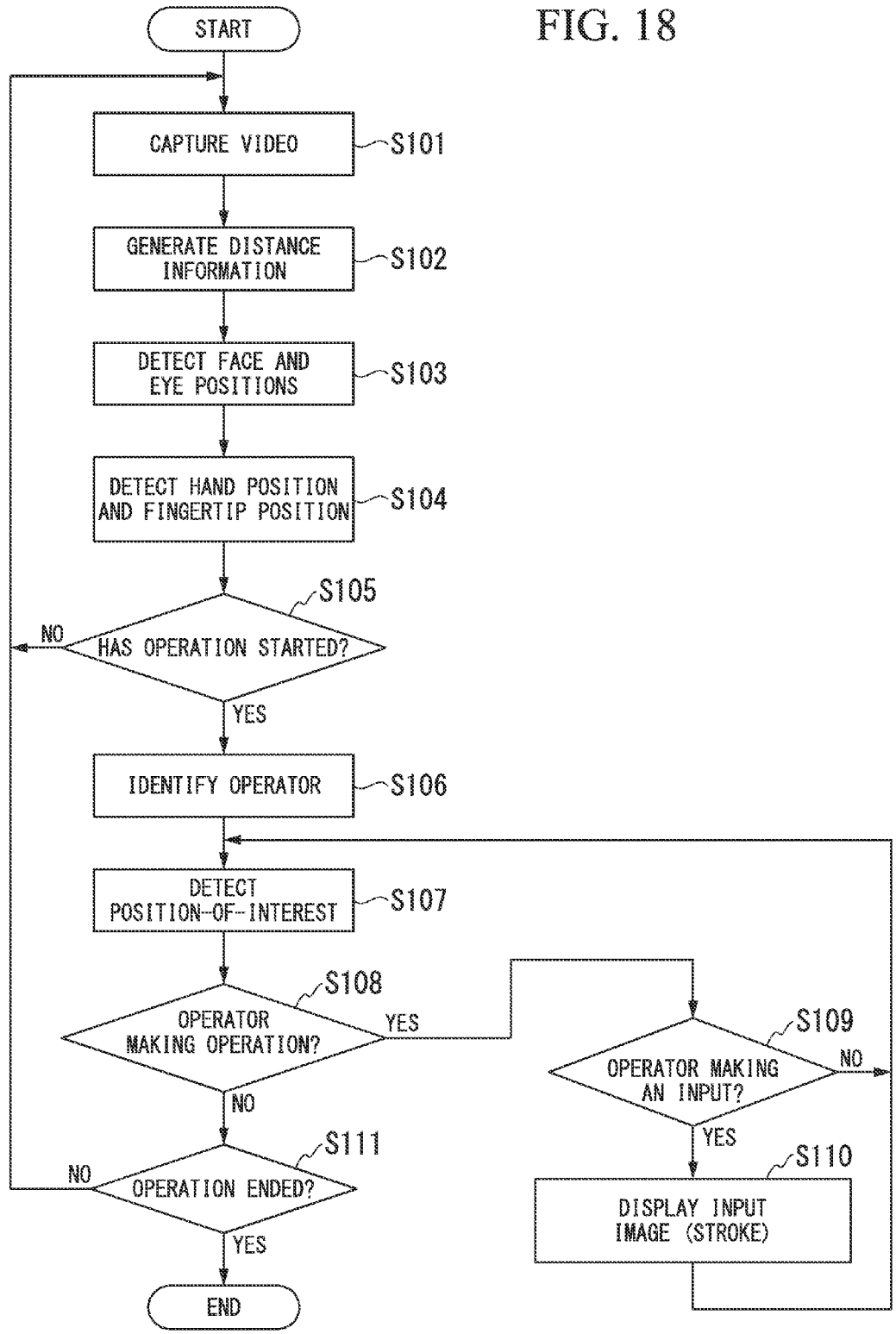
FIG. 18 is a flowchart showing the data input processing according to the above-noted embodiment.

FIG. 18 is a flowchart showing the data input processing according to the present embodiment.

(Step S101) The imaging units 110a and 110b each capture video toward the front and output the capture video to the distance calculation unit 200. The imaging unit 110a outputs a video signal to the face detection unit 30 and the hand position detection unit 32 of the user information analysis unit 201, after which processing proceeds to step S102.

(Step S102) The distance calculation unit 200 uses, for example, stereo matching to calculate the distance from the image capturing unit 11 to the operator, based on the input video images, and generates distance information. The distance calculation unit 200 outputs the generated distance information to the face detection unit 30, the eye position detection unit 31, the hand position detection unit 32, and the hand shape/fingertip position detection unit 33 of the distance calculation unit 200, after which processing proceeds to step S103.

(Step S103) The face detection unit 30 detects a region representing the image of the face of the operator represented by the video signal input from the imaging unit 110a. The face detection unit 30 generates two-dimensional face region information, based on the detected face region. The face detection unit 30 extracts from the distance information input from the distance calculation unit 200 a distance value related to a pixel in two-dimensional coordinates represented by the two-dimensional face region information. The face detection unit 30 converts the distance value corresponding to the above-described two-dimensional coordinates to two-dimensional coordinates in the subject space, and generates three-dimensional face position information. The face detection unit 30 outputs a face image signal representing the detected face to the eye position detection unit 31. The face detection unit 30 outputs the generated three-dimensional face position information to the operator distinguishing unit 39. The face detection unit 30 outputs the generated three-dimensional face position information to the detection information output unit 41 as a part of the detection information.

The eye position detection unit 31 detects the eye region from the face image represented by the face image signal input from the face detection unit 30. The eye position detection unit 31 calculates the eye position coordinates, based on the detected eye region. The eye position detection unit 31 extracts from the distance information input from the distance calculation unit 200 the distance value at a pixel existing in the detected eye position coordinates. The eye position detection unit 31 converts a set of calculated two-dimensional eye coordinates and extracted distance values to three-dimensional eye position coordinates in the subject space and generates three-dimensional eye position information. The eye position detection unit 31 outputs the calculated three-dimensional eye position information representing the calculated three-dimensional eye position coordinates to the position-of-interest detection unit 35 and the operator distinguishing unit 39. The eye position detection unit 31 outputs an eye region signal representing the image of the detected eye region to the operator distinguishing unit 39, after which processing proceeds to step S104.

(Step S104) The hand position detection unit 32 detects the region representing the image of the operator's hand represented by the video signal input from the imaging unit 110a and calculates two-dimensional coordinate values representing the detected hand position. The hand position detection unit 32 extracts from the distance information input from the distance calculation unit 200 the distance value corresponding to the calculated coordinate values, converts a set of distance values corresponding to the calculated two-dimensional coordinate values to three-dimensional coordinates in the subject space and generates three-dimensional hand position information. The hand position detection unit 32 outputs a hand image signal representing the detected hand region image and hand position information representing the two-dimensional coordinate values of a calculated representative point to the hand shape/fingertip position detection unit 33. The hand position detection unit 32 outputs the three-dimensional hand position information to the operator distinguishing unit 39.

The hand shape/fingertip position detection unit 33 detects the hand shape based on the hand image signal and the hand position information input from the hand position detection unit 32. The hand shape/fingertip position detection unit 33 searches for a finger region image based on the detected hand shape and counts the number of fingers. The hand shape/fingertip position detection unit 33 detects the fingertip position of each finger as two-dimensional coordinates and extracts from the distance information input from the distance calculation unit 200 a distance value of a pixel existing at the detected coordinates. The hand shape/fingertip position detection unit 33 generates three-dimensional fingertip position information that represents a set of extracted distance values and the two-dimensional coordinates of the fingertip as the three-dimensional coordinates in the subject space. The hand shape/fingertip position detection unit 33 outputs a finger image signal representing the detected finger, the number of fingers information representing the number of finger, and the two-dimensional coordinates at the fingertip to the detection information output unit 41 as a part of the detection information, after which processing proceeds to step S105.

(Step S105) The operator distinguishing unit 39, based on the three-dimensional face position information input from the face detection unit 30, distinguishes as an operator a user existing in a pre-established operation-enabled region from the users detected for which the face regions were detected. The operator distinguishing unit 39 establishes the operation detection region, based on the three-dimensional face region information input from the face detection unit and the three-dimensional eye position information input form the eye position detection unit 31. The operator distinguishing unit 39 judges whether or not the hand of an operator existing in the operation-enabled region exists in the operation-enabled region. This senses the start of operation by the operator. If the judgment is that operation has started (YES at step S105), processing proceeds to step S106. If the judgment is that operation has not started (NO at step S105), processing proceeds to step S101.

(Step S106) The operator distinguishing unit 39 tracks the position of the operator's face and the position of the hand in the operation-enable region, and identifies operators from whom input is accepted simultaneously, after which processing proceeds to step S107.

(Step S107) The position-of-interest detection unit 35 establishes the reference position, based on the three-dimensional eye position information input from the eye position detection unit 31. The position-of-interest detection unit 35 detects as the position-of-interest the point of intersection with the display plane of the display unit 12 of the straight line joining the established reference position and the specified position indicated by the three-dimensional fingertip position information input from the hand shape/fingertip position detection unit 33. The position-of-interest detection unit 35 outputs the generated position-of-interest information to the detection information output unit 41 as part of the detection information, after which processing proceeds to step S108.

(Step S108) The operator distinguishing unit 39 judges whether or not the hand of an operator exiting in the operation-enabled region exists in the operation detection region, and detects whether or not the operator is continuing operation (operation underway). If the judgment by the operator distinguishing unit 39 is that the position of the hand of the operator is included in the operation detection region (YES at step S108), processing proceeds to step S109. If the judgment by the operator distinguishing unit 39 is that the hand of the operator is not included in the operation detection region (NO at step S108), processing proceeds to step S111.

(Step S109) The drawing input detection unit 40 establishes the input detection region, based on the operation detection region information input from the operator distinguishing unit 39. The drawing input detection unit 40 judges whether or not the specified position indicated by the three-dimensional hand position information input from the operator distinguishing unit 39 is included in the established input detection region and detects whether or not the operator is making a drawing input. The drawing input detection unit 40 generates a drawing detection signal indicating whether or not drawing input was detected and outputs the generated drawing detection signal to the detection information output unit 41.

If the drawing input detection unit 40 judges that the specified position is included in the input detection region (YES at step S109), processing proceeds to step S110. If the drawing input detection unit 40 judges that the specified position is not included in the input detection region (NO at step S109), processing proceeds to step S107.

(Step S110) The display control unit 221 inputs the drawing detection signal and the position-of-interest information from the detection information output unit 41. If the drawing detection signal indicates that drawing input was detected, the display control unit 221 generates an image signal indicating an image of the trace of the movement of the position-of-interest indicated by the position-of-interest information. The display control unit 221 outputs the generated image signal to the display unit 12. The display unit 12 displays the input image (stroke) indicated by the image signal input from the display control unit 221, after which processing proceeds to step S107.

(Step S111) The control unit 22 judges whether or not the operation by the operator has ended. For example, if an operation to switch the power off was made by an operation input, the control unit 22 judges that the operation has ended. If the judgment is that operation has not ended (NO at step S111), processing proceeds to step S101. If the judgment is that operation has ended (YES at step S111), the data input processing ends.

In this manner, according to the present embodiment, the image capturing a first position detects a first position, which is the position of one part of the user's body, and a second position, which is the position of another part of the body, which are represented in captured video, and detects drawing input based on the first position and the second position. In the present embodiment, the position-of-interest in the image display plane corresponding to the second position is detected. Doing this enables smooth image input, which is the trace of the position-of-interest, by moving another part of the body, without the user using a dedicated device.

(Second Embodiment)

The second embodiment of the present invention will be described below, with references made to the drawings.

A display device 10*a* (not shown) according to the present embodiment has a drawing input detection unit 40*a* (not shown) in place of the drawing input detection unit 40 (FIG. 7) in the user information analysis unit 201 of the display device 10 (FIG. 3).

The drawing input detection unit 40*a* performs the same type of processing as the drawing input detection unit 40 (FIG. 7). However, the drawing input detection unit 40*a* establishes the input detection region based on the three-dimensional hand position information input from the operator distinguishing unit 39 in addition to the operation detection region input from the operator distinguishing unit 39. The three-dimensional hand position information used to establish the input detection region is three-dimensional hand position information regarding the hand (for example, the left hand) oppose from the hand (for example, the right hand) related to the drawing input.

The drawing input detection unit 40*a*, for example, establishes the coordinate value in the rearward direction in the boundary plane b1 of the input detection region and the input non-detection region as the coordinate value in the rearward direction indicated by the three-dimensional hand position information regarding the opposite side hand. The drawing input detection unit 40*a* then judges whether or not the specified position indicated by the three-dimensional hand position information related to the "one hand" is included in the above-described input detection region.

In the present embodiment, the hand position detection unit 32 generates and outputs hand image signals and three-dimensional hand position information that distinguishes between the left hand and the right hand. three-dimensional hand position information from the operator distinguishing unit 39 regarding each of the left and right hands is, therefore, input to the drawing input detection unit 40*a*.

As the above-described "one hand," for example, the operator distinguishing unit 39 may store, in its own storage unit, a face image signal indicating an image of the operator's face and drawing input position information, in association with each other. The drawing input location information is information that identifies whether the other part of the body related to drawing input, for example, the "other hand," is the right hand or the left hand. The "one hand" is, for example, the dominant hand. In this case, the operator distinguishing unit 39 reads out from the storage unit drawing input location information corresponding to a face image signal for which the comparison with the face image signal input from the face detection unit 30 succeeded, and judges the "one hand" indicated by the read-out drawing input location information.

The operator distinguishing unit 39 establishes the hand that was introduced into the operation detection region earlier as the "one hand" and may establish the opposite side hand, which is the other part of the body and the introduced afterward, as the "other hand." In this case, of the three-dimensional hand position information input from the hand position detection unit 32, the hand at a position indicated by that information that is included in the operation detection region first is judged to be the "one hand."

The "one hand" is not restricted to being the right hand, and may be the left hand. If the "one hand" is the left hand, the "other hand" is the right hand.

Next, an example of the input detection region according to the present embodiment will be described.

Figure 19:
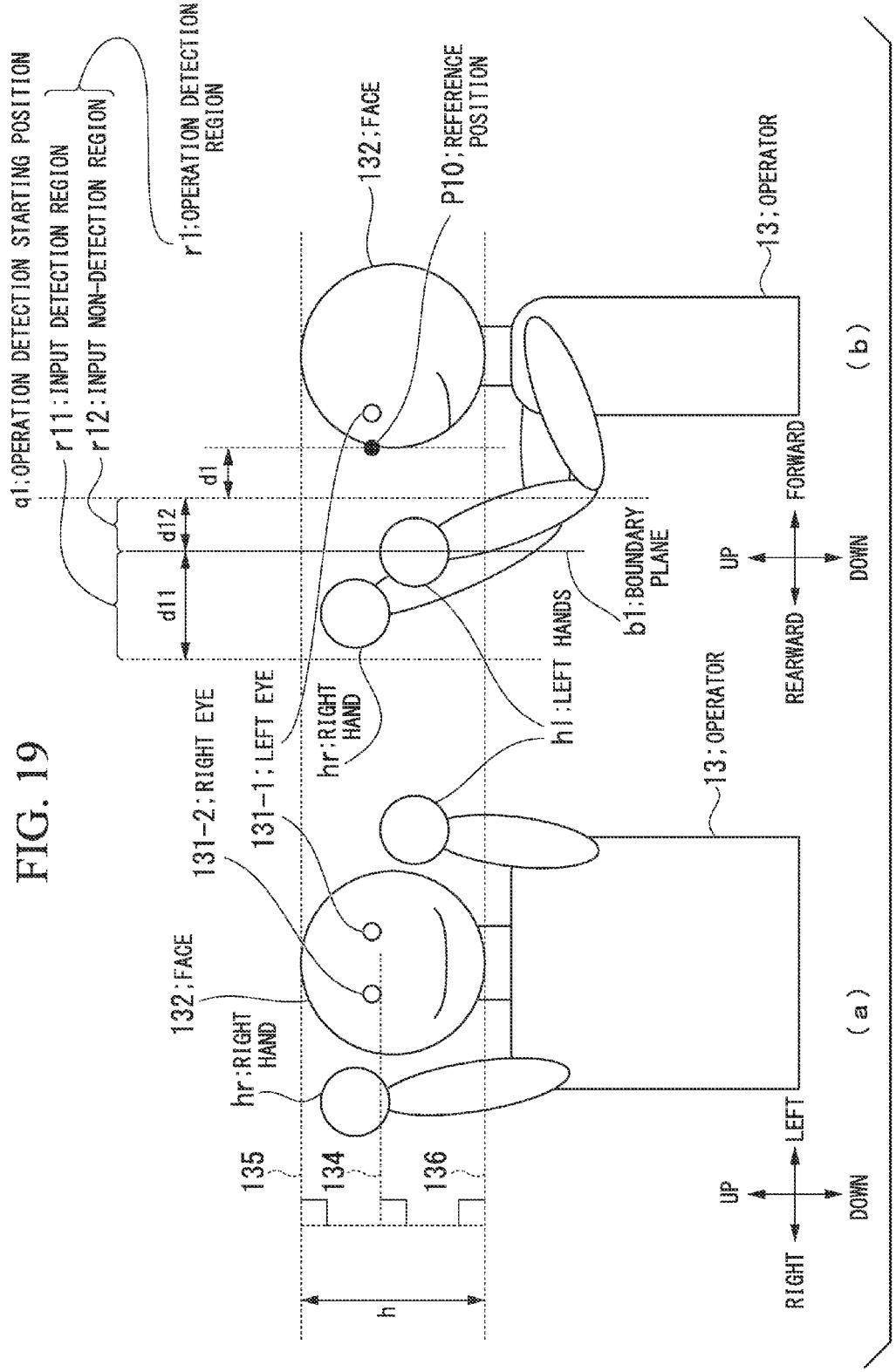
FIG. 19 is a conceptual drawing showing an example of an input detection region according to a second embodiment of the present invention.

FIG. 19 is a conceptual drawing showing an example of the input detection region according to the present embodiment.

In FIG. 19, the positional relationship between the operator 13 and the operation detection region r1 is the same as the positional relationship shown in FIG. 8.

FIG. 19(*a*) is a front view of the operator 13.

FIG. 19(*b*) is a left side view of the operator 13.

In FIG. 19(*b*), the rearward direction coordinate value of the boundary plane b1 is establishes as the coordinate value in the rearward direction of the left hand h1 as the opposite side hand of the operator 13. This enables the operator 13 to flexibly change the position in the rearward direction of the boundary plane b1 in accordance with his or her intent.

For this reason, because it is possible to known if drawing input is sensed by whether the one hand is rearward or forward from the boundary plane passing through the position in the rearward direction of the other hand, it is possible to reduce inputting errors and perform drawing input easily. This operation is similar to the operation of drawing using a writing instrument such as a pencil or chalk with one hand while making contact with a notebook or blackboard with the other hand. For this reason, in the present embodiment, even in the case of a first-time user, a person not accustomed to electronic equipment, or a user who has not learned the operation, it is possible to do drawing input and image displays (drawing) based thereon.

The drawing input detection unit 40*a* may, based on whether or not a drawing input by the one hand has been detected, establish the coordinate value in the rearward direction of the above-described boundary plane b1 as a value that is offset by a pre-established value from the coordinate value in the rearward direction of the other hand. For example, the drawing input detection unit 40*a* may establish the coordinate value in the rearward direction of the boundary plane as a value smaller (forward) than the coordinate value in the rearward direction of the boundary plane b1 by a pre-established amount, from immediately after detection of the drawing input until the drawing input is no longer detected. Also, the drawing input detection unit 40*a* may establish the coordinate value in the rearward direction of the boundary plane b1 as a value (rearward) larger than a pre-established value, the establishment being made from immediately after the drawing input is no longer detected until the next drawing input is detected. Because of this, it is not necessary that one hand always positions more rearward than another hand while the drawing input is made, or that the one hand always positions more forward than the another hand which the drawing input is not made. For this reason, the operator make natural input operations, without maintaining an unnatural posture when making drawing input.

The drawing input detection unit 40*a* may detect whether or not an erase input has been made, based on the specified position indicated by the three-dimensional hand position information related to the other hand. An erase input is an operation input giving an instruction to erase, of an image formed by drawing input, an image within a pre-established range from the position-of-interest. The drawing input detection unit 40*a* judges whether or not the time change of the specified position indicated by the three-dimensional hand position information related to the other hand matches a pre-established time change pattern. This time change pattern indicates, for example, the movement pattern of waving the hand to the left and right or up and down with a given period. The drawing input detection unit 40a stores a time change pattern beforehand, and judges whether there is a match, based on an index value indicating the similarity between the time change of the specified position indicated by the three-dimensional hand position information and the stored time change pattern. If the drawing input detection unit 40a judges that there was a match, it stops processing that establishes the coordinate value in the rearward direction of the boundary plane b1 based on the three-dimensional hand position information of the other hand.

If the drawing input detection unit 40a judges that there is a match and also the specified position indicated by the three-dimensional hand position information related to the other hand is included in the input detection region, it detects that an erase input has been made. If the specified position is not included in the input detection region, the drawing input detection unit 40a judges that an erasure has not been made. The drawing input detection unit 40a generates a erase detection signal indicating whether or not an erase input has been detected and outputs the generated erase detection signal to the detection information output unit 41.

The drawing input detection unit 40a calculates the point of intersection of the straight line joining from the reference position to the specified position with the display plane of the display unit 12 as the position-of-interest related to the other hand, and outputs the calculated position-of-interest information indicating the position-of-interest related to the other hand to the detection information output unit 41.

If the erase detection signal input from the drawing input detection unit 41 indicates that an erase input has been detected, the display control unit 221 erases from the formed trace a part within a pre-established range, with the position-of-interest indicated by the position-of-interest information related to the other hand as the reference. The region of the image that is erased moves by a change of the position-of-interest with the elapse of time. The display control unit 221, based on the erase detection signal, generates an image signal indicating the image of the trace that was partially or entirely erased, and outputs the generated image signal to the display unit 12. The display unit 12 displays an image of the trace that has been partially or entirely erased that is indicated by the image signal input from the display control unit 221.

Thus, with regard to an image formed by operation input by the one hand, by causing the other hand to make a pre-established movement (for example, waiving to the right and left or up and down), an image formed in the vicinity of the position-of-interest corresponding to the instructed position is erased. The movement pattern is similar to the movement pattern of causing an editing implement such as an eraser to move while in contact with the writing surface of paper or the like. Therefore, even if the user is not trained in operation, it is possible to easily erase a part of or an entire image that has been formed by drawing input.

(Processing Flow)

Next, the data input processing according to the present embodiment will be described.

Figure 20:
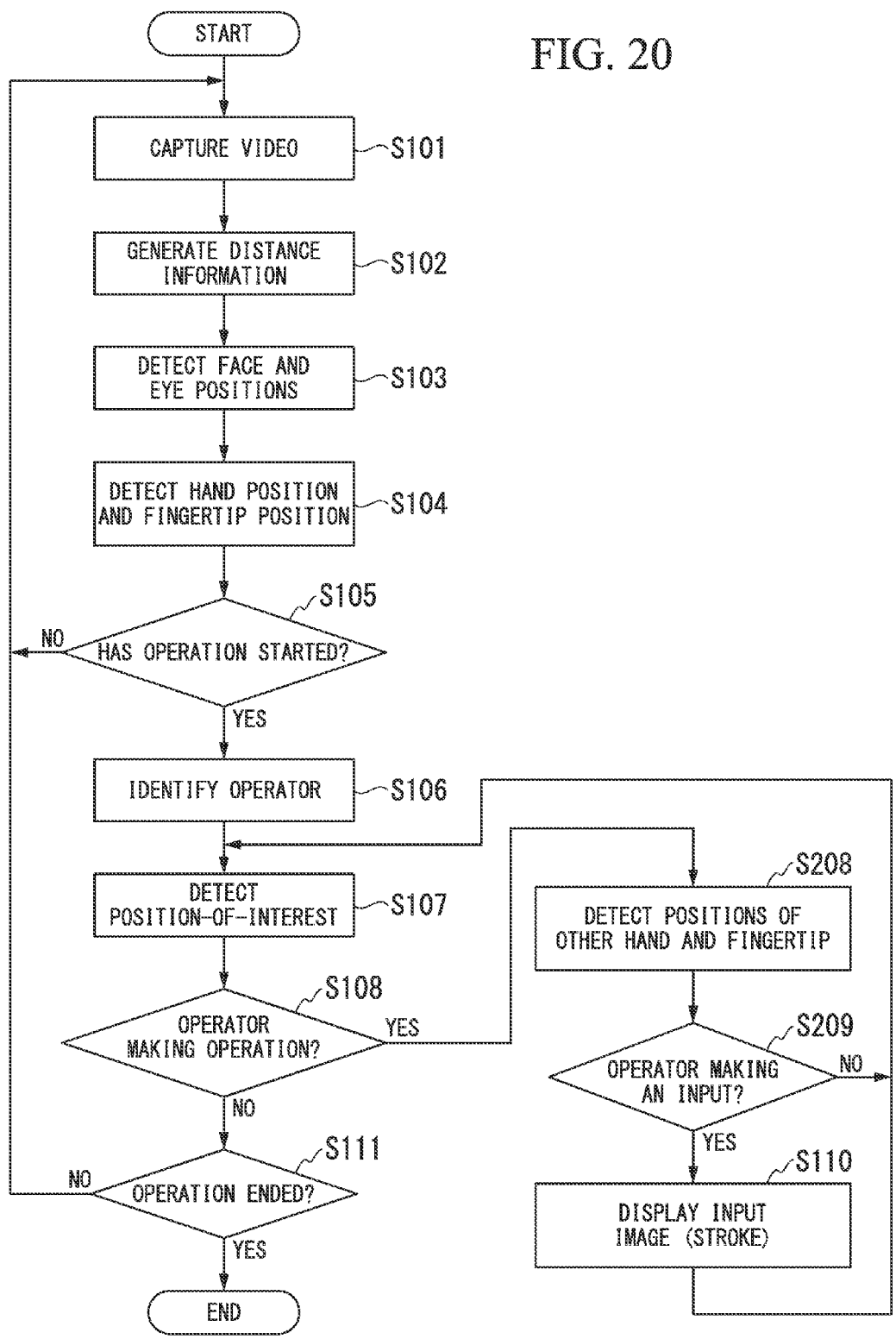
FIG. 20 is a flowchart showing the data input processing according to the above-noted embodiment.

FIG. 20 is a flowchart showing the data input processing according to the present embodiment.

Steps S101 to S108, step S110, and step S111 are the same as the respective steps shown in FIG. 18. At step S108, if the judgment by the operator distinguishing unit 39 is that the position of the operator's hand is included in the operation detection region (YES at step S108), processing proceeds to step S208.

(Step S208) The hand position detection unit 32 generates a hand image signal, based on the video signal input from the imaging unit 110a, which represents the image of the one hand and the other hand of the operator, for example even the left hand. The hand position detection unit 32, based on the input video signal and on the distance information input from the distance calculation unit 200, generates two-dimensional hand position information and three-dimensional hand position information. The hand position detection unit 32 outputs the generated hand image signal and two-dimensional hand position information to the hand shape/fingertip position detection unit 33. The hand position detection unit 32 outputs the three-dimensional hand position information to the operator distinguishing unit 39.

The hand shape/fingertip position detection unit 33 detects the shape of the other hand, based on the hand image signal and the hand position information input from the hand position detection unit 32. The hand shape/fingertip position detection unit 33 searches the image of the region of the fingers, based on the detected hand shape, and outputs number of fingers information indicating the number of fingers and two-dimensional fingertip position information indicating the two-dimensional coordinates of the fingertips to the detection information output unit 41. The hand shape/fingertip position detection unit 33 also generates three-dimensional fingertip position information, based on the two-dimensional coordinates of the tips of each finger and on the distance information input from the distance calculation unit 200. The hand shape/fingertip position detection unit 33 outputs the generated three-dimensional fingertip position information to the position-of-interest detection unit 35. Then, a processing proceeds to step S209.

(Step S209) The drawing input detection unit 40a establishes the input detection region based on the operation detection region information input from the operator distinguishing unit 39 and the three-dimensional hand position information regarding the other hand input from the operator distinguishing unit 39. The drawing input detection unit 40a judges whether or not the specified position indicated by the three-dimensional hand position information input from the operator distinguishing unit 39 is included in the established input detection region and detects whether or not an operator is making drawing input (input underway). The drawing input detection unit 40a generates a drawing detection signal indicating whether or not drawing input was detected and outputs the generated drawing detection signal to the detection information output unit 41.

If the drawing input detection unit 40a judges that the specified position is included in the input detection region (YES at step S109), processing proceeds to step S110. If the drawing input detection unit 40a judges that the specified position is not included in the input detection region (NO at step S109), processing proceeds to step S107.

In this manner, according to the present embodiment, the input detection region in which drawing input is detected is established based on the first position, which is the position of one part of the body of the user, and drawing input is detected by whether or not the second position, which is the position of another part of the body thereof is included in the input detection region. In the present embodiment, a third position indicating the position of yet another part of the body of the user represented in the video captured by the image capturing device is detected, and one boundary of the input detection region is established so as to pass through the third position. This enables flexible changing of the input detection region in accordance with the position of the yet another part of the body of the user, and enables recognition of the region in which drawing input is detected based on that position. For this reason, it is easy to make operation input by the position of the another part of the body.

(Third Embodiment)

The third embodiment of the present invention is described below, with references made to the drawings.

A display device 10b (not shown) according to the present embodiment has a display control unit 221b (not shown) in place of the display control unit 221 (FIG. 12) in the control unit 22 of the display device 19 (FIG. 3).

The display control unit 221b performs the same processing as the display control unit 221 (FIG. 1). However, the display control unit 221b inputs three-dimensional hand position information as one part of the detection information input from the detection information output unit 41, and establishes, for example, the form of drawing form information as information related to the image processing, based on the input three-dimensional hand position information. The drawing form information is information that indicates the form (drawing form) of the image (line drawing) of the trace formed by drawing input. The drawing form includes, for example, the line thickness (width).

(Line Thickness Selection)

Figure 21:
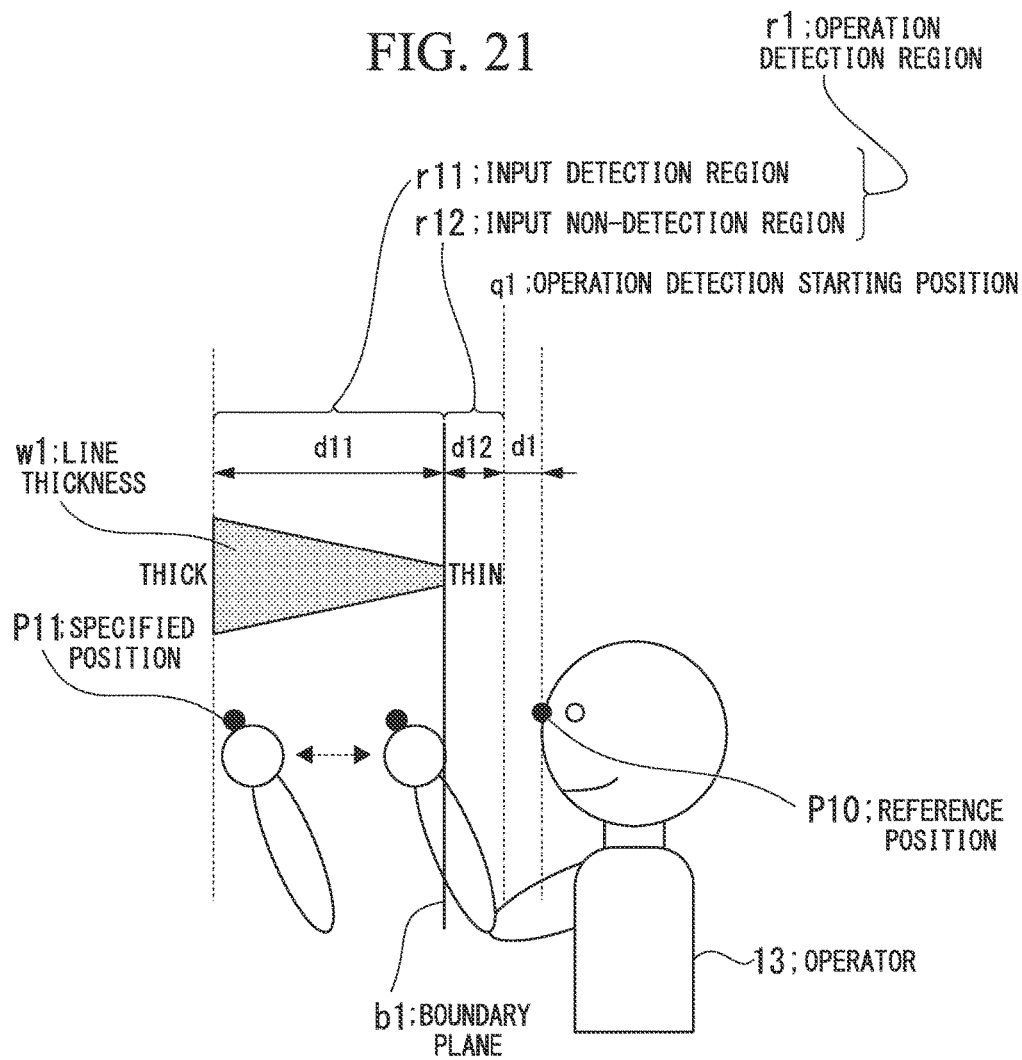
FIG. 21 is a conceptual drawing showing the relationship between the line thickness and the specified position according to a third embodiment.

FIG. 21 is a conceptual drawing showing the relationship between the line thickness and the specified position P11 in the present embodiment.

In FIG. 21, the positional relationship between the operator 13 and the input detection region r11 is the same as shown in FIG. 8(b).

A graphic that is a line segment that cuts across between left and right of the input detection region r11 and that is thicker further rearward and thinner further forward with respect to the operator 13 indicates the line thickness w1. The more rearward is the rearward coordinate of the specified position P11 indicated by the three-dimensional hand position information, the thicker the display control unit 221b sets the line thickness, and the more forward that coordinate is, the thinner it sets the line thickness. If the rearward coordinate is d1+d12, that is, at the forwardmost position (closest point) in the input detection region r11, the thickness is the minimum value of $w_{min}$. If the rearward coordinate is d1+d12+d11, that is, at the rearmost position (farthest point) in the input detection region r11, the thickness is the maximum value of $w_{max}$.

FIG. 22 is a drawing showing an example of setting the line thickness according to the present embodiment.

In both FIG. 22(a) and FIG. 2(b), the horizontal axis represents the rearward coordinate and the vertical axis represents the line thickness. The line thickness at the closest point (rearward coordinate d1+d12) is the minimum value $w_{min}$, and the line thickness at the farthest point (rearward coordinate d1+d12+d11) is the maximum value $w_{max}$.

In the example shown in FIG. 22(a), the line thickness is established linearly with respect to the rearward coordinate. In the example shown in FIG. 22(b), although the line thickness is linear with respect to the rearward coordinate from the closest point up until the pre-established position of d1+d12+d11−δ, when the rearward coordinate exceeds of d1+d12+d11−δ, the thickness is the maximum value $w_{max}$. The rearward coordinate value of d1+d12+d11−δ is a value that is closer to the rearward coordinate of the farthest point than to that of the nearest point. Even if the rearward coordinate of the specified coordinate P11 moves further to the rear than of d1+d12+d11−δ, because the line thickness is saturated at the maximum value $w_{max}$ and does not change, if the specified coordinate P11 moves further rearward, it exceeds the range of a drawing input region, and drawing input is interrupted. Therefore, by visually recognizing that the line thickness does not change, the operator can notice that the specified coordinate P11 has moved further to the rear and that drawing input has been interrupted. That is, it is possible to avoid cutting a stroke by interrupting drawing input unintentionally.

(Image Display Example)

Next, an example of the display of an image will be described.

Figure 23:
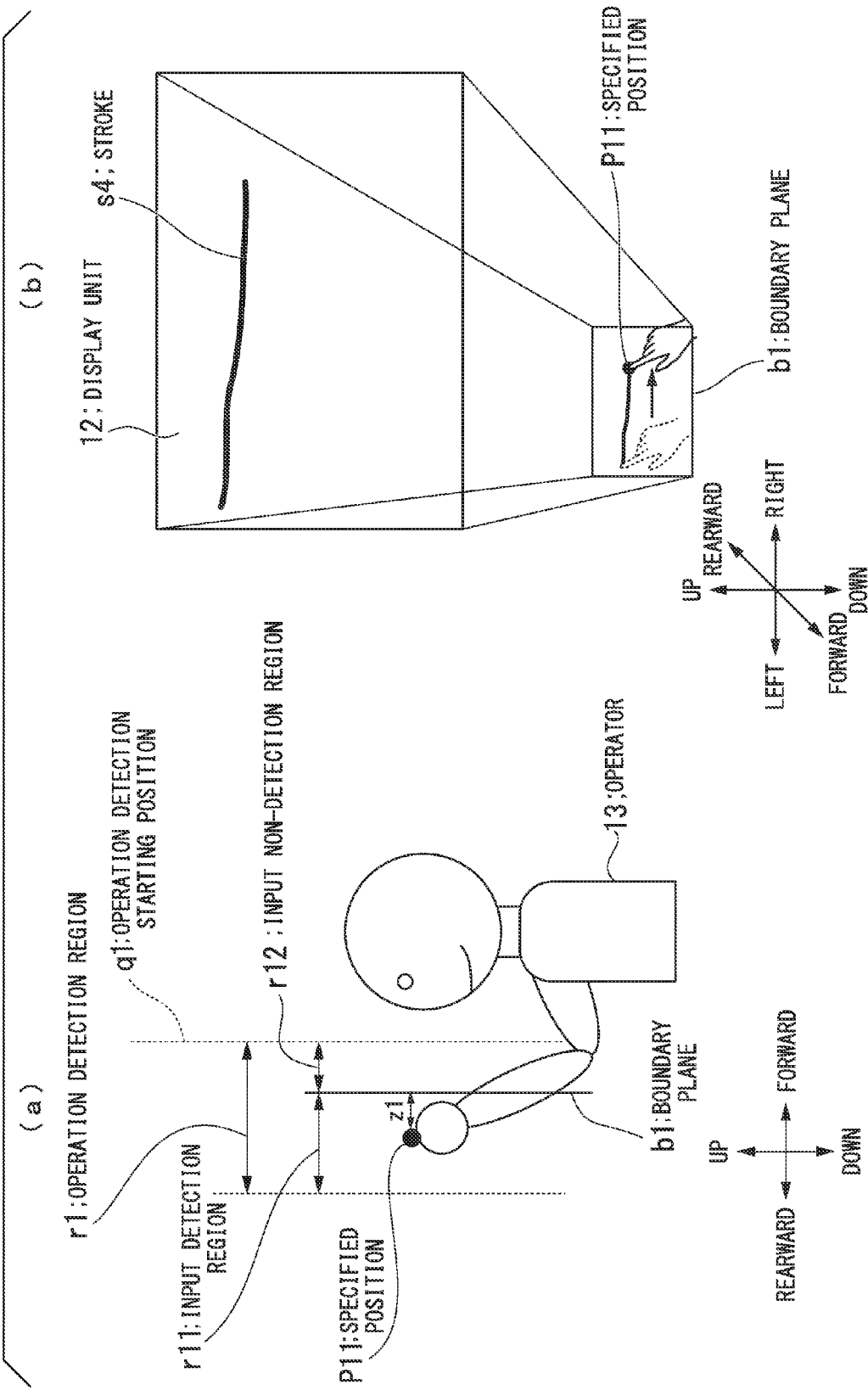
FIG. 23 is a conceptual drawing showing an example of the display of an image in the above-noted embodiment.

FIG. 23 is a conceptual drawing showing an example of the display of an image in the present embodiment.

In FIG. 23(a), the positional relationship between the operator 13 and the input detection region r11 is the same as in FIG. 14(a). In this example, although the specified position P11 is included in the input detection region r11, it is closer to the closest point than to the farthest point. In FIG. 23(b), the positional relationship between the input detection region r11 delineated by the boundary plane b1 and the display unit 12 is the same as in FIG. 14(b). In this example, by moving the specified position P11 from left to right, the thickness of the stroke s4 displayed on the display unit 12 is given by the rearward coordinate z1 of the specified position P1 from the boundary plane b1 is a thickness that is closer to the minimum value $w_{min}$ than to the maximum value $w_{max}$.

Figure 24:
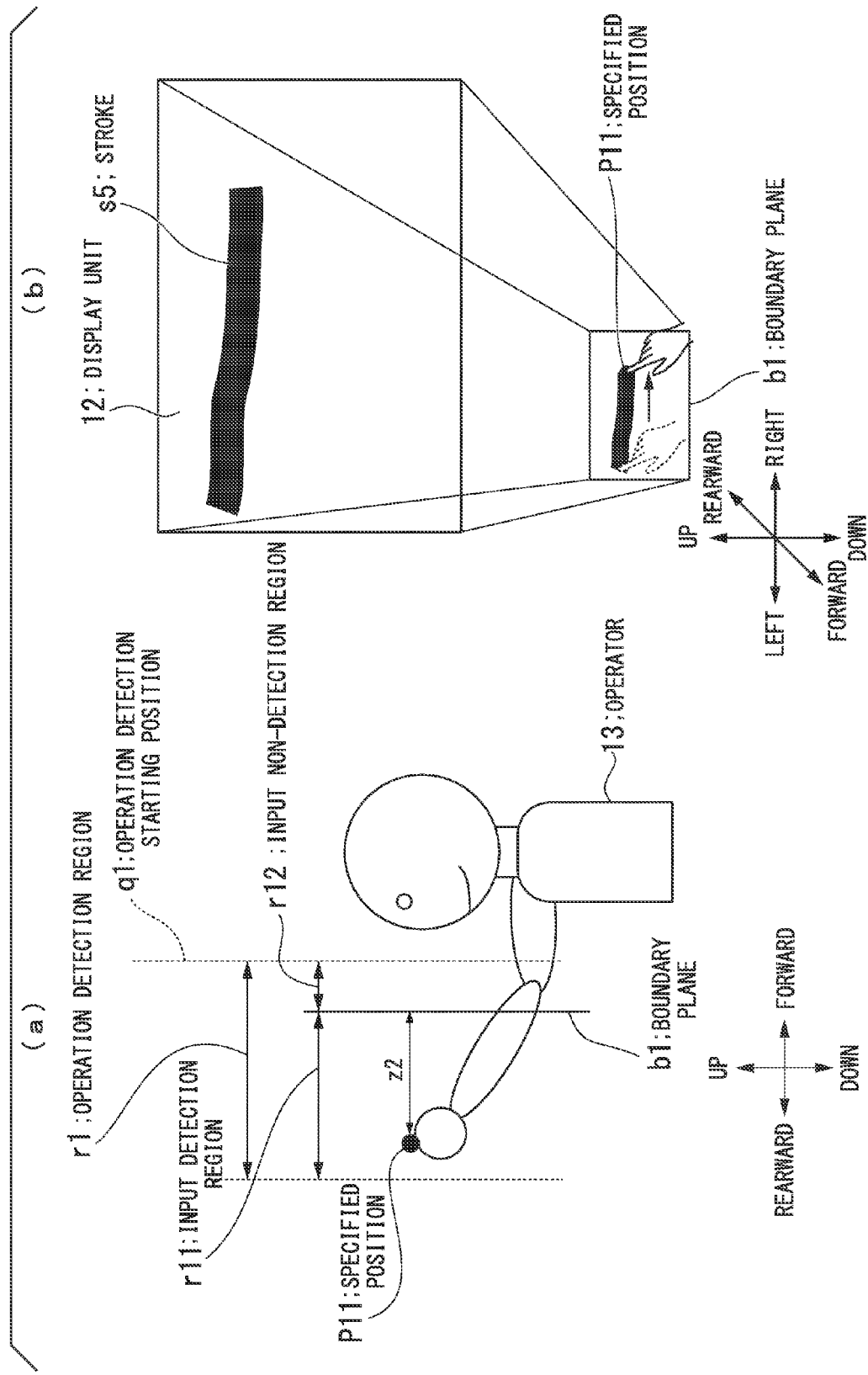
FIG. 24 is a conceptual drawing showing another example of the display of an image in the above-noted embodiment.

FIG. 24 is a conceptual drawing showing another example of the display of an image in the present embodiment.

In FIG. 24(a), the positional relationship between the operator 13 and the input detection region r11 is the same as in FIG. 23(a). In this example, although the specified position P11 is included in the input detection region r11, it is closer to the closest point than to the farthest point.

In FIG. 24(b), the positional relationship between the input detection region r11 delineated by the boundary plane b1 and the display unit 12 is the same as in FIG. 23(b). In this example, by moving the specified position P11 from left to right, the thickness of the stroke s5 displayed on the display unit 12 is a thickness that is closer to the maximum value $w_{max}$ than to the minimum value $w_{min}$. That is, the thickness of the stroke s5 is given by the rearward coordinate z2 of the specified position P11 from the boundary plane b1 and is wider than the stroke s4 (FIG. 23).

This eliminates the need for the user to perform an operation input to select the line thickness, for example, causing the display of a selection menu to select the drawing form and selecting the line thickness from the selection menu. Therefore, the convenience in drawing input is improved. In the operation when using a writing instrument such as a brush to draw characters on a writing surface such as paper, if the hand is move away from the drawer and the brush pressure is increased, the line thickness increases, and if the hand is pulled forward toward the drawer and the brush pressure is reduced, the line thickness is reduced. This operation is similar to the operation in the present embodiment, in which the line thickness is selected by the rearward coordinate of the specified position. For this reason, the operator can change the line thickness intuitively, by performing an operation that is similar to a very familiar operation.

In the foregoing description, although the case described was one in which the line thickness is established by the display control unit 221b based on the rearward coordinate of the specified position indicated by the three-dimensional hand position information, this is not a restriction. The display control unit 221b may establish the color of the line based on color space information indicating a pre-established relationship of correspondence between the rearward coordinate and the color, based on the rearward coordinate of the specified position. In the color space information, for example, red is associated with the farthest rearward coordinate and blue is associated with the nearest point, with rearward coordinates between the nearest point and the farthest point being associated successively with intermediate colors between red and blue. The display control unit 221b selects the color corresponding to the rearward coordinate of the specified position indicated by the three-dimensional hand position information from that color space information. The display control unit 221b then establishes the selected color based on the detection information input from the detection information output unit 41, and forms images based on subsequently input position-of-interest information using the established color. The display control unit 221b, for example, if the judgment is made that the specified position indicated by the three-dimensional hand position information as a part of the detection information is within a pre-established range of that position for a pre-established time (for example, 1 second), the display control unit 221b establishes the selected color. That is, the display control unit 221b establishes the color selected when the hand of the operator is stationery for a pre-established amount of time. The display control unit 221b establishes the color selected when the judgment is made that the hand shape as part of the detection information indicates a pre-established shape (for example, a fist), the display control unit 221b. That is, the color selected when the operator changes the hand to a pre-established shape is established.

In the present embodiment, the rearward coordinate is not restricted to being associated with the line thickness or color, and may be associated with a tone density or enlargement ratio.

Although the above description was for the case in which the positional relationship between the operator 13 and the input detection region r11 was the same as in FIG. 8(b), the present embodiment is not restricted to that, and the positional relationship may the same as in FIG. 19(b). Even in the case in which, by the "other hand" specifying the boundary plane b1 so that the input detection region r11 is determined, the line thickness, color, and the like may be changed by the rearward coordinate of the "one hand."

(Line Type Selection)

The display control unit 221b may input the hand shape information is input from the detection information output unit 41 as a part of the detection information and establish the drawing form information based on the input hand shape information. In the example to be described next, the description is for the example of the case in which drawing form is the line type. The line type is the shape of the line, including examples such as distinction between a solid line, a broken line, or a single-dot-dashed line, distinction between whether the points between line segments constituting a series of lines are squared or rounded, or distinction of whether a line is a simple single line or a double line.

Hand shape information and drawing style information are stored in association with each other in the display control unit 221b beforehand, and the display control unit 221b selects the line type indicated by the drawing form information corresponding to the input hand shape information. The shape of the hand indicated by the hand shape information associated with the drawing form information include, for example, a shape with the index finger extended and the other fingers clinched (shape 1), a shape with all five fingers clinched (shape 2), and a shape with the index finger and middle finger extended and the other fingers clinched (shape 3).

(Line Type Selection Example)

Next, an example of selecting the line type will be described.

Figure 25:
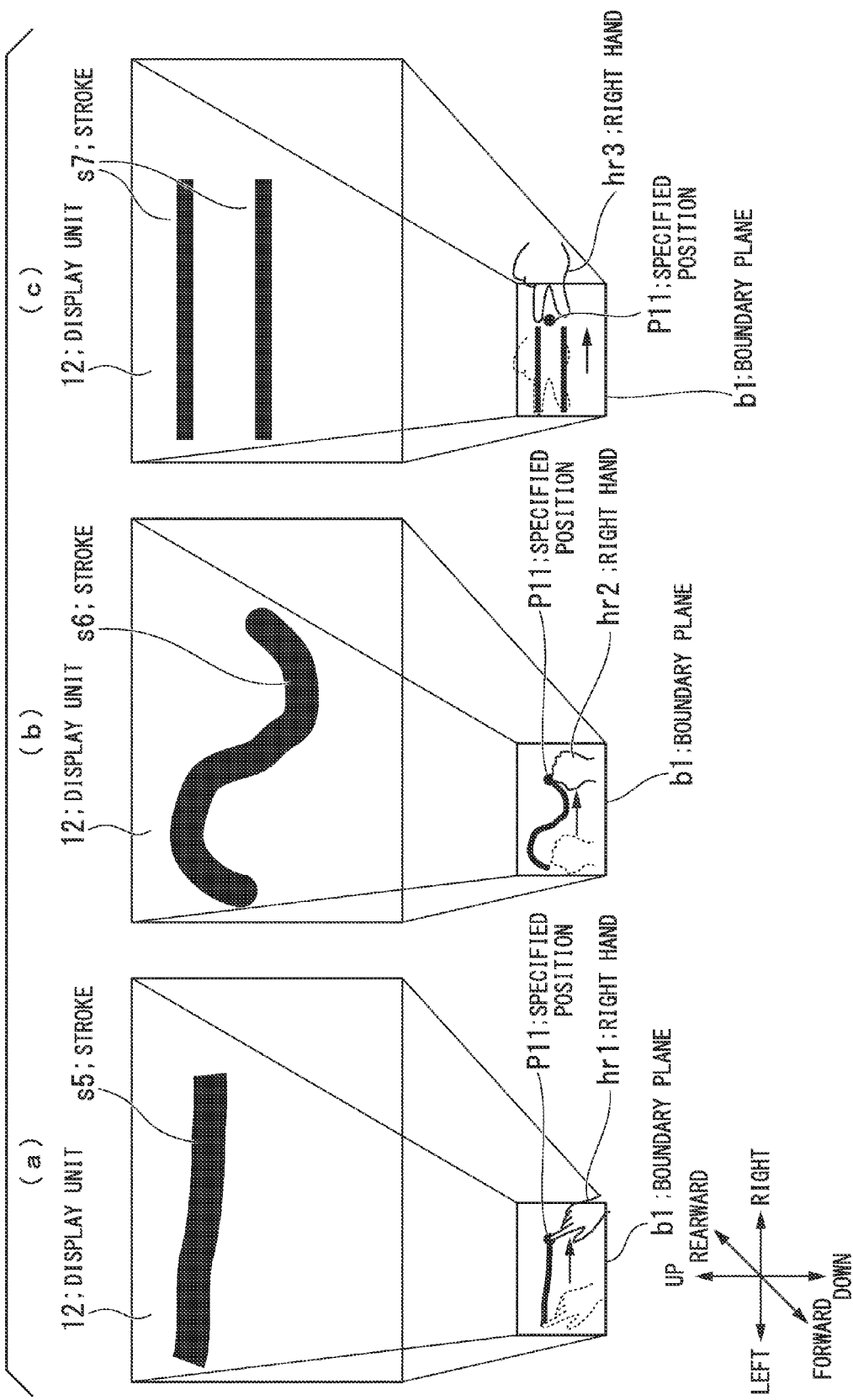
FIG. 25 is a conceptual drawing showing an example of selection of the line type in the above-noted embodiment.

FIG. 25 is a conceptual drawing showing an example of selecting the line type in the present embodiment.

In FIG. 25(a) to FIG. 25(c), the positional relationship between the boundary plane b1 and the display unit 12 is the same as shown in FIG. 24(b).

In FIG. 25(a), by the operator 13 moving the right hand hr1 that has taken on the shape 1 from left to right, the specified position P11 is moved from left to right. When this is done, the stroke s5 is displayed on the display unit 12. The line type of the stroke s5 is the line type corresponding to the shape 1, this being a single line with squared ends.

In FIG. 25(b), by the operator 13 moving the right hand rh2 that has taken on the shape 2 from left to right, the specified position P11 is moved from left to right. When this is done, the stroke s6 is displayed on the display unit 12. The line type of the stroke s6 is the line type corresponding to the shape 2, this being a line with rounded ends.

In FIG. 25(c), by the operator 13 moving the right hand hr3 that has taken on the shape 3 from left to right, the specified position P11 is moved from left to right. When this is done, the stroke s7 is displayed on the display unit 12. The line type of the stroke s7 is the line type corresponding to the shape 3, this being a double line.

As described above, in the example shown in FIG. 25, the shape characteristics of the hand and the line types are associated with each other, such as a line with rounded ends being associated with the shape 2 (shape with all five fingers clinched) and a double line and the shape 3 (shape with two fingers extended) are associated with each other. This enables the operator to use the shape of the hand to specify the line type intuitively.

In the present embodiment, the hand shape information and the hand shape and the line thickness indicated by the drawing form may be associated with each other. For example, the line thickness may be made thicker, the more the fingers are clinched and thinner, the more the fingers are opened. Also, the line thickness may be made thicker, the more fingers that are extended. In addition, in addition to the hand shape and the line thickness, any of the color, the tone density, the enlargement ratio, or line erasure may be associated, and the drawing form may be selected in accordance with the hand shape indicated by the hand shape information.

Although the above description was for the case in which the positional relationship between the operator 13 and the input detection region r11 was the same as in FIG. 24(b), the present embodiment is not restricted to this, and the positional relationship may be the same as FIG. 19(b). By the "other hand" specifying the boundary plane b1 to determine the input detection region r11, the shape of the "one hand" may change the line thickness, color, or the like. Additionally, processing related to drawing may be performed by a combination of the above-described input methods, such as changing the line type by the hand shape of the "one hand" and changing the line thickness by the rearward position of the "one hand." Seen from a user having a certain degree of training with regard to operation input according to the present embodiment, this method of input is far simpler than the method, for example, of displaying guidance images each time.

Although in the above description the a distinction is made as to whether or not the operator is making input was made by the rearward position of the specified position P11, the present embodiment is not restricted to this, and whether or not an input is being made may be distinguished by the shape of the hand. For example, if the position of the hand is included in the operation detection region r1, the judgment may be made that an input is underway, similar to the case in which the specified position P11 is included in the input detection region r11. If the shape of the clinched hand is detected, the judgement may be made that input has been interrupted, similar to the case in which the specified position is included in the input non-detection region r12. Additionally, if the positional relationship between the operator 13 and the input detection region r11 is the same positional relationship as in FIG. 19(b), the hand used to detect the hand shape for distinguishing whether or not input is being made can be either the "one hand" or the "other hand." Similar to as described above, for example, processing related to drawing may be performed by combination of the above-described input methods, such as performing distinction of whether input is being made based on the "other hand," specifying the line type by the hand position of the "one hand," and specifying the line thickness by the rearward position of the "one hand."

(Guidance Image Display Examples)

Next, examples of guidance images indicated by the guidance image signal output to the display unit 12 by the guidance image display unit 222 in the present embodiment will be described.

FIG. 26 is a drawing showing examples of guidance images according to the present embodiment.

FIG. 26(a) is an example of a guidance image that shows that the line thickness can be selected in accordance with the rearward coordinate of the specified position. This guidance image shows by text and a graphic that the thickness of the displayed line can be made thicker by moving the hand related to drawing input toward the display and thinner by moving the hand toward you.

FIG. 26(b) is an example of a guidance image showing that the line type (style) can be selected in accordance with the rearward coordinate of the specified position. This shows that, when the shape of the hand related to drawing input is changed to the shapes 1, 2, and 3, a line with squared ends, a line with rounded ends, and a double line are selected, respectively.

(Processing Flow)

Next, the data input processing according to the present embodiment will be described.

Figure 27:
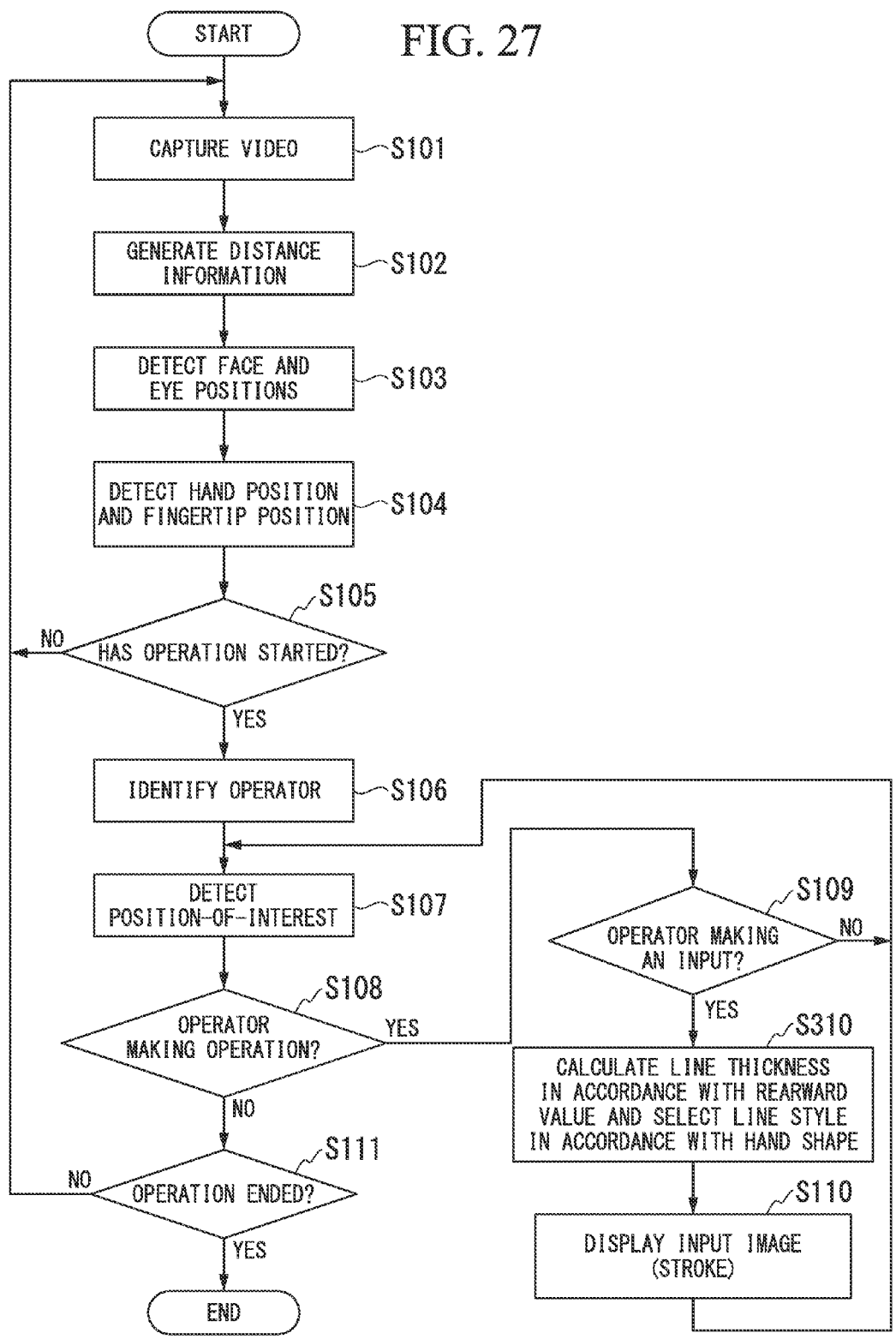
FIG. 27 is a flowchart showing the data input processing according to the above-noted embodiment.

FIG. 27 is a flowchart showing the data input processing according to the present embodiment.

Steps S101 to S109, step S110, and step S111 shown in FIG. 27 are the same as the respective steps shown in FIG. 18. At step S109, if the judgment by the drawing input detection unit 40 is that the specified position is included in the input detection region (YES at step S109), processing proceeds to step S310.

(Step S310) The display control unit 221b establishes the line thickness in accordance with the rearward coordinate (rearward value) of the specified position indicated by the three-dimensional hand position information input from the detection information output unit 41.

The display control unit 221b selects the line thickness (line type) corresponding to the hand position information input from the detection information output unit 41, after which processing proceeds to step S110.

At step S110 the line thickness established at step S310 and the selected line type are used to generate an image signal indicating an image of the trace of the position-of-interest.

In this manner, according to the present embodiment, an image is formed that indicates the specified position on the image display plane corresponding to the second position, which is the position of the another part of the body of the user, and the image display form is established based on either the coordinate value of the second position in the rearward direction or the shape of yet another part of the body. This enables specification of the display form of a graphic related to drawing input by a simple movement such as by the rearward coordinate or shape of the another part of the user's body.

(Fourth Embodiment)

The fourth embodiment of the present invention will be described below, with references made to drawings.

The display device 10c (not shown) has the above-described drawing input detection unit 40c (not shown) in place of the drawing input detection unit 40 (FIG. 7) in the user information analysis unit 201 of the display device 10 (FIG. 3).

That is, the drawing input detection unit 40c performs the same type of processing as the drawing input detection unit 40 (FIG. 7) and establishes the input detection region based on the three-dimensional hand position information input from the operator distinguishing unit 39 in addition to the operation detection region information input from the operator distinguishing unit 39. The three-dimensional hand position information used in establishing the input detection region is three-dimensional hand position information related to the opposite side hand (the another hand) relative to the one hand related to drawing input.

The display device 10c has a display control unit 221c (not shown) in place of the display control unit 211 (FIG. 12) in the control unit 22 of the display device 10 (FIG. 3).

The display control unit 221c performs the same type of processing as the display control unit 221b (not shown). However, in contrast to the display control unit 221b, the display control unit 221c establishes the drawing form information based on detection information, for example, hand shop information, related to the hand (for example, the left hand) on the opposite side from the one hand (for example, the right hand) related to the drawing input. That is, in the present embodiment, in addition to establishing the input detection region based on the position of the hand on the opposite side from the one hand related to drawing input, the drawing form is established based on the shape of that opposite-side hand.

For example, the hand shape information of the opposite-side hand and drawing form information are stored into the display control unit 221c beforehand, and drawing form information corresponding to the hand shape information of the opposite-side hand is read out. The display control unit 221c generates an image signal representing an image of the trace of the position-of-interest corresponding to the specified position related to the one hand, in the drawing form indicated by the read-out drawing form information.

This does drawing input by the one hand and controls the input detection region and selects the drawing form by the another hand. The control of the input detection region and the selection of the drawing form correspond to the input or control of information accompanying drawing input. In the present embodiment, therefore, because the operator can perform the drawing input and can input or control the information accompanying drawing input in parallel using separate hands, it is possible to do drawing input efficiently.

(Line Type Selection Examples)

Next, examples of selecting the line type as one form of drawing input will be described.

Figure 28:
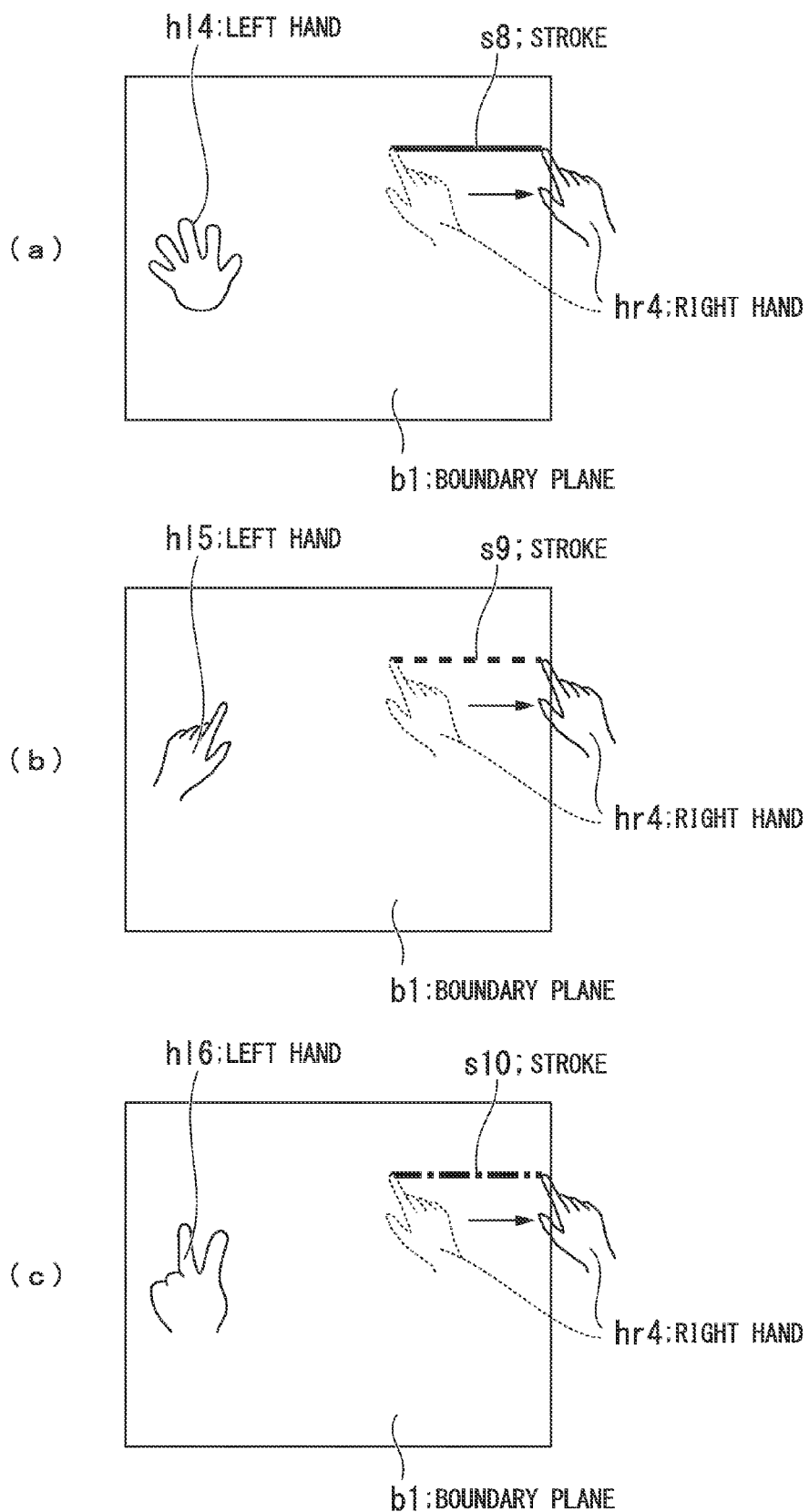
FIG. 28 is a conceptual drawing showing an example of the selection of the line type in a fourth embodiment of the present invention.

FIG. 28 is a conceptual drawing showing examples of selecting the line type in the present embodiment.

In each of FIG. 28(*a*) to FIG. 28(*c*), the positional relationship between the boundary plane b1 and the operator is the same as that shown in FIG. 19(*b*), and the relationship between the boundary plane b1 and the display unit 12 is the same as that shown in FIG. 25. However, the display unit 12 that displays the strokes accompanying drawing input has been omitted. In these examples, the shapes of the left hand (shapes 4 to 6) correspond to a solid line, a broken line, and a single-dot-dashed line, respectively. The shape 4 is a shape with all five fingers extended, the shape 5 is a shape with the index finger extended and the other fingers clinched, and shape 6 is a shape with the index finger and middle finger extended and the other fingers closed. The left hand taking the shapes 4 to 6 will be referred to as the left hands h14 to h16, respectively.

In FIG. 28(*a*), by the operator moving the right hand hr4 from left to right, keeping it extended farther rearward than the left hand h14, the stroke s8 is displayed. The line type of the line forming the stroke s8 is a solid line, corresponding to the shape of the left hand hr4. The rearward coordinate of the boundary plane b1 is equal to the rearward coordinate of the left hand h14.

In FIG. 28(*b*), by the operator moving the right hand hr4 from left to right, keeping it extended farther rearward than the left hand h14, the stroke s9 is displayed. The line type of the line forming the stroke s9 is a broken line, corresponding to the shape of the left hand hr5.

In FIG. 28(*c*), by the operator moving the right hand hr4 from left to right, keeping it extended farther rearward than the left hand h14, the stroke s10 is displayed. The line type of the line forming the stroke s10 is a single-dot-dashed line, corresponding to the shape of the left hand hr6.

As noted above, in the examples shown in FIG. 28, the user can give an instruction for the rearward coordinate of the boundary plane b1 that delineates the region in which drawing input by the right hand is accepted by the rearward position of the left hand. In addition, the user can specify the line type intuitively in accordance with the shape of the left hand.

The drawing form that is to be changed by the shape of the left hand is not restricted to the line type, and may be, for example, the line thickness or color, tone density or enlargement ratio, or erasure of a line.

Additionally, although the foregoing description was for the case of judging whether or not the operator 13 is making input based on the relationship between the rearward positions of the left hand and the right hand, the present embodiment is not restricted to this, and whether or not the operator 13 is making input may be judged based on the hand shape. For example, when the shape in which the right index finger is extended is detected, the distinction of input being underway may be made, similar to the case in which the specified position P11 is included in the input detection region r11. Also, if the shape of the clinched hand is detected, distinction of input having been interrupted may be made, similar to the case in which the specified position P11 is included in the input non-detection region r12. Additionally, if the positional relationship between the operator 13 and the input detection region r11 is the same as in FIG. 19(*b*), the hand shape that distinguishes whether or not input is underway may be specified by either the "one hand" or the "another hand." For example, processing related to drawing may be performed by a combination of the above-described input methods, such as distinction of whether or not input is underway based on the "another hand (left hand)," specification of the line type being made by the hand shape of the "one hand (right hand)," and the specification of the line thickness being made by the rearward position of the "one hand (right hand)."

(Guidance Image Example)

Next, an example of a guidance image indicated by the guidance image signal output to the display unit 12 of the guidance image display unit 222 in the present embodiment will be described.

Figure 29:
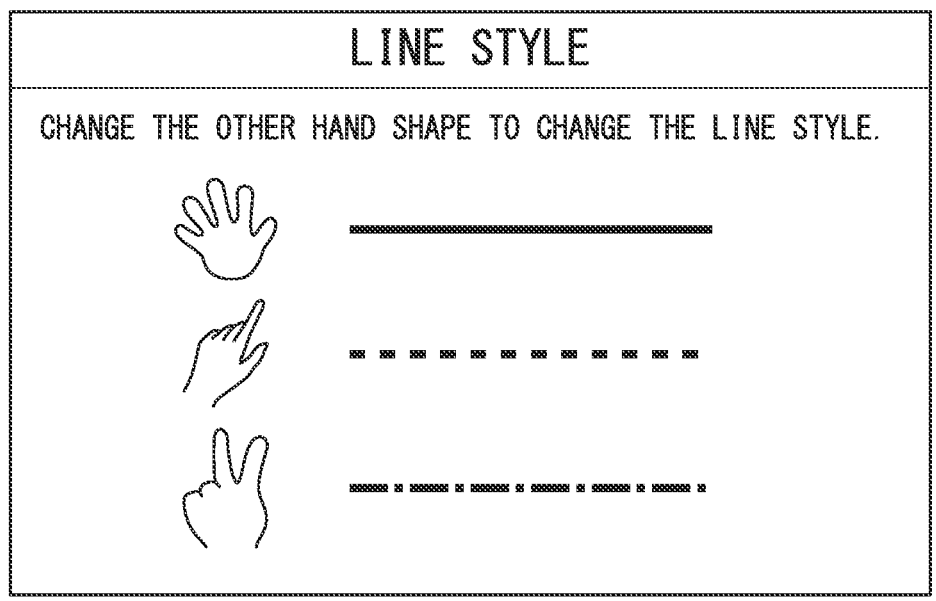
FIG. 29 is a drawing showing an example of a guidance image according to the above-noted embodiment.

FIG. 29 is a drawing showing an example of a guidance image in the present embodiment.

FIG. 29 is an example of a guidance image indicating that the line type (style) can be selected by the hand shape. This guidance image shows that, when the shape of the hand is changed to the shapes 4, 5, and 6, selection is made of a solid line, a broken line, and a single-dot-dashed line, respectively.

In the present embodiment, the another hand shape and the drawing form information may be associated in the hand shape information. For example, the shapes 4 to 6 may be associated with the colors black, red, and blue, respectively. Also, the shape of the another hand indicated by the hand shape information may be associated with the thickness of the line indicated by the drawing form information. For example, the line width may be made thinner, the more fingers that are clinched, and may be made thicker, the more fingers that are extended. In addition to the line type, thickness, or color, one selected from, or an arbitrary combination of tone density and enlargement ratio may be associated with the hand shape, with the drawing form being selected in accordance with the shape of the another hand indicated by the hand shape information. That is, in the present embodiment, the shape of the another hand can be any shape, as long as it is a shape that enables representation by the hand, and any drawing form may be associated with each of the shapes.

The display control unit 221*c*, in addition to establishing information related to the line shape or color, as one drawing form based on the hand shape information related to the opposite-side hand, may establish information related to the line thickness as another drawing form based on three-dimensional hand position information. This enables the operator, for example, to specify the line shape and color in accordance with the shape of the left hand and to specify the line thickness in accordance with the rearward coordinate of the right hand. The operator can, therefore, continue to make drawing input with the one hand as the drawing form is specified by simple movement forms of the another hand that do not interfere with the drawing input by the one hand, enabling detailed specification of the drawing form by the another hand.

(Processing Flow)

Next, the data input processing according to the present embodiment will be described.

FIG. 30 is a flowchart showing the data input processing according to the present embodiment.

Steps S101 to S108, step S110, and step S111 are the same as the respective steps shown in FIG. 18. At step S108, if the judgment by the operator distinguishing unit 39 is that the position of the operator's hand is included in the operation detection region (YES at step S108), processing proceeds to step S408.

(Step S408) The hand position detection unit 32 generates a hand image signal of not only the one hand and additionally the another hand, for example the left hand, based on the video signal thereof input from the imaging unit 110a. The hand position detection unit 32 generates two-dimensional hand position information and three-dimensional hand position information based on the input video signal and on the distance information input from the distance calculation unit 200. The hand position detection unit 32 outputs the generated hand image signal, two-dimensional hand position information, and three-dimensional hand position information to the hand shape/fingertip position detection unit 33. The hand position detection unit 32 outputs the three-dimensional hand position information to the operator distinguishing unit 39.

The hand shape/fingertip position detection unit 33 detects the shape of the another hand, based on the hand image signal and hand position information input from the hand position detection unit 32. The hand shape/fingertip position detection unit 33 searches the image of the region of the fingers, based on the detected hand shape and outputs number of fingers and two-dimensional fingertip position indicating two-dimensional coordinates of the fingertips to the detection information output unit 41. The hand shape/fingertip position detection unit 33 also generates three-dimensional fingertip position information, based on the two-dimensional coordinates of the tips of each finger and on the distance information input from the distance calculation unit 200. The hand shape/fingertip position detection unit 33 outputs the generated three-dimensional fingertip position information to the position-of-interest detection unit 35, after which processing proceeds to step S409, after which processing proceeds to step S409, after which processing proceeds to step S409.

(Step S409) The drawing input detection unit 40c establishes the input detection region, based on the operation detection region information input from the operator distinguishing unit 39 and the three-dimensional hand position information regarding the another hand input from the operator distinguishing unit 39. The drawing input detection unit 40c judges whether or not the specified position indicated by the three-dimensional hand position information regarding the one hand input from the operator distinguishing unit 39 is included in the established input detection region and detects whether or not the operator is making a drawing input. The drawing input detection unit 40c generates a drawing detection signal indicating whether or not drawing input was detected and outputs the generated drawing detection signal to the detection information output unit 41.

If the drawing input detection unit 40c judges that the specified position is included in the input detection region (YES at step S409), processing proceeds to step S410. If the drawing input detection unit 40c judges that the specified position is not included in the input detection region (NO at step S409), processing proceeds to step S107.

(Step S410) The display control unit 221c selects a line type corresponding to the hand shape information of the another hand input from the detection information output unit 41, after which processing proceeds to step S411.

(Step S411) The display control unit 221c establishes the line thickness in accordance with the rearward coordinate (rearward value) of the specified position indicated by the three-dimensional hand position information regarding the one hand input from the detection information output unit 41, after which processing proceeds to step S110.

At step S110 an image signal is generated that indicates an image of the trace of the position-of-interest, using the line type selected at step S410, the line thickness established at step S411.

Hand shape information of the opposite-side hand and drawing style information may be stored in the display control unit 221c beforehand, and the drawing style information corresponding to the hand shape information regarding the opposite-side hand may be read out. The display control unit 221c generates an image signal indicating an image of the trace of the position-of-interest corresponding to the specified position related to the one hand, using the drawing form indicated by the read-out drawing form information.

This does drawing input by the one hand and controls the input detection region and selects the drawing form by the another hand. The control of the input detection region and the selection of the drawing form correspond to the input or control of information accompanying drawing input. In the present embodiment, therefore, because the operator can perform the drawing input and can input or control the information accompanying drawing input in parallel using separate hands, it is possible to do drawing input efficiently.

In this manner, according to the present embodiment, the shape of yet another part of the body of the user is detected and the display form of the image by the drawing input is established based on the detection shape. Because this enables specification of the drawing form by changing the shape of a part of the body different from the part performing drawing input, it is possible to avoid a reduction in the efficiency of drawing input.

(Variation Example)

The above-described drawing input detection unit 40, 40a, and 40c established the input detection region using operation detection region information and judged whether or not the specified position indicated by the three-dimensional hand position information is included in the established input detection region. Although the drawing input detection units 40, 40a, and 40c judged whether or not the operator is doing drawing input based on that judgment, this is not a restriction.

The drawing input detection units 40, 40a, and 40c may detect whether or not the operator is doing drawing input based on the hand shape information input from the hand shape/fingertip position detection unit 33. In this case, the drawing input detection units 40, 40a, and 40c have their own storage unit, into which drawing detection hand shape information indicating the shape of the hand and a drawing detection signal are stored in association with each other beforehand. The drawing detection signal indicates whether or not drawing input has been detected, as noted above. The drawing input detection units 40, 40a, and 40c compare the input hand shape information with the drawing detection hand shape information that they had stored and read out a drawing detection signal associated with the drawing detection hand shape information for which the comparison succeeded. The hand shape information used in judging whether or not drawing input has been detected may be hand shape information regarding the one hand, or hand shape information regarding the another hand.

For example, if the hand shape information regarding the one hand indicates a shape with five fingers clinched (a fist), the drawing input detection units 40, 40a, and 40c judge that drawing input has been detected. Also, if the hand shape information regarding that one hand indicates a shape with the index finger extended and the other fingers all closed, the drawing input detection units 40, 40a, and 40c judge that drawing input has not been detected. This enables the operator to control whether or not drawing input is to be done, in accordance with the shape of the hand related to the drawing input.

Also, if the hand shape information regarding the opposite-side hand indicates a shape with five fingers clinched (a fist), the drawing input detection units 40, 40a, and 40c judge that drawing input has been detected. Also, if the hand shape information regarding the another hand indicates a shape with the index finger extended and the other fingers all closed, the drawing input detection units 40, 40a, and 40c judge that drawing input has not been detected. This enables the operator to control whether or not drawing input is to be done, in accordance with the shape of the hand opposite from the hand related to the drawing input. The operator, therefore, can establish simply to do or not do drawing input in accordance with the operator's intention, without thinking about the input detection region.

A "foot" or "one foot" and "another foot" may be used, respectively in place of the "hand" and "one hand" as another part of the body and "another hand" as yet another part of the body in foregoing description. This enables even a person without full use of the hands to perform drawing input using the feet.

Although the foregoing was a description of establishment of the drawing form information as information related to image processing, this is not a restriction. For example, the information related to image processing may be information indicating the existence or non-existence of operator identification information that identifies an operator related to drawing input, information indicating whether or not all or a part of the formed image is to be displayed on the display unit 12, or information indicating whether or not all or a part of the image is to be stored into the storage unit of the information database 21.

The present invention may be embodied in the following forms.

(1) A data input device characterized by having a position detection unit that detects a first position based on a position of one part of a body and a second position based on a position of another part of the body of a user represented in video captured by an image capturing device, a drawing input detection unit that establishes an input detection region in which drawing input is detected, based on the first position detected by the position detection unit and detects the drawing input based on whether or not the second position is included in the input detection region, a position-of-interest detection unit that detects a position-of-interest on an image display plane corresponding to the second position detected by the position detection unit, and an image forming unit that forms an image indicating the position-of-interest detected by the position-of-interest detection unit when the drawing input detection unit detects drawing input. This enables an operator to do drawing input smoothly, without using a dedicated device.

(2) The data input device noted in (1) characterized in that the drawing input detection unit establishes an input detection region in which the drawing input is detected based on the first position and detects whether or not the second position is included in the input detection region. This enables the setting of a drawing input region favorable for the operator for drawing input by a position of another part of the body.

(3) The data input device noted in (2) characterized in that the position detection unit detects a third position indicating yet another part of the body of the user represented in video captured by the image capturing device, and the drawing input detection unit establishes one boundary delineating the input detection region so as to pass through the third position detected by the position detection unit. This the operator to easily grasp whether or not drawing input will be detected, based on the position of another part of the body, with the yet another part of the body as a reference.

(4) The data input device noted in (3), characterized in that the image forming unit establishes information regarding processing the image in accordance with a coordinate value of the second position toward the rearward direction. This enables an operator to determine the treatment of an image drawn in accordance with the position of another part of the body in the rearward direction.

(5) The data input device noted in (3), characterized in by having a shape detection unit that detects the shape of another part of the body, and that the image forming unit establishes information regarding the display of the image, based on the shape detected by the shape detection unit. This enables the operator to determine the treatment of an image drawn in accordance with the shape of the another part of the body.

(6) The data input device noted in (3), characterized by further having a shape detection unit that detects the shape of yet another part of the body, wherein the image forming unit establishes information related to the display of the image, based on the shape detected by the shape detection unit. This enables the operator to determine treatment of an image drawn in accordance with the shape of yet another part of the body.

(7) The data input device noted in any one of (1) to (6), characterized by the one part of the body of the user being an eye and the other part of the body of the user being one of the left hand and the right hand. Because this does drawing by one hand at the viewed position-of-interest direction, it facilitates drawing of an image having a desired shape, based on the position of that hand.

(8) The data input device noted in (7), characterized by the yet another part of the body of the user being the other hand relative to the one hand. This facilitates a grasp of and instruction regarding the treatment of drawn images by the user, based on the position of the other hand.

(9) A data input system having a data input device and a display unit that displays an image indicated by input data that is input by the data input device, characterized by the data input device having a position detection unit that detects a first position based on a position of one part of a body and a second position based on a position of another part of the body of a user represented in video captured by an image capturing device, a drawing input detection unit that detects drawing input in which drawing input is detected, based on the first position and the second position detected by the position detection unit, a position-of-interest detection unit that detects a position-of-interest on an image display plane corresponding to the second position detected by the position detection unit, and an image forming unit that forms an image indicating the position-of-interest detected by the position-of-interest detection unit when the drawing input detection unit detects drawing input.

(10) A data input method in a data input device, characterized by having a position detection step of detecting a first position based on a position of one part of a body and a second position based on a position of another part of the body of a user represented in video captured by an image capturing device, a drawing input detection step of detecting drawing input based on the first position and the second position detected by the position detection set, a position-of-interest detection step of detecting a position-of-interest on an image display plane corresponding to the second position detected by the position detection step, and an image forming step of forming an image indicating the position-of-interest detected by the position-of-interest detection step when the drawing input detection step detects drawing input.

(11) A data input program that has, in a computer of a data input device, a position detection procedure of detecting a first position based on a position of one part of a body and a second position based on a position of another part of the body of a user represented in video captured by an image capturing device, a drawing input detection procedure of detecting drawing input based on the first position and the second position detected by the position detection procedure, a position-of-interest detection procedure of detecting a position-of-interest on an image display plane corresponding to the second position detected by the position detection procedure, and an image forming step of forming an image indicating the position-of-interest detected by the position-of-interest detection procedure when the drawing input detection procedure detects drawing input. Because of (9), (10), and (11), an operator can do drawing input smoothly, without using a dedicated device.

A part of the display devices 10, 10a, 10b, and 10c of the above-described embodiments, for example the distance calculation unit 200, the face detection unit 30, the eye position detection unit 31, the hand position detection unit 32, the hand shape/fingertip position detection unit 33, the position-of-interest detection unit 35, the operator distinguishing unit 39, the drawing input detection units 40, 40a, and 40c, the detection information output unit 41, and the control unit 22 may be implemented by a computer. In this case, a program for implementing the control functionality thereof may be read into a computer-readable recording medium and a computer system may read and execute the program recorded in the recording medium. The temi "computer system" used here means computer system incorporated into the display devices 10, 10a, 10b, and 10c, and includes an operating system and hardware such as peripheral devices. The term "computer-readable recording medium" refers to a removable medium such as a flexible disk, an optomagnetic disk, a ROM, a CD-ROM, or to a storage device such as a hard disk built into a computer system. Additionally, the term "computer-readable recording medium" may encompass one holding a program over a short time dynamically such as a communication line when a program is transmitted via a network such as the Internet or via a communication line such as a telephone line and one holding a program for a given period of time, such as a volatile memory within a computer system serving as a server or client. The above-noted program may be for implementing a part of the above-described functionality and may be one enabling implementation by combination with a program that already has recorded the above-noted functionality in a computer system.

A part or all of the display devices 10, 10a, 10b, and 10c according to the above-described embodiments may be implemented as an integrated circuit such as LSI (large-scale integration). Each of the functional blocks of the display devices 10, 10a, 10b, and 10c may be implemented by a processor separately or a part or all thereof may be implemented in integrated fashion as a processor. The method of integrated circuit implementation is not restricted to LSI, and implementation may be done by dedicated circuitry or a general-purpose processor. Additionally, in the event of the appearance of integrated circuit implementation taking the place of LSI by advances in semiconductor technology, an integrated circuit using that technology may be used.

Although the foregoing has been a detail description of embodiments of the present invention, with references to the drawings, the specific constitution is not limited to the above, and may include various design modifications, within the scope of the spirit of the invention.

INDUSTRIAL APPLICABILITY

The present invention can be applied to a user interface or the like for equipment such as a computer, a game machine, a video telephone conference system.

DESCRIPTIONS OF REFERENCE NUMERALS

10, 10a, 10b, 10c Display device
11 Image capturing device
110 (110a, 110b) Imaging unit
12 Display unit
20 Image processing device
200 Distance calculation unit
201 User information analysis unit
30 Face detection unit
31 Eye position detection unit
32 Hand position detection unit
33 Hand shape/fingertip position detection unit
35 Position-of-interest detection unit
39 Operator distinguishing unit
40, 40a, 40c Drawing input detection unit
41 Detection information output unit
21 Information database
22 Control unit
221, 221b, 221c Display control unit
222 Guidance image display unit

The invention claimed is:
1. A data input device comprising:
one or more processing devices and one or more memory devices storing instructions to:
detect a first position, a second position, and a third position, the first position being based on a position of one part of a body of a user represented in a video captured by an image capturing device, the second position being based on a position of another part of the body, the third position being based on a position of yet another part of the body;
establish a three-dimensional operation detection space based on the first detected position;
establish one boundary of a three-dimensional input detection space in which a drawing input is detected, the establishment of the one boundary being performed by using, as a reference, the third detected position, the three-dimensional input detection space being included in the three-dimensional operation detection space;
detect the drawing input, the detection of the drawing input being performed in a case that the second position is included in the three-dimensional input detection space, and whether or not the second position is farther rearward than the third position;
detect a position-of-interest on an image display plane, the detection of the position-of-interest being performed based on the first and second detected positions; and
form an image indicating the detected position-of-interest in a case that the drawing input is detected.

2. The data input device according to claim 1, wherein in the case of forming the image, an information related to a processing of the image is established, the establishment of the information being performed in accordance with a coordinate value of the second position in a rearward direction.

3. The data input device according to claim 1,
wherein the one or more memory devices further storing instructions to:
detect a first shape of the another part of the body,
wherein in a case of forming the image, an information related to a processing the image is established, the establishment of the information being performed based on the first shape detected.

4. The data input device according to claim 1,
wherein the one or more memory devices further storing instructions to:
detect a second shape of the yet another part of the body,
wherein in a case of forming the image, an information related to a processing of the image is established, the establishment of the information being performed based on the second shape detected.

5. The data input device according to claim 1, wherein the one part of the body of the user is a face, and the another part of the body is either one hand of a left hand and a right hand.

6. The data input device according to claim 1, wherein the one part of the body of the user is a face, the another part of the body is either one hand of a left hand and a right hand, and the yet another part of the body is a hand that is opposite from the one hand.

7. A data input method of a data input device, the data input method comprising:
detecting a first position, a second position, and a third position, the first position being based on a position of one part of a body of a user represented in a video captured by an image capturing device, the second position being based on a position of another part of the body, the third position being based on a position of yet another part of the body;
establishing a three-dimensional operation detection space based on the first detected position;
establishing one boundary of a three-dimensional input detection space in which a drawing input is detected, the establishment of the one boundary being performed by using, as a reference, the third detected position, the three-dimensional input detection space being included in the three-dimensional operation detection space;
detecting the drawing input, the detection of the drawing input being performed in a case that the second position is included in the three-dimensional input detection space, and whether or not the second position is farther rearward than the third position;
detecting a position-of-interest on an image display plane, the detection of the position-of-interest being performed based on the first and second detected positions; and
forming an image indicating the detected position-of-interest in a case that the drawing input is detected.

8. A non-transitory computer readable recording medium storing a data input program that causes a computer of a data input device to execute:
detecting a first position, a second position, and a third position, the first position being based on a position of one part of a body of a user represented in a video captured by an image capturing device, the second position being based on a position of another part of the body, the third position being based on a position of yet another part of the body;
establishing a three-dimensional operation detection space based on the first position detected;
establishing one boundary of a three-dimensional input detection space in which a drawing input is detected, the establishment of the one boundary being performed by using, as a reference, the third detected position, the three-dimensional input detection space being included in the three-dimensional operation detection space;
detecting the drawing input, the detection of the drawing input being performed in a case that the second position is included in the three-dimensional input detection space, and whether or not the second position is farther rearward than the third position;
detecting a position-of-interest on an image display plane, the detection of the position-of-interest being performed based on the first and second detected positions; and
forming an image indicating the detected position-of-interest in a case that the drawing input is detected.

9. The data input device according to claim 1, wherein in a case of the position-of-interest, as the position-of-interest, an intersection point between a straight line and the image display plane is used, the straight line passing through the first position and the second position.

10. The data input device according to claim 1,
wherein in a case of detecting the drawing input a three-dimensional operation detection space and the three-dimensional input detection space are established, the three-dimensional operation detection space being for detecting the another part, the three-dimensional input detection space being part of the three-dimensional operation detection space, and
wherein in a case of forming the image:
an input detection image is formed as the image, and
the input detection image in a first form which does not stand out compared to a second form is displayed, the first form being used in a case that the drawing input is not detected, the second form being used in a case that the drawing input is detected.

11. The data input device according to claim 1, wherein the three-dimensional input detection space is established such that the three-dimensional input detection space is rearward than the one boundary.

12. The data input device according to claim 11, wherein the three-dimensional input detection space is established such that the three-dimensional input detection space is deeper than a rearward value of the third position.

13. The data input device according to claim 1, wherein the one boundary of the three-dimensional input detection space is flexibly changed by using the third detected position.

14. The data input device according to claim 1, wherein the detection of the drawing input is performed based on whether the second position is rearward or forward from the boundary.

15. The data input device according to claim 1,
wherein the three-dimensional operation detection space includes the three-dimensional input detection space and a three-dimensional input non-detection space, and
the boundary is between the three-dimensional input detection space and the three-dimensional input non-detection space.

* * * * *